US008280779B2

(12) United States Patent
Davis et al.

(10) Patent No.: US 8,280,779 B2
(45) Date of Patent: Oct. 2, 2012

(54) METHOD AND SYSTEM FOR ONLINE SALES AND PURCHASES

(75) Inventors: Oren L. Davis, Tempe, AZ (US); Diane L. Slonaker, Tempe, AZ (US); Richard A. Russell, Goodyear, AZ (US); Richard J. Solar, Jr., Phoenix, AZ (US); Mirko Predosin, Sunnyvale, CA (US)

(73) Assignee: Intesource, Inc., Phoenix, AZ (US)

( * ) Notice: Subject to any disclaimer, the term of this patent is extended or adjusted under 35 U.S.C. 154(b) by 422 days.

(21) Appl. No.: 12/587,883

(22) Filed: Oct. 13, 2009
(Under 37 CFR 1.47)

(65) Prior Publication Data

US 2011/0071920 A1 Mar. 24, 2011

Related U.S. Application Data

(62) Division of application No. 10/399,196, filed as application No. PCT/US01/32180 on Oct. 10, 2001, now abandoned.

(60) Provisional application No. 60/239,141, filed on Oct. 10, 2000.

(51) Int. Cl.
*G06Q 30/00* (2006.01)

(52) U.S. Cl. ........ 705/26.1

(58) Field of Classification Search ........ 705/26.1
See application file for complete search history.

(56) References Cited

U.S. PATENT DOCUMENTS

| | | | | |
|---|---|---|---|---|
| 6,141,653 | A | 10/2000 | Conklin et al. | |
| 6,260,024 | B1 | 7/2001 | Shkedy | |
| 6,356,878 | B1 | 3/2002 | Walker et al. | |
| 6,564,192 | B1 | 5/2003 | Kinney, Jr. et al. | |
| 6,598,026 | B1 | 7/2003 | Ojha et al. | |
| 6,691,070 | B1 * | 2/2004 | Williams et al. | 702/188 |
| 6,778,968 | B1 | 8/2004 | Gulati | |
| 7,430,523 | B1 | 9/2008 | Khalidi | |
| 7,653,583 | B1 | 1/2010 | Leeb et al. | |
| 2001/0037250 | A1 | 11/2001 | Lefkowitz | |
| 2002/0007324 | A1 | 1/2002 | Centner et al. | |
| 2002/0016759 | A1 | 2/2002 | Macready et al. | |
| 2008/0052775 | A1 * | 2/2008 | Sandhu et al. | 726/14 |

OTHER PUBLICATIONS

"Useful information in cookies" Malay Mail. Kuala Lumpur: Aug 3, 2000. p. 20; http://proquest.umi.com/pqdweb?did=57438553&sid=2&Fmt=3&clientId=19649&RQT=309&VName=PQD.*

Non-Final Office Action issued on Dec. 30, 2011 for U.S. Appl. No. 12/587,806, filed Oct. 13, 2009; Inventor—Davis et al.; pp. 1-9).

Non-Final Office Action issued on Mar. 9, 2012 for U.S. Appl. No. 12/587,843, filed Oct. 13, 2009; Inventor—Davis et al.; pp. 1-5).

(Continued)

*Primary Examiner* — Mila Airapetian
(74) *Attorney, Agent, or Firm* — Ballard Spahr LLP

(57) ABSTRACT

Internet-based commercial network connects multiple qualified participant buyers and sellers. Items are made available for defined periods of time, referred to as an event (139). Event terms and conditions include item types, price, quantity, volume or units, discount, shipping terms (138). Reiterative offer and counteroffers permit negotiation of terms for an event. Participants may view anonymous competitive quotes for comparison and analysis. Pooled purchases and auctions are envisioned. Participants may create web presences and are subject to restrictions on access (141) and purchase (142) authority. Central system maintains participant data.

33 Claims, 62 Drawing Sheets

OTHER PUBLICATIONS

Response to Non-Final Office Action filed on Mar. 15, 2012 for U.S. Appl. No. 12/587,843, filed Oct. 13, 2009; Inventor—Davis et al.; pp. 1-9).
Non-Final Office Action issued by USPTO on Jun. 29, 2011 re U.S. Appl. No. 12/587,806.
Response to Non-Final Office Action (w/ Rule 131 Affidavit) filed Oct. 27, 2011 re U.S. Appl. No. 12/587,806.
Non-Final Office Action issued by USPTO on Sep. 26, 2011 re U.S. Appl. No. 12/587,843.
Response to Non-Final Office Action (w/ Rule 131 Affidavit) filed Dec. 21, 2011 re U.S. Appl. No. 12/587,843.
Restriction Requirement issued Jun. 27, 2008 re U.S. Appl. No. 10/399,196.
Response to Restriction Requirement filed Aug. 4, 2008 re U.S. Appl. No. 10/399,196.
Second Restriction Requirement issued Dec. 10, 2008 re U.S. Appl. No. 10/399,196.
Second Response to Restriction Requirement filed Jan. 9, 2009 re U.S. Appl. No. 10/399,196.
Non-Final Office Action issued Apr. 13, 2009 re U.S. Appl. No. 10/399,196.
Notice of Abandonment issued Oct. 21, 2009 re U.S. Appl. No. 10/399,196.
Non-Final Office Action issued Nov. 19, 2010 re U.S. Appl. No. 12/587,819.
Response to Non-Final Office Action filed Mar. 17, 2011 re U.S. Appl. No. 12/587,819.
Final Office Action issued May 31, 2011 re U.S. Appl. No. 12/587,819.
Non-Final Office Action issued Feb. 14, 2011 re U.S. Appl. No. 12/587,856.
Response to Non-Final Office Action filed Jun. 13, 2011 re U.S. Appl. No. 12/587,856.
Declaration of Inventor under Section 131, including Exhibits A, B and C, filed Jun. 13, 2011 re U.S. Appl. No. 12/587,856.
Correspondence re Prior Art Cited in Related Applications filed Jun. 13, 2011 re U.S. Appl. No. 12/587,843.
Declaration of Inventor under Section 131, including Exhibits A, B and C, filed Jun. 13, 2011 re U.S. Appl. No. 12/587,843.
Non-Final Office Action issued on May 18, 2012 for U.S. Appl. No. 12/587,843, filed Oct. 13, 2009, (Inventor—Davis et al.; pp. 1-12).
Response to Non-Final Office Action filed on Apr. 20, 2012 for U.S. Appl. No. 12/587,806, filed Oct. 13, 2009, (Inventor—Davis et al.; pp. 1-9).

* cited by examiner

Event Item Additional Funds

| Name | Min. Amt. | Quotable? |
|---|---|---|
| DW Spanish Olives Thrown Stuffed Manz. (12 Each(es)/5.75 Ounce(s)/Case(s)/1 Case(s) /UPC 04676) | | |
| fund 1 ($) | $200.00 | Y |
| Descriptions: Test Fund | | |
| DW Thrown Stuffed Spanish Queen Olives (12 Each(es)/7 Ounce(s)/Case(s)/1 Case(s) /UPC 04673) | | |
| Fund 2 ($) | $100.00 | N |
| Descriptions: No quote | | |

Misc.

| | |
|---|---|
| **Event Start Date / Time:** | 9/13/2001 12:50:00 AM AST |
| **Event End Date / Time:** | 9/13/2001 1:32:00 AM AST |
| **Contract Start Date:** | |
| **Contract End Date:** | |
| **Delivery Start Date:** | |
| **Delivery End Date:** | |
| **Anticipated Award Date:** | |
| **Payment Terms:** | Client has chosen to enable payment terms as part of pricing quotes.<br>Minimum terms have been set at 2% 10 Net 30.<br>Client has chosen to allow participants to quote payment terms. |
| **Quote Note:** | Client is willing to allow a note associated to a quote. |
| **Quote Notes Viewable:** | Client is **NOT** willing to allow participants to view each others item quote notes or event notes. |
| **Proxy Quotes:** | Client is **NOT** willing to allow proxy quotes. |
| **Matching Quote:** | Client is **NOT** willing to allow a non low quote to be matched.<br>Client is **NOT** willing to allow a low quote to be matched. |
| **Non-Quote Threshold:** | Client is willing to allow a non-quote. |
| **Quote Increase During Event** | Quote increases are **NOT** allowed. |
| **Quote Increase During Extension** | Quote increases are **NOT** allowed after the original end time. |
| **Event Review Time:** | 2 minutes |
| **Supplier Award:** | Client is willing to award the business to multiple suppliers. |
| **Event Display Type:** | Full - All participants can see all quotes. |
| **Extensions:** | If a quote is placed in the final 1 minute of the event, the event will automatically extend 2 minutes. |
| **Additional Information:** | |

Disclaimer:
The client has sole discretion in determining which supplier(s) will be awarded the business at the close of this market event. The client can base their decision on several criteria, but is not limited to the following: (1) Pricing (2) Value of additional offerings (3) Service history (4) Quality standards (5) Industry reputation, etc.

Decline Accept

Fig. 3(2)

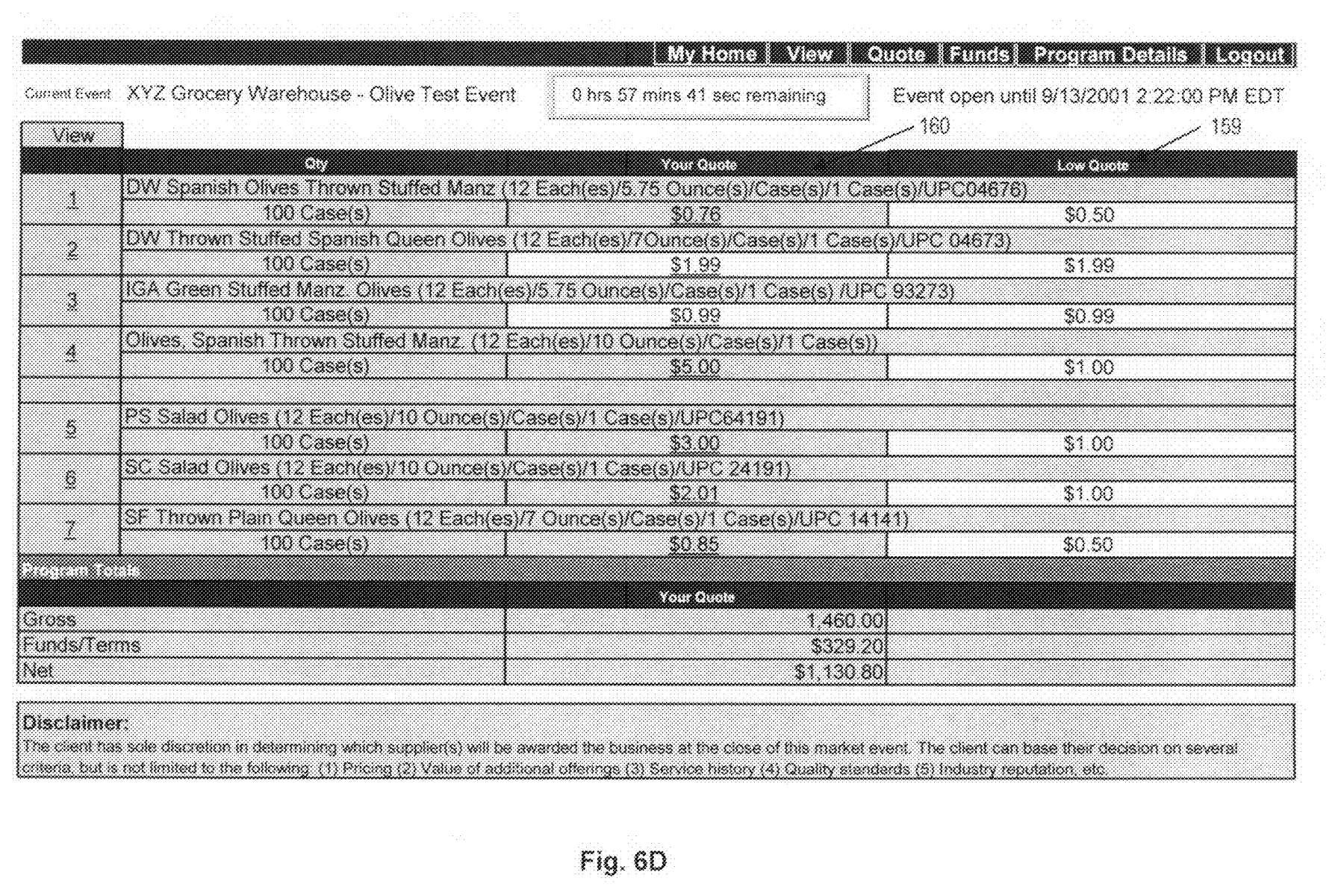

My Home | View | Quote | Funds | Program Details | Logout

Current Event XYZ Grocery Warehouse - Olive Test Event | 0 hrs 57 mins 41 sec remaining | Event open until 9/13/2001 2:22:00 PM EDT View

| | Qty | Your Quote (160) | Low Quote (159) |
|---|---|---|---|
| 1 | DW Spanish Olives Thrown Stuffed Manz (12 Each(es)/5.75 Ounce(s)/Case(s)/1 Case(s)/UPC04676) | | |
| | 100 Case(s) | $0.76 | $0.50 |
| 2 | DW Thrown Stuffed Spanish Queen Olives (12 Each(es)/7Ounce(s)/Case(s)/1 Case(s)/UPC 04673) | | |
| | 100 Case(s) | $1.99 | $1.99 |
| 3 | IGA Green Stuffed Manz. Olives (12 Each(es)/5.75 Ounce(s)/Case(s)/1 Case(s) /UPC 93273) | | |
| | 100 Case(s) | $0.99 | $0.99 |
| 4 | Olives, Spanish Thrown Stuffed Manz. (12 Each(es)/10 Ounce(s)/Case(s)/1 Case(s)) | | |
| | 100 Case(s) | $5.00 | $1.00 |
| | | | |
| 5 | PS Salad Olives (12 Each(es)/10 Ounce(s)/Case(s)/1 Case(s)/UPC64191) | | |
| | 100 Case(s) | $3.00 | $1.00 |
| 6 | SC Salad Olives (12 Each(es)/10 Ounce(s)/Case(s)/1 Case(s)/UPC 24191) | | |
| | 100 Case(s) | $2.01 | $1.00 |
| 7 | SF Thrown Plain Queen Olives (12 Each(es)/7 Ounce(s)/Case(s)/1 Case(s)/UPC 14141) | | |
| | 100 Case(s) | $0.85 | $0.50 |

Program Totals

| | Your Quote | |
|---|---|---|
| Gross | 1,460.00 | |
| Funds/Terms | $329.20 | |
| Net | $1,130.80 | |

Disclaimer:
The client has sole discretion in determining which supplier(s) will be awarded the business at the close of this market event. The client can base their decision on several criteria, but is not limited to the following: (1) Pricing (2) Value of additional offerings (3) Service history (4) Quality standards (5) Industry reputation, etc.

Fig. 6D

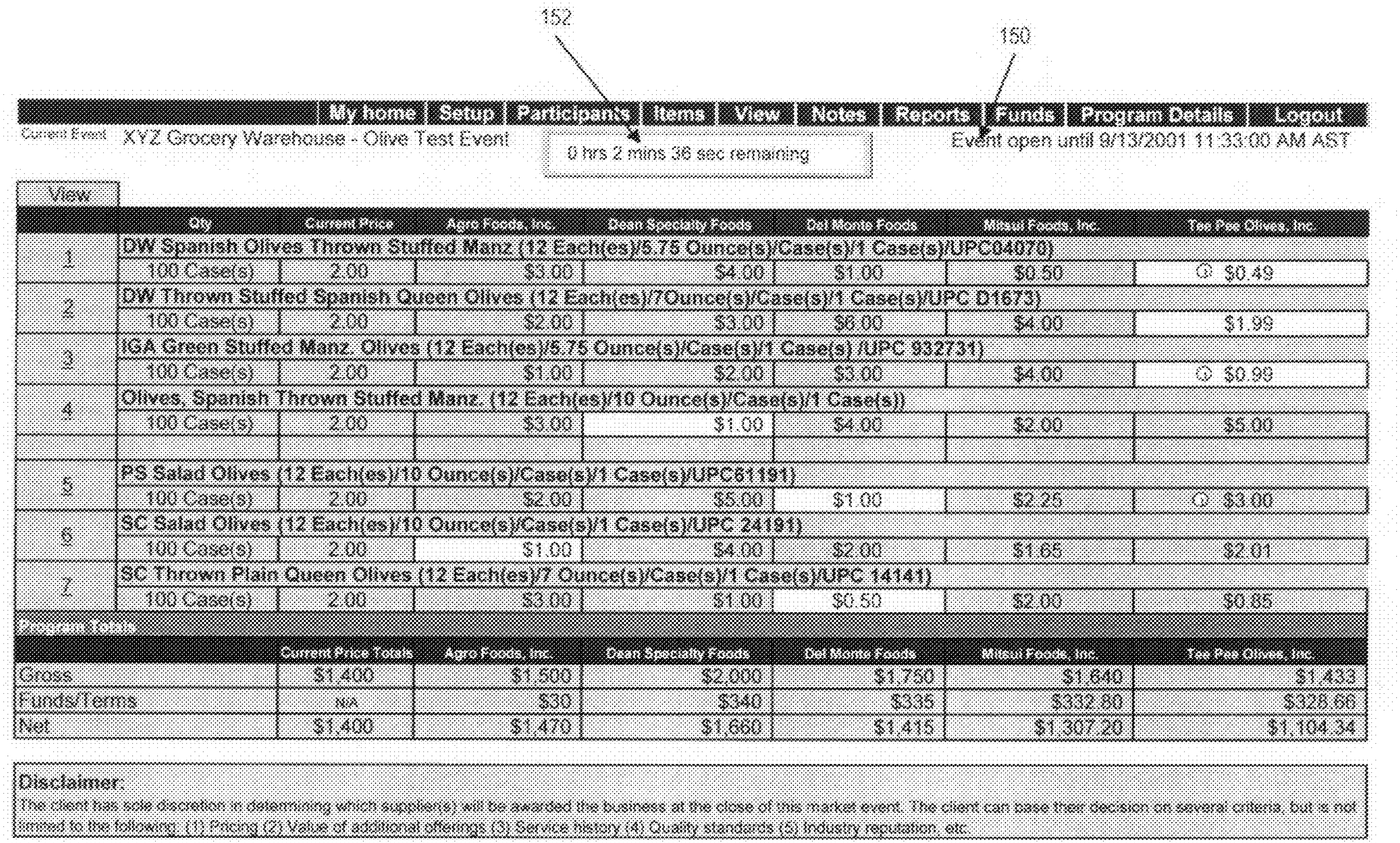

| | Qty | Current Price | Agro Foods, Inc. | Dean Specialty Foods | Del Monte Foods | Mitsui Foods, Inc. | Tee Pee Olives, Inc. |
|---|---|---|---|---|---|---|---|
| 1 | DW Spanish Olives Thrown Stuffed Manz (12 Each(es)/5.75 Ounce(s)/Case(s)/1 Case(s)/UPC04070) | | | | | | |
| | 100 Case(s) | 2.00 | $3.00 | $4.00 | $1.00 | $0.50 | $0.49 |
| 2 | DW Thrown Stuffed Spanish Queen Olives (12 Each(es)/7Ounce(s)/Case(s)/1 Case(s)/UPC D1673) | | | | | | |
| | 100 Case(s) | 2.00 | $2.00 | $3.00 | $8.00 | $4.00 | $1.99 |
| 3 | IGA Green Stuffed Manz. Olives (12 Each(es)/5.75 Ounce(s)/Case(s)/1 Case(s) /UPC 932731) | | | | | | |
| | 100 Case(s) | 2.00 | $1.00 | $2.00 | $3.00 | $4.00 | $0.99 |
| 4 | Olives, Spanish Thrown Stuffed Manz. (12 Each(es)/10 Ounce(s)/Case(s)/1 Case(s)) | | | | | | |
| | 100 Case(s) | 2.00 | $3.00 | $1.00 | $4.00 | $2.00 | $5.00 |
| | | | | | | | |
| 5 | PS Salad Olives (12 Each(es)/10 Ounce(s)/Case(s)/1 Case(s)/UPC61191) | | | | | | |
| | 100 Case(s) | 2.00 | $2.00 | $5.00 | $1.00 | $2.25 | $3.00 |
| 6 | SC Salad Olives (12 Each(es)/10 Ounce(s)/Case(s)/1 Case(s)/UPC 24191) | | | | | | |
| | 100 Case(s) | 2.00 | $1.00 | $4.00 | $2.00 | $1.65 | $2.01 |
| 7 | SC Thrown Plain Queen Olives (12 Each(es)/7 Ounce(s)/Case(s)/1 Case(s)/UPC 14141) | | | | | | |
| | 100 Case(s) | 2.00 | $3.00 | $1.00 | $0.50 | $2.00 | $0.85 |

Program Totals

| | Current Price Totals | Agro Foods, Inc. | Dean Specialty Foods | Del Monte Foods | Mitsui Foods, Inc. | Tee Pee Olives, Inc. |
|---|---|---|---|---|---|---|
| Gross | $1,400 | $1,500 | $2,000 | $1,750 | $1,640 | $1,433 |
| Funds/Terms | N/A | $30 | $340 | $335 | $332.80 | $328.66 |
| Net | $1,400 | $1,470 | $1,660 | $1,415 | $1,307.20 | $1,104.34 |

Disclaimer:
The client has sole discretion in determining which supplier(s) will be awarded the business at the close of this market event. The client can base their decision on several criteria, but is not limited to the following: (1) Pricing (2) Value of additional offerings (3) Service history (4) Quality standards (5) Industry reputation, etc.

Fig. 8A

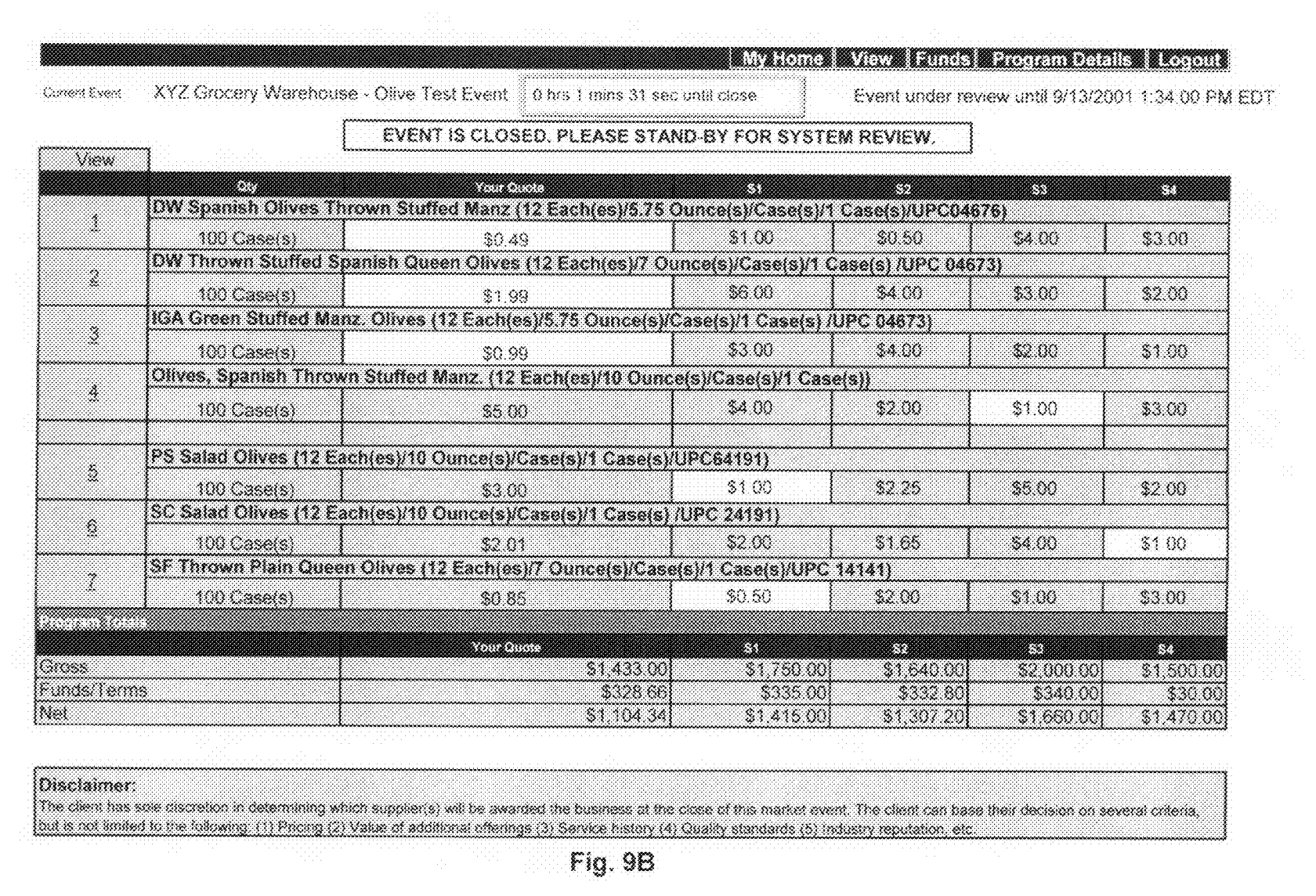

My Home | View | Funds | Program Details | Logout

Current Event XYZ Grocery Warehouse - Olive Test Event | 0 hrs 1 mins 31 sec until close | Event under review until 9/13/2001 1:34:00 PM EDT

EVENT IS CLOSED. PLEASE STAND-BY FOR SYSTEM REVIEW.

| View | Qty | Your Quote | S1 | S2 | S3 | S4 |
|---|---|---|---|---|---|---|
| 1 | DW Spanish Olives Thrown Stuffed Manz (12 Each(es)/5.75 Ounce(s)/Case(s)/1 Case(s)/UPC04676) | | | | | |
| | 100 Case(s) | $0.49 | $1.00 | $0.50 | $4.00 | $3.00 |
| 2 | DW Thrown Stuffed Spanish Queen Olives (12 Each(es)/7 Ounce(s)/Case(s)/1 Case(s) /UPC 04673) | | | | | |
| | 100 Case(s) | $1.99 | $6.00 | $4.00 | $3.00 | $2.00 |
| 3 | IGA Green Stuffed Manz. Olives (12 Each(es)/5.75 Ounce(s)/Case(s)/1 Case(s) /UPC 04673) | | | | | |
| | 100 Case(s) | $0.99 | $3.00 | $4.00 | $2.00 | $1.00 |
| 4 | Olives, Spanish Thrown Stuffed Manz. (12 Each(es)/10 Ounce(s)/Case(s)/1 Case(s)) | | | | | |
| | 100 Case(s) | $5.00 | $4.00 | $2.00 | $1.00 | $3.00 |
| | | | | | | |
| 5 | PS Salad Olives (12 Each(es)/10 Ounce(s)/Case(s)/1 Case(s)/UPC64191) | | | | | |
| | 100 Case(s) | $3.00 | $1.00 | $2.25 | $5.00 | $2.00 |
| 6 | SC Salad Olives (12 Each(es)/10 Ounce(s)/Case(s)/1 Case(s) /UPC 24191) | | | | | |
| | 100 Case(s) | $2.01 | $2.00 | $1.65 | $4.00 | $1.00 |
| 7 | SF Thrown Plain Queen Olives (12 Each(es)/7 Ounce(s)/Case(s)/1 Case(s)/UPC 14141) | | | | | |
| | 100 Case(s) | $0.85 | $0.50 | $2.00 | $1.00 | $3.00 |

Program Totals

| | Your Quote | S1 | S2 | S3 | S4 |
|---|---|---|---|---|---|
| Gross | $1,433.00 | $1,750.00 | $1,640.00 | $2,000.00 | $1,500.00 |
| Funds/Terms | $328.66 | $335.00 | $332.80 | $340.00 | $30.00 |
| Net | $1,104.34 | $1,415.00 | $1,307.20 | $1,660.00 | $1,470.00 |

Disclaimer:
The client has sole discretion in determining which supplier(s) will be awarded the business at the close of this market event. The client can base their decision on several criteria, but is not limited to the following: (1) Pricing (2) Value of additional offerings (3) Service history (4) Quality standards (5) Industry reputation, etc.

Fig. 9B

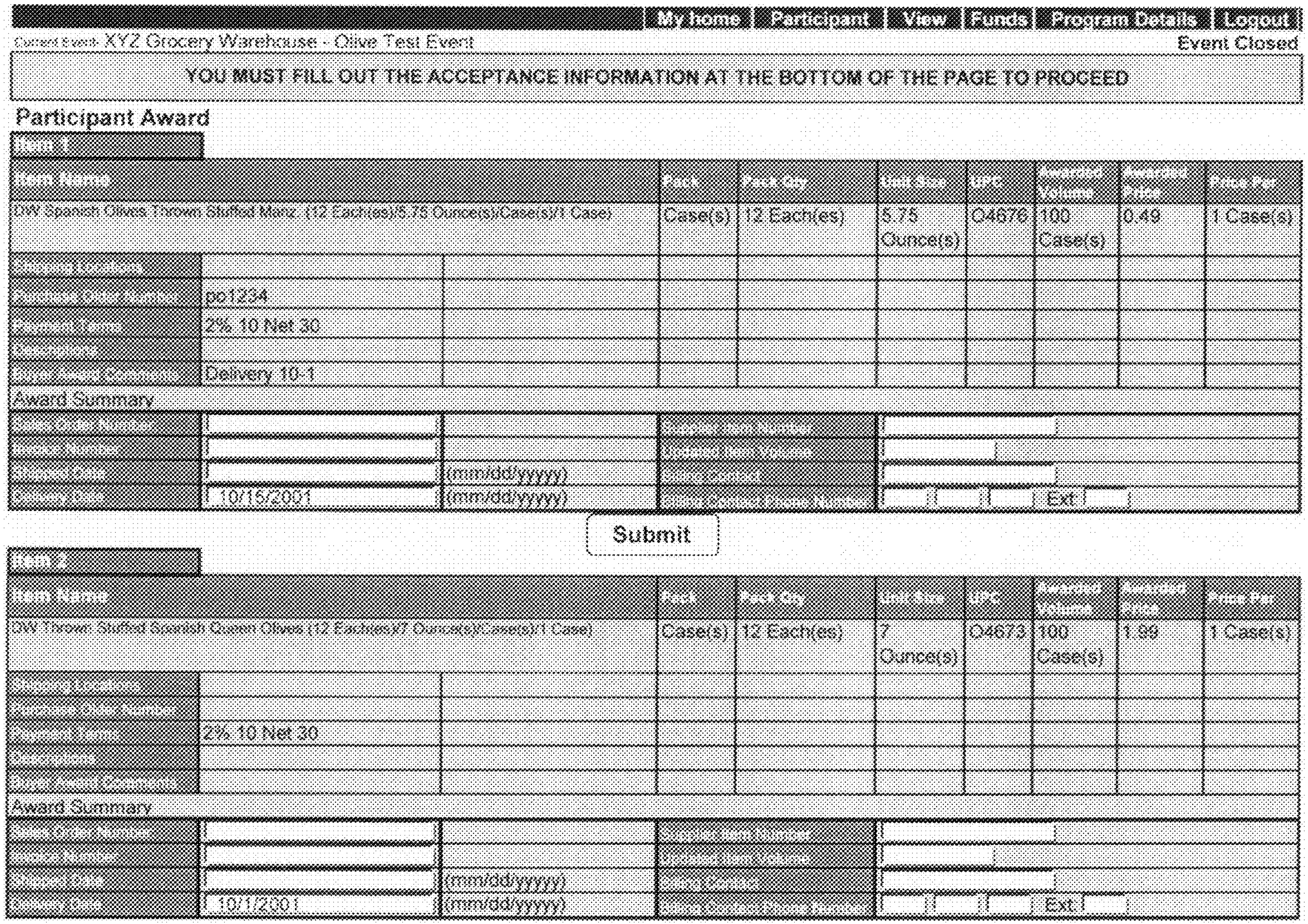
Fig. 10C(1)

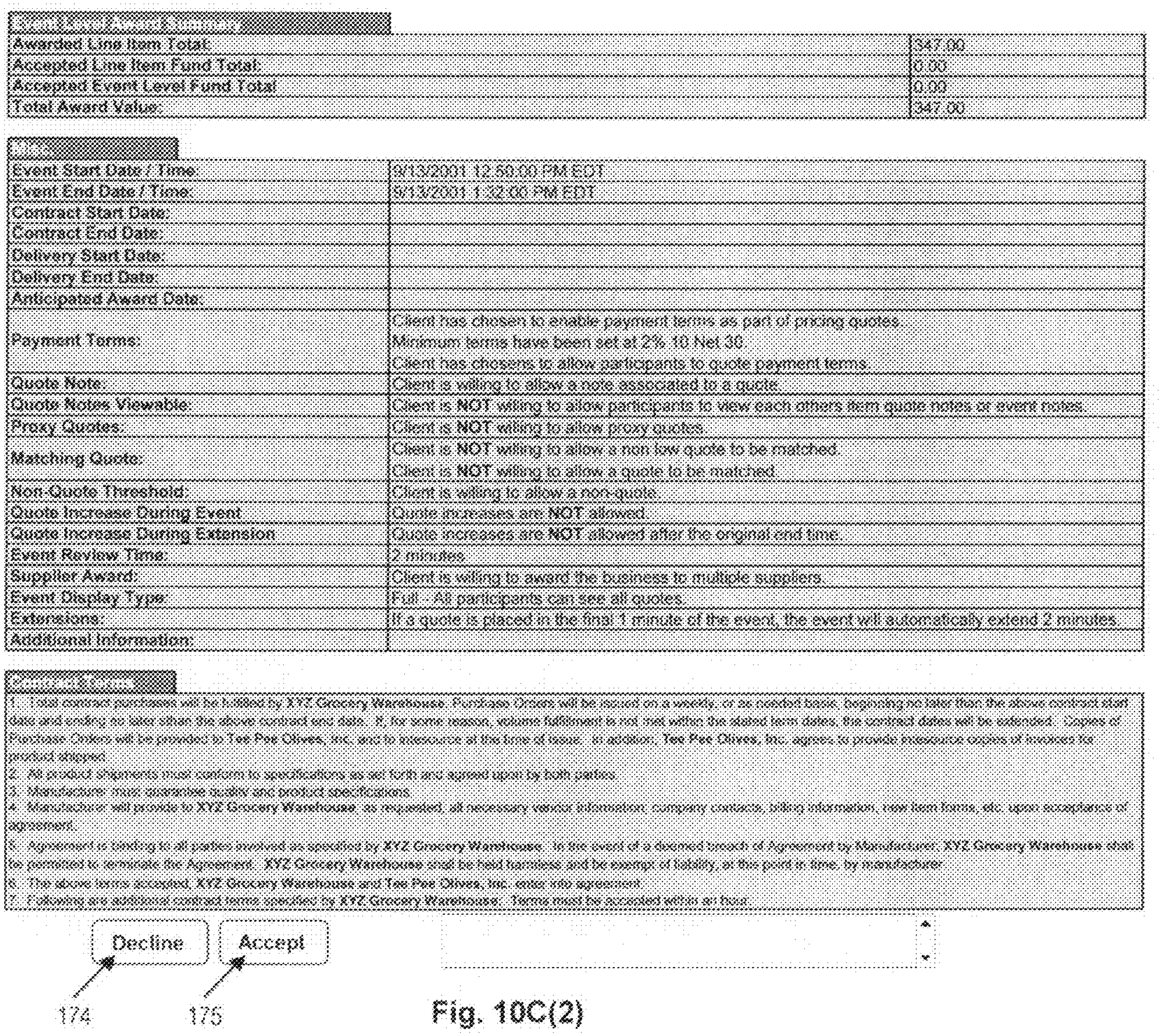
Fig. 10C(2)

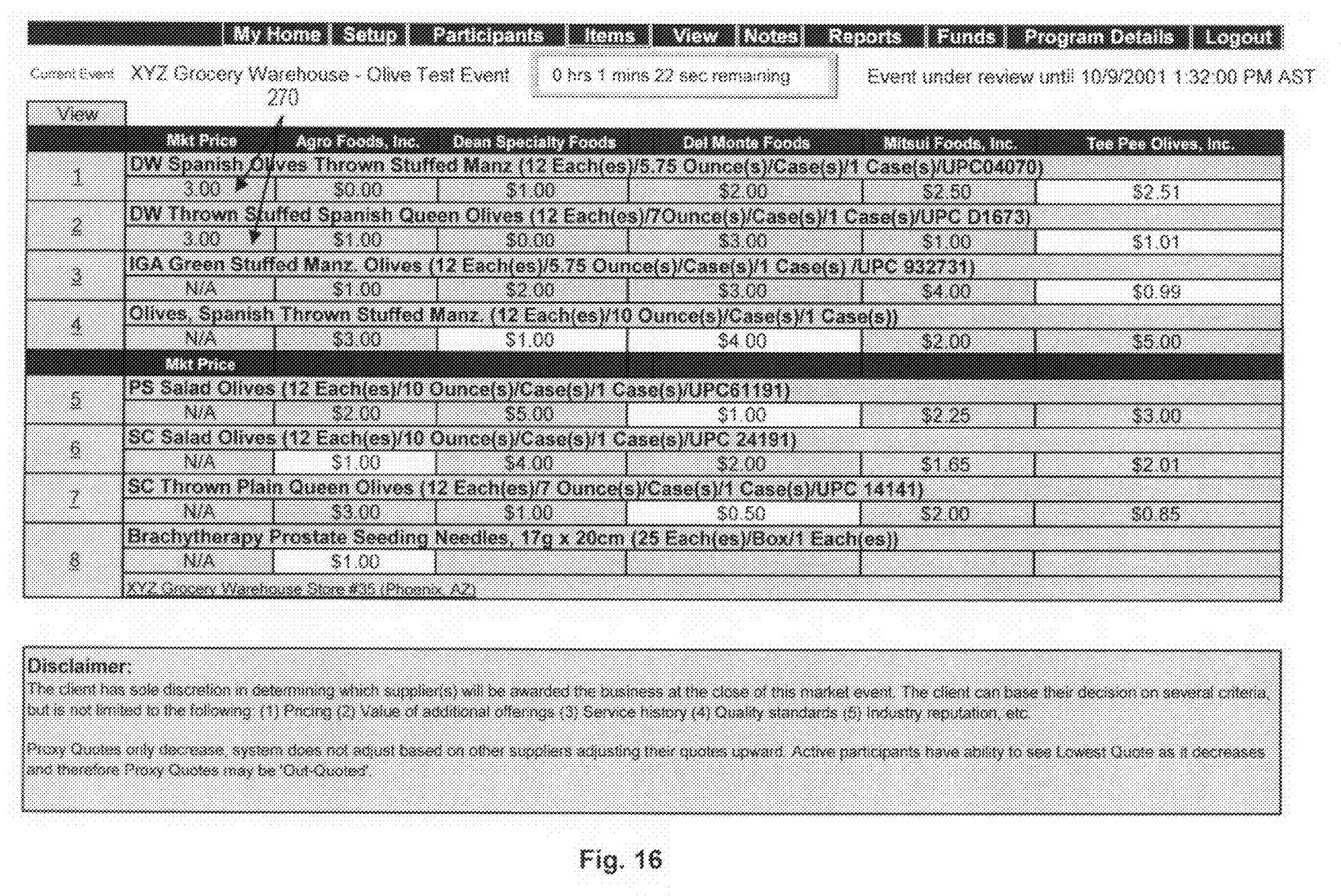

My Home | Setup | Participants | Items | View | Notes | Reports | Funds | Program Details | Logout Current Event XYZ Grocery Warehouse - Olive Test Event | 0 hrs 1 mins 22 sec remaining | Event under review until 10/9/2001 1:32:00 PM AST

270

View

| | Mkt Price | Agro Foods, Inc. | Dean Specialty Foods | Del Monte Foods | Mitsui Foods, Inc. | Tee Pee Olives, Inc. |
|---|---|---|---|---|---|---|
| 1 | DW Spanish Olives Thrown Stuffed Manz (12 Each(es)/5.75 Ounce(s)/Case(s)/1 Case(s)/UPC04070) | | | | | |
| | 3.00 | $0.00 | $1.00 | $2.00 | $2.50 | $2.51 |
| 2 | DW Thrown Stuffed Spanish Queen Olives (12 Each(es)/7Ounce(s)/Case(s)/1 Case(s)/UPC D1673) | | | | | |
| | 3.00 | $1.00 | $0.00 | $3.00 | $1.00 | $1.01 |
| 3 | IGA Green Stuffed Manz. Olives (12 Each(es)/5.75 Ounce(s)/Case(s)/1 Case(s) /UPC 932731) | | | | | |
| | N/A | $1.00 | $2.00 | $3.00 | $4.00 | $0.99 |
| 4 | Olives, Spanish Thrown Stuffed Manz. (12 Each(es)/10 Ounce(s)/Case(s)/1 Case(s)) | | | | | |
| | N/A | $3.00 | $1.00 | $4.00 | $2.00 | $5.00 |
| | Mkt Price | | | | | |
| 5 | PS Salad Olives (12 Each(es)/10 Ounce(s)/Case(s)/1 Case(s)/UPC61191) | | | | | |
| | N/A | $2.00 | $5.00 | $1.00 | $2.25 | $3.00 |
| 6 | SC Salad Olives (12 Each(es)/10 Ounce(s)/Case(s)/1 Case(s)/UPC 24191) | | | | | |
| | N/A | $1.00 | $4.00 | $2.00 | $1.65 | $2.01 |
| 7 | SC Thrown Plain Queen Olives (12 Each(es)/7 Ounce(s)/Case(s)/1 Case(s)/UPC 14141) | | | | | |
| | N/A | $3.00 | $1.00 | $0.50 | $2.00 | $0.85 |
| 8 | Brachytherapy Prostate Seeding Needles, 17g x 20cm (25 Each(es)/Box/1 Each(es)) | | | | | |
| | N/A | $1.00 | | | | |
| | XYZ Grocery Warehouse Store #35 (Phoenix, AZ) | | | | | |

Disclaimer:

The client has sole discretion in determining which supplier(s) will be awarded the business at the close of this market event. The client can base their decision on several criteria, but is not limited to the following: (1) Pricing (2) Value of additional offerings (3) Service history (4) Quality standards (5) Industry reputation, etc.

Proxy Quotes only decrease, system does not adjust based on other suppliers adjusting their quotes upward. Active participants have ability to see Lowest Quote as it decreases and therefore Proxy Quotes may be 'Out-Quoted'.

Fig. 16

| | | |
|---|---|---|
| Fig. 18A | Fig. 18C | Fig. 18E |
| Fig. 18B | Fig. 18D | Fig. 18F |

Fig. 18

Negotiated Event

Create Proposal (Supplier Side)

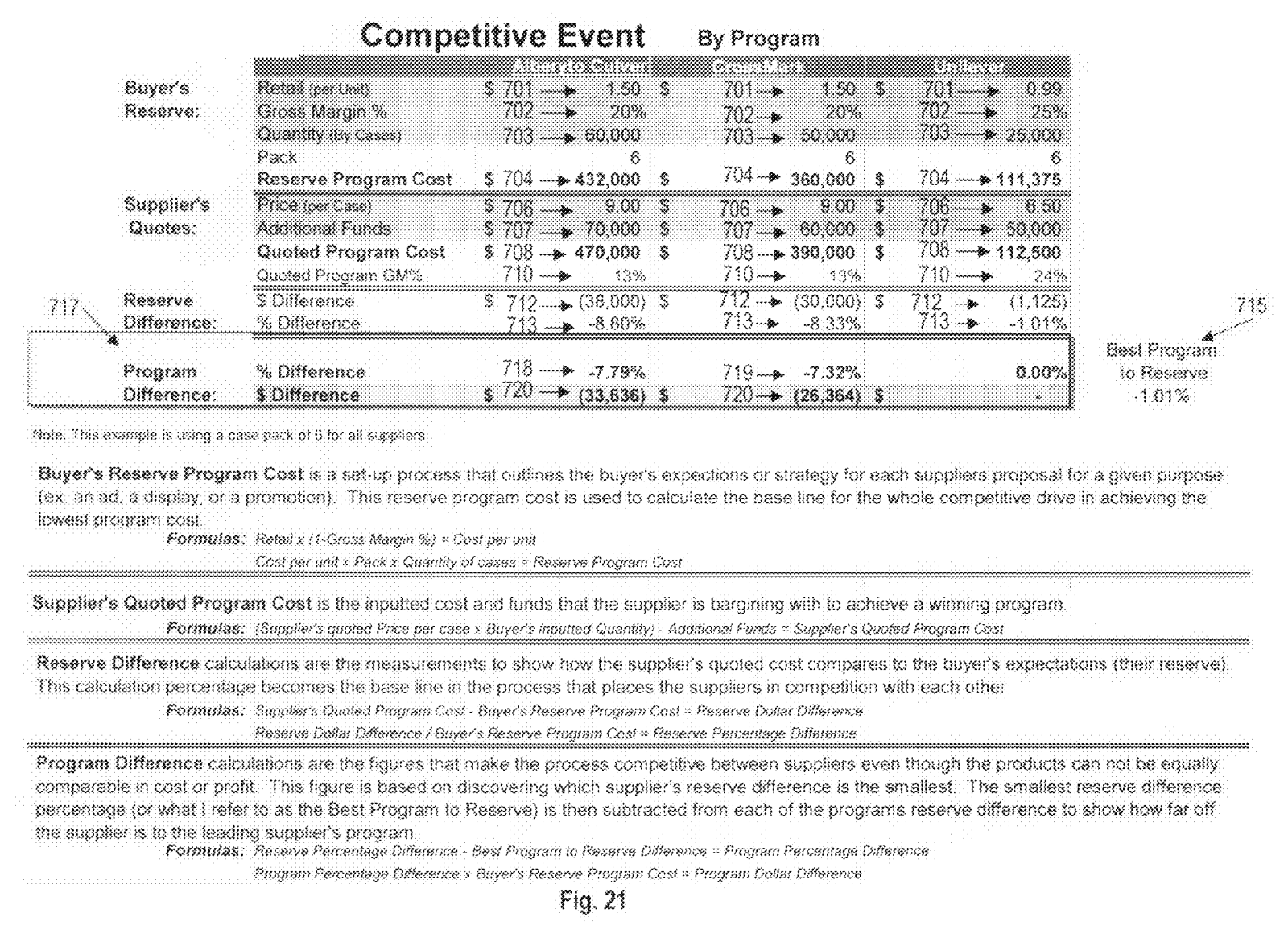

Competitive Event By Program

| | | Alberto Culver | [illegible] | Unilever |
|---|---|---|---|---|
| Buyer's Reserve: | Retail (per Unit) | $ 701 → 1.50 | $ 701 → 1.50 | $ 701 → 0.99 |
| | Gross Margin % | 702 → 20% | 702 → 20% | 702 → 25% |
| | Quantity (By Cases) | 703 → 60,000 | 703 → 50,000 | 703 → 25,000 |
| | Pack | 6 | 6 | 6 |
| | **Reserve Program Cost** | $ 704 → **432,000** | $ 704 → **360,000** | $ 704 → **111,375** |
| Supplier's Quotes: | Price (per Case) | $ 706 → 9.00 | $ 706 → 9.00 | $ 706 → 6.50 |
| | Additional Funds | $ 707 → 70,000 | $ 707 → 60,000 | $ 707 → 50,000 |
| | **Quoted Program Cost** | $ 708 → **470,000** | $ 708 → **390,000** | $ 708 → **112,500** |
| | Quoted Program GM% | 710 → 13% | 710 → 13% | 710 → 24% |
| Reserve Difference: | $ Difference | $ 712 → (38,000) | $ 712 → (30,000) | $ 712 → (1,125) |
| | % Difference | 713 → -8.80% | 713 → -8.33% | 713 → -1.01% |
| Program Difference: | **% Difference** | 718 → **-7.79%** | 719 → **-7.32%** | **0.00%** |
| | **$ Difference** | $ 720 → **(33,636)** | $ 720 → **(26,364)** | $ - |

717

715 Best Program to Reserve -1.01%

Note: This example is using a case pack of 6 for all suppliers

Buyer's Reserve Program Cost is a set-up process that outlines the buyer's expections or strategy for each suppliers proposal for a given purpose (ex. an ad, a display, or a promotion). This reserve program cost is used to calculate the base line for the whole competitive drive in achieving the lowest program cost.

Formulas: *Retail x (1-Gross Margin %) = Cost per unit*

*Cost per unit x Pack x Quantity of cases = Reserve Program Cost*

Supplier's Quoted Program Cost is the inputted cost and funds that the supplier is bargining with to achieve a winning program.

Formulas: *(Supplier's quoted Price per case x Buyer's inputted Quantity) - Additional Funds = Supplier's Quoted Program Cost*

Reserve Difference calculations are the measurements to show how the supplier's quoted cost compares to the buyer's expectations (their reserve). This calculation percentage becomes the base line in the process that places the suppliers in competition with each other.

Formulas: *Supplier's Quoted Program Cost - Buyer's Reserve Program Cost = Reserve Dollar Difference*

*Reserve Dollar Difference / Buyer's Reserve Program Cost = Reserve Percentage Difference*

Program Difference calculations are the figures that make the process competitive between suppliers even though the products can not be equally comparable in cost or profit. This figure is based on discovering which supplier's reserve difference is the smallest. The smallest reserve difference percentage (or what I refer to as the Best Program to Reserve) is then subtracted from each of the programs reserve difference to show how far off the supplier is to the leading supplier's program.

Formulas: *Reserve Percentage Difference - Best Program to Reserve Difference = Program Percentage Difference*

*Program Percentage Difference x Buyer's Reserve Program Cost = Program Dollar Difference*

Fig. 21

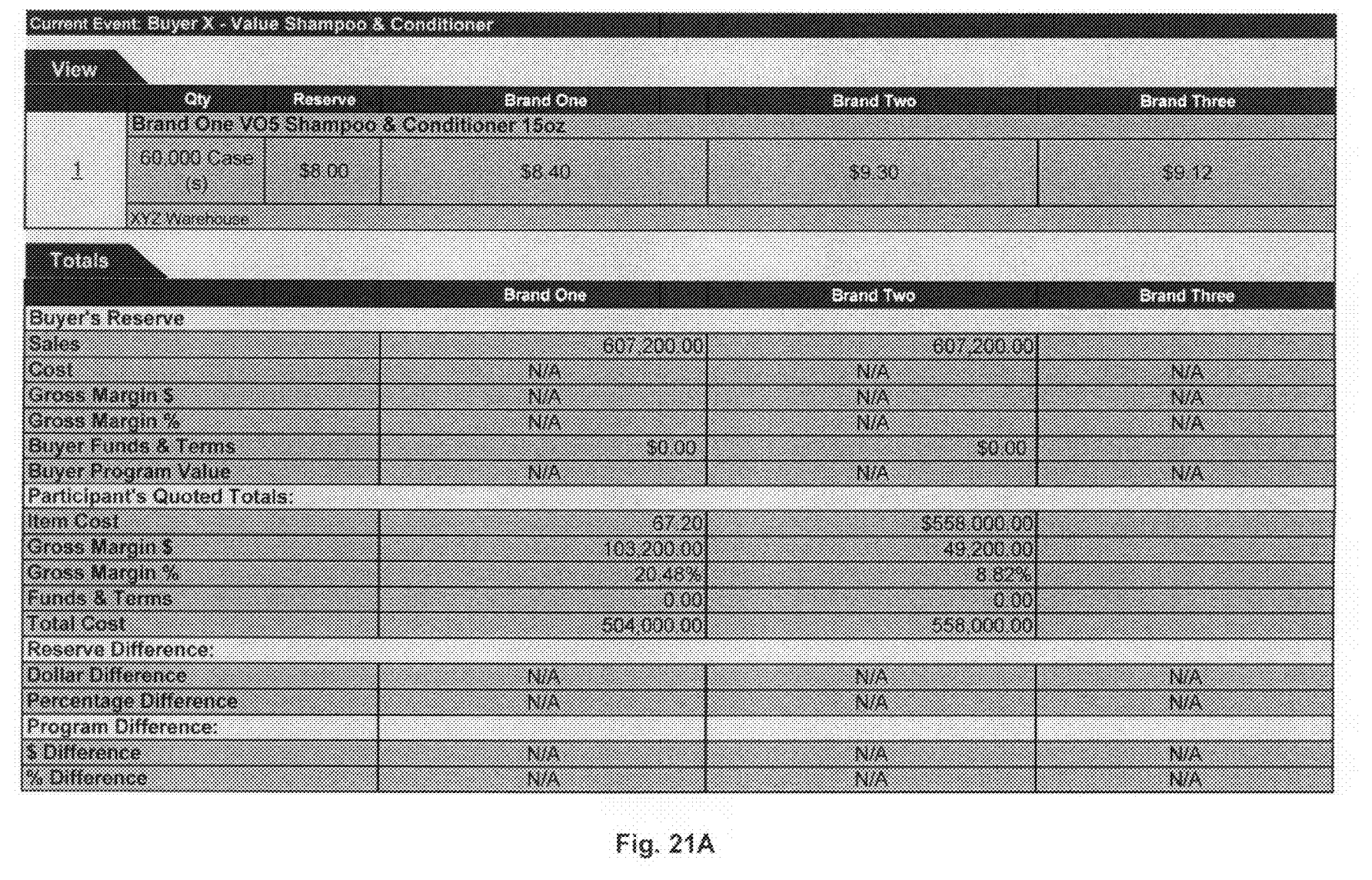

Current Event: Buyer X - Value Shampoo & Conditioner

View

| | Qty | Reserve | Brand One | Brand Two | Brand Three |
|---|---|---|---|---|---|
| 1 | Brand One VO5 Shampoo & Conditioner 15oz | | | | |
| | 60,000 Case (s) | $8.00 | $8.40 | $9.30 | $9.12 |
| | XYZ Warehouse | | | | |

Totals

| | Brand One | Brand Two | Brand Three |
|---|---|---|---|
| Buyer's Reserve | | | |
| Sales | 607,200.00 | 607,200.00 | |
| Cost | N/A | N/A | N/A |
| Gross Margin $ | N/A | N/A | N/A |
| Gross Margin % | N/A | N/A | N/A |
| Buyer Funds & Terms | $0.00 | $0.00 | |
| Buyer Program Value | N/A | N/A | N/A |
| Participant's Quoted Totals: | | | |
| Item Cost | 67.20 | $558,000.00 | |
| Gross Margin $ | 103,200.00 | 49,200.00 | |
| Gross Margin % | 20.48% | 8.82% | |
| Funds & Terms | 0.00 | 0.00 | |
| Total Cost | 504,000.00 | 558,000.00 | |
| Reserve Difference: | | | |
| Dollar Difference | N/A | N/A | N/A |
| Percentage Difference | N/A | N/A | N/A |
| Program Difference: | | | |
| $ Difference | N/A | N/A | N/A |
| % Difference | N/A | N/A | N/A |

Fig. 21A

Figure 21B:
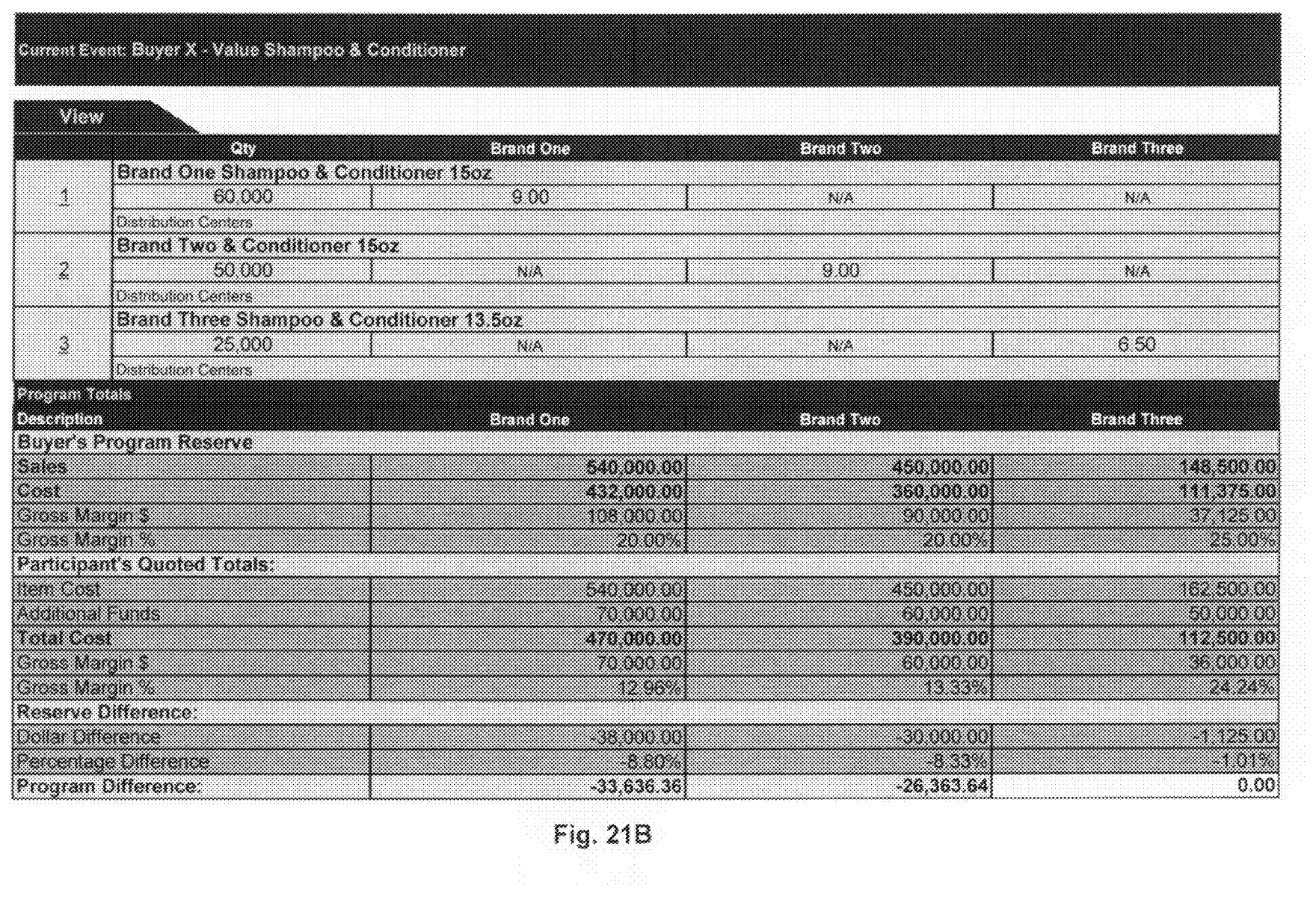

Current Event: Buyer X - Value Shampoo & Conditioner

View

| | Qty | Brand One | Brand Two | Brand Three |
|---|---|---|---|---|
| 1 | Brand One Shampoo & Conditioner 15oz | | | |
| | 60,000 | 9.00 | N/A | N/A |
| | Distribution Centers | | | |
| 2 | Brand Two & Conditioner 15oz | | | |
| | 50,000 | N/A | 9.00 | N/A |
| | Distribution Centers | | | |
| 3 | Brand Three Shampoo & Conditioner 13.5oz | | | |
| | 25,000 | N/A | N/A | 6.50 |
| | Distribution Centers | | | |

Program Totals

| Description | Brand One | Brand Two | Brand Three |
|---|---|---|---|
| **Buyer's Program Reserve** | | | |
| Sales | 540,000.00 | 450,000.00 | 148,500.00 |
| Cost | 432,000.00 | 360,000.00 | 111,375.00 |
| Gross Margin $ | 108,000.00 | 90,000.00 | 37,125.00 |
| Gross Margin % | 20.00% | 20.00% | 25.00% |
| **Participant's Quoted Totals:** | | | |
| Item Cost | 540,000.00 | 450,000.00 | 162,500.00 |
| Additional Funds | 70,000.00 | 60,000.00 | 50,000.00 |
| Total Cost | 470,000.00 | 390,000.00 | 112,500.00 |
| Gross Margin $ | 70,000.00 | 60,000.00 | 36,000.00 |
| Gross Margin % | 12.96% | 13.33% | 24.24% |
| **Reserve Difference:** | | | |
| Dollar Difference | -38,000.00 | -30,000.00 | -1,125.00 |
| Percentage Difference | -8.80% | -8.33% | -1.01% |
| Program Difference: | -33,636.36 | -26,363.64 | 0.00 |

| EVENTS | | | |
|---|---|---|---|
| EVENTID | int | <pk> | not null |
| GROUPEVENTID | int | <fk> | null |
| NAME | varchar(255) | | not null |
| HOSTUSERID | int | | not null |
| EVENTTYPE | int | | null |
| STARTDATE | datetime | | null |
| ENDDATE | datetime | | null |
| ORIGINALSTARTDATE | datetime | | null |
| ORIGINALENDDATE | datetime | | null |
| BEGINCONTRACT | datetime | | null |
| ENDCONTRACT | datetime | | null |
| ALLOWTERMS | bit | | null |
| AUCTIONTYPE | int | | null |
| ALLOWEXTENSIONS | bit | | null |
| EXTENSIONTHRESHOLD | int | | null |
| EXTENSIONTIME | int | | null |
| FEEVALUE | numeric(19,5) | | null |
| FEETYPE | int | | null |
| ALLOWDESCRIPTIONS | bit | | null |
| ADDITIONALDESCRIPTON | text | | null |
| EVENTSTATUS | int | | null |
| FEEUOMID | int | | null |
| EVENTDISPLAYTYPE | int | | null |
| ASEUSERID | int | | null |
| ASEALTUSERID | int | | null |
| SINGLESUPPLIERAWARD | bit | | null |
| ALLOWPROXYBID | bit | | null |
| ALLOWPROXYVOLUME | bit | | null |
| ALLOWGROUPBUY | bit | | null |
| EVENTCHANGED | bit | | null |
| REQUIRERSVP | bit | | null |
| NOTIFICATION | datetime | | null |
| TIMESTAMP | datetime | | null |

| EVENTITEMS | | | |
|---|---|---|---|
| EVENTIITEMID | int | <pk> | not null |
| EVENTID | int | <fk1> <i1> | not null |
| PRODUCTID | int | <fk2> <i2> | not null |
| COMPANYADDRESSID | int | <fk4> | null |
| UOMID | int | <fk3> | not null |
| DESCRIPTION | varchar(50) | | null |
| RESERVEPRICE | numeric(19,5) | | null |
| MARKETPRICE | numeric(19,5) | | null |
| QUANTITY | numeric(19,5) | | not null |
| BESTPRICE | numeric(19,5) | | null |
| BIDINC | numeric(19,5) | | null |
| LOWBIDUSERID | int | | null |
| LOWBIDAMOUNT | numeric(19,5) | | null |
| DISABLED | bit | | not null |
| NOTAWARDED | bit | | null |
| NOTAWARDEDREASON | text | | null |
| TIMESTAMP | datetime | | not null |

| USERS | | | |
|---|---|---|---|
| USERID | int | <pk> | not null |
| TIMEZONEID | int | <fk1> <i1> | null |
| COMPANYID | int | <fk2> | null |
| LOGIN | varchar(10) | | null |
| PASSWORD | varchar(50) | | null |
| SALUTATION | varchar(10) | | null |
| TITLE | varchar(50) | | null |
| FIRSTNAME | varchar(50) | | not null |
| MIDDLENAME | varchar(50) | | null |
| LASTNAME | varchar(50) | | not null |
| SUFFIX | varchar(10) | | null |
| COMPANY | varchar(255) | | not null |
| EMAIL | varchar(255) | | not null |
| URL | varchar(255) | | null |
| BROWSER | varchar(50) | | null |
| REFERRAL | varchar(50) | | null |
| NOTIFYMETHOD | int | | null |
| REGION | varchar(255) | | null |
| SHAREHOLDER | bit | | not null |
| DISABLED | bit | | not null |
| TERMSACCEPTED | bit | | not null |
| TIMESTAMP | datetime | | not null |

Fig. 24C

| PARTICIPANTS | | | | |
|---|---|---|---|---|
| PARTICIPANTID | int | <pk> | | not null |
| EVENTID | int | <fk2> | <i1,i3> | not null |
| USERID | int | <fk1> | <i2,i3> | not null |
| TYPE | int | | | not null |
| RSVP | bit | | | not null |
| REASON | text | | | null |
| ORDERID | uniqueidentifier | | | not null |
| DELETED | bit | | | not null |
| TERMSACCEPTED | bit | | | not null |
| TIMESTAMP | datetime | | | not null |

Fig. 24D

| PRODUCTS | | | |
|---|---|---|---|
| PRODUCTID | int | <pk> | not null |
| NAME | varchar(255) | | not null |
| PACKUOMID | int | | not null |
| PACKQTY | numeric(19,5) | | not null |
| BIDUOMID | int | <fk1> | not null |
| BIDQTY | numeric(19,5) | | not null |
| PACKAGEUOMID | int | <fk2> | not null |
| UPC | varchar(50) | | null |
| TIMESTAMP | datetime | | not null |

Fig. 24E

| TIMEZONES | | | |
|---|---|---|---|
| TIMEZONEID | int | <pk> | not null |
| NAME | varchar(75) | | null |
| ABBREVIATION | varchar(10) | | null |
| UTC | decimal(2) | | null |
| DAYLIGHT | bit | | not null |
| DAYLIGHTSTART | smalldatetime | | null |
| DAYLIGHTEND | smalldatetime | | null |

Fig. 24F

| ADDRESS | | | |
|---|---|---|---|
| ADDRESSID | int | <pk> | not null |
| ADDRESS | varchar(255) | | not null |
| ADDRESS2 | varchar(255) | | null |
| CITY | varchar(50) | | not null |
| STATE | varchar(50) | | not null |
| POSTALCODE | varchar(15) | | not null |
| COUNTRY | varchar(50) | | not null |

| COMPANIES | | | |
|---|---|---|---|
| COMPANYID | int | <pk> | not null |
| COMPANYNAME | varchar(255) | | not null |
| EMAIL | varchar(255) | | null |
| URL | varchar(255) | | null |
| ASCUSERID | int | | null |
| ASCALTUSTERID | int | | null |
| BILLINGCONTACT | varchar(50) | | null |
| PARENTCOMPANY | varchar(255) | | null |
| COMPANYTYPE | varchar(20) | | null |
| COMPANYREVENUE | varchar(20) | | null |
| COMPANYSIZE | varchar(20) | | null |
| TIMESTAMP | datetime | | null |

Fig. 24H

| ADDITIONALFUNDS | | | |
|---|---|---|---|
| ADDITIONALFUNDID | int | <pk> | not null |
| EVENTID | int | <fk1> <i1> | not null |
| EVENTITEMID | int | <fk2> | null |
| NAME | varchar(50) | | null |
| DESCRIPTION | varchar(255) | | null |
| TYPE | int | | not null |
| MINAMT | numeric(19,5) | | null |
| INCENTIVE | bit | | not null |
| ALLOWBIDDING | bit | | not null |
| TIMESTAMP | datetime | | not null |

| ADDITIONALFUNDSBID | | | |
|---|---|---|---|
| ADDITIONALFUNDSBID | int | <pk> | not null |
| ADDITIONALFUNDID | int | <fk> | null |
| EVENTITEMID | int | | not null |
| PARTICIPANTID | int | | not null |
| VALUE | numeric(19,5) | | not null |
| DESCRIPTION | text | | null |
| TIMESTAMP | datetime | | not null |

Fig. 24J

| ADDITIONALFUNDBIDHIST | | | | |
|---|---|---|---|---|
| ADDITIONALFUNDBIDID | int | <pk,fk> | <i> | not null |
| ADDITIONALFUNDID | int | | | null |
| EVENTITEMID | int | | | not null |
| PARTICIPANTID | int | | <i> | not null |
| VALUE | numeric(19,5) | | | not null |
| DESCRIPTION | varchar(2000) | | | null |
| TIMESTAMP | datetime | | | not null |

| ITEMBIDS | | | |
|---|---|---|---|
| PARTICIPANTID | int | <pk,fk2> | not null |
| EVENTITEMID | int | <pk,fk1> | not null |
| AMOUNT | numeric(19,5) | | not null |
| DESCRIPTION | varchar(100) | | null |
| ITEMTOTAL | numeric(19,5) | | null |
| TIMESTAMP | datetime | | not null |

Fig. 24L

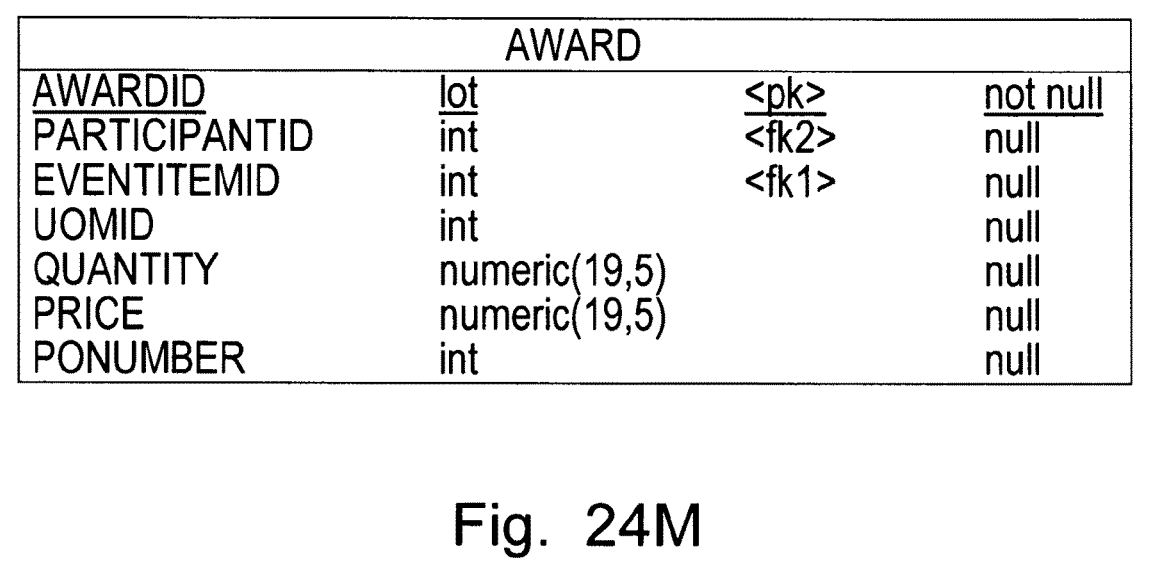

| AWARD | | | |
|---|---|---|---|
| AWARDID | lot | <pk> | not null |
| PARTICIPANTID | int | <fk2> | null |
| EVENTITEMID | int | <fk1> | null |
| UOMID | int | | null |
| QUANTITY | numeric(19,5) | | null |
| PRICE | numeric(19,5) | | null |
| PONUMBER | int | | null |

Fig. 24M

METHOD AND SYSTEM FOR ONLINE SALES AND PURCHASES

CROSS REFERENCE TO RELATED APPLICATION

This application is a division of U.S. application Ser. No. 10/399,196 filed Apr. 1, 2005 now abandoned and naming as inventors Richard J. Solar, Oren L. Davis, Mirko Predosin, Diane L. Slonaker and Richard A. Russell and having the same title as this application, which was the U.S. National stage of, and claimed priority from, an international application No. PCT/US01/32180, filed Oct. 10, 2001, naming the above five inventors, and having the same title as this invention, that international application claimed priority from the U.S. provisional application, identically entitled, No. 60/239,141, filed Oct. 10, 2000, naming as inventors Oren L. Davis, Mirko Predosin, Diane L. Slonaker and Richard A. Russell. Priority from each of the above-identified earlier-filed applications is hereby claimed. Each of the above-identified, earlier-filed applications is hereby incorporated by reference.

FIELD OF THE INVENTION

This invention relates to a system, software and method for computerized procurement, sales, or contract formation using a computer network, and more particularly to a system, software and method using the internet to establish multi-item procurement, sale or contracting events.

BACKGROUND OF THE INVENTION

For any product that can be described and priced per item, per weight or by how it is packaged, procurement has often been inefficient and time consuming for purchasers and sellers alike. This applies to retail grocery and healthcare businesses and any that regularly purchase a variety of items from various sources. Additionally, past procurement methods have not been certain to bring purchasers the best purchase terms available, or to assure sellers a reasonable opportunity to fairly compete.

Typically, in a retail business, sellers would need to schedule a meeting with a purchasing agent of a large retailer, travel to the scheduled meeting, and make offers on products with little or no knowledge of what competitive offer had been or would be made by other sellers. This practice has been inefficient, time consuming and not competitive. Sellers have been unable to react to competitive offers and purchasers have been denied the benefit of such reactive pricing.

A number of websites on the worldwide web offer auctions and reverse auctions. These permit buyers or sellers to make offers or "quote" on various posted items. The quoting often is set to close at a particular time, and a feature has been offered whereby quoting may be extended if a quote is received within an extension threshold time approaching the scheduled close.

These sites are not tailored to a particular business's procurement practices, however. They do not afford the opportunity for a business purchaser to schedule an event among recognized, qualified business suppliers, during which many items required by the business purchaser are posted by that purchaser, and suppliers are unable to quote against one another, not just on price, but on other terms important to both the selling and purchasing parties. Neither do prior sites allow for confirming a purchasing or selling activity to the business practices of the relevant business. In addition prior sites have not allowed for actual negotiation of contract terms of a negotiated contract.

SUMMARY OF THE INVENTION

In accordance with this invention, a system, software and method for computer-assisted procurement or sales of products are provided in which an internet website allows for the listing of a multiplicity of products to be sold or purchased by a seller or a purchaser. An "event" is established at which qualified buyers or sellers can visit the website to offer terms for the sale or purchase of the products listed there. The establishment of such an event includes making the website available for the posting of offers ("quotes") during an identified time period. In a purchasing event, qualified sellers are invited to offer terms of sale by posting those terms at the website in association with the items sought to be purchased, and doing so during the identified time period for the event. In a selling event buyers are similarly invited to the website to offer to purchase items listed there. In a negotiated event, negotiable purchase contract terms are posted for negotiation between buyer and seller. In a competitive branded product event, similar products of differing brands may be sought by a buyer, and sellers' proposals in response are objectively compared despite differing proposed terms.

Buying and Selling Events

The system by which the invention operates includes one or more servers, the internet-connected computers of buyers and sellers, the internet equipped computer of the company that supports the system and maintains the website and the programming of each that establishes the interactions of the buyers, sellers and company with the website and each other.

During the course of the purchasing event, software by which the system operates provides that offers by each qualified seller participating in the event are made known on the website to the other participating qualified sellers. The terms offered by the qualified sellers may be not just price, but such further important considerations as quantity discounts, contributed advertising dollars, shipping terms, payment terms, quality, scheduling of deliveries, and such other terms and conditions as may be commonly a part of a purchase contract in the particular business or industry.

The website can offer the qualified sellers the opportunity to quote on each item listed. It is able to provide for each seller to convey the additional, non-price terms with respect to each product listed or with respect to the entirety of the products sought to be purchased. In addition, the website shows a total of the prices offered by each seller and can indicate by a reduction the value of the non-price terms offer by a seller. The purchaser can buy from a qualified seller with respect to individual items or can purchase from a single seller the entirety of the items posted.

Typically, the event is scheduled in advance for a fixed period of time, but if a quote by a seller is made within the extension threshold near to the close of the event, the event is extended to allow active participants placing quotes to respond. Although the examples given here relate primarily to a purchasing event (e.g. a reverse auction), the event may also be a selling event (a traditional auction).

Purchasing events may be replenishment events. These are regularly scheduled events at which previously approved sellers quote on items designated by the purchaser from a list of regularly purchased items.

Purchasing events may also be price list events. These are replenishment events of a different kind. A list of regularly purchased products is maintained open for quotes by approved sellers. Buyers, then, have the opportunity to purchase at what they perceive as the best quote for a particular item, as needed.

Further, purchasing events may be spot buys. This event is opened to cover a pressing need for a particular item or items. That may arise from a shortage occurring because, for example, a retailer-buyer has run a sale on the particular item, because the retailer-seller wishes to extend a particularly successful promotion, or because a retailer-buyer has scheduled an ad for a particular item. The immediate need may be heightened by the buyer's inability to purchase the desired item from the buyer's usual suppliers. The spot buy event enables a spur of the moment buy to cover a real or anticipated shortage.

Where the event is a purchasing event, the event may be of several kinds. One is a market price event where the products sought to he purchased have a "going price" against which the sellers quote. In this kind of event, the quote may be plus or minus some variance from the market price. In that case, the system is able to convert this to a total price mathematically and display that to the purchaser. The second kind of event does not have a market price with respect to the items sought to be purchased, but rather the sellers quote the actual price intended on an item by item basis. In a preferred embodiment the system also provides certain improvements over the reverse auction that assists a buyer in the procurement of general merchandise items, large capital items or branded products. One such improvement aids the purchaser in evaluating the cost of money over time. Another improvement helps level the decision making process when purchasing similar products that are different brands.

The system is robust in the sense that it can accommodate variance in the unit of measure posted by a purchaser and the unit of measure on which a quote is made. For example, the desired purchase may be posted in cases and the responsive quote may be in pounds. The system can be equipped with conversion factors that will accommodate this, making the calculation of the total value of the quote so that the purchaser can readily compare quotes.

In the purchasing event, the quotes of each seller may be made known to the other sellers participating in the event, while the identities are not. Often, as with retail groceries, the events may be constrained to related foodstuffs or goods, e.g. meat, produce, paper products.

In a particular embodiment, the purchaser is able to increase or decrease the volume of goods being sought manually or have the system raise the volume base upon certain price points that are configured before the event is run by the purchaser. The automated feature is called proxy volumes. This may result, for example, from a seller having offered an attractive volume discount as a non-price term. In response to an increase or decrease in volume being sought by the purchaser, an extension of the event is provided to give sellers an opportunity to respond.

Participating sellers may increase their price offers or quote within a specified period of time as well as decrease them. This is to give inexperienced sellers the reassurance that it is possible to correct an error in pricing.

The integrity of the scheduled event is maintained by validation processes. Buyers and sellers must register and login at the website. A publicly available registration page or pages is afforded. There the registrant acquires the login number (or word) and password. At the login, the registrant enters his or her login number and password at a login page. These are checked for validity, and if valid, the registrant's account is cross-checked against a list of disabled accounts. If the account has not been disabled, a cookie is placed on the registrant's machine. With the cookie a file is provided on the registrant's machine. The file provided contains the classification of the registrant, i.e. buyer, seller or power buyer, qualifications for particular events and other information particular to the registrant. The cookie identifies the registrant by a code unique to that registrant, and it also identifies the time zone of the registrant. Thereafter, all times will be shown to the registrant in the applicable time for that registrant's time zone.

From this point, the registrant can move to the registrant's home page. Based upon the role of the registrant, there are three different home pages. If the registrant is an "administrator" of the system (e.g. one employed by the company operating the system) then that registrant gets a listing of events that the registrant is administering. If the registrant is a "power buyer" of the system then that registrant is empowered to administer (or "host") his or her own events and gets a listing of events that they are hosting. If the registrant is a buyer or seller in the system (i.e. participants that do not administer events) then that registrant gets a listing of events that they may participate in. Only an administrator from the administrator's home page can update any user or company profile, add or update products or product categories. Administrators can also update or create events, see events that have not yet run, see events that are pending award, see events that have not yet been scheduled, see events for contracts that are coming due and see a full calendar of events to be run on the system. From their home pages power buyers have only the ability to update events that they created or create events for their companies, see their events that have not yet run, see their events that are pending award, see their events that have not yet been scheduled, see their events for contracts that are coming due, and see a full calendar of events that are associated with their company. From their home page buyers and sellers have access to events in which they have been invited to participate or which are being administered for them by an administrator.

The participation in an event by a buyer or seller is initiated by either an administrator or power buyer when creating an event from an event setup page. From this page the user can send invitations to prospective participants, send "thank you for participation" messages or "thank you and award notification" via email or fax. Once an invitation is sent to prospective participants, they can either click on a link in the email or logon to the website and from their home pages enter the program details page for that event. The program details page summarizes all details related to the event and allows a participant to accept or decline participation in the event. The details will include: all items and item descriptions, additional funds and/or terms, samples, and all event options chosen by the host purchaser of the event. If one accepts, then one will continue to have access to the event. If one declines the event, then the event will be removed from one's home page.

With each new page that a registrant moves to, two types of authentication take place. First, user authentication verifies that the current user is logged in and validated. Second, event participant authentication verifies that the current user is a valid event participant and that he or she has the necessary permissions to the various event pages such as "quote view page," "quote/note pages," or "funds/terms pages." These verifications are made checking the content of the cookie left during login. If no cookie exists, the user is entitled only to publicly accessible pages of the website. These include the homepage, registration page and login page.

There are several varying degrees of access login depending on the role(s) associated with the user. In addition to the buyers, sellers, power buyers and administrators employed by the company that maintains the system and provides the website, these include shareholders of the company and brokers empowered to submit quotes for others. During user authentication, if the user has logged in previously and has a cookie, the users id (GUID) and time zone is determined. If the session is still open, i.e. timeout has not occurred, then the user is allowed access to any requested page for which that user is qualified based upon the user's GUID.

Event authentication ensues if the user requests access to an event. Information concerning the event is retrieved, and it is determined whether the event has been disabled, i.e. cancelled or postponed. If not, it is determined whether the user is authorized for the event. If the user has been authorized, it is determined whether the user has been disabled, and if that is not the case, whether the user has accepted an invitation to the event (RSVP'd). User disablement may occur by virtue of a user failing to after a quote over a determined period or if the user's quote is not within a specified amount above or below the then-best quote ("a tolerance"). If a user has RSVP'd, the quote view page is displayed to the user who may then submit a quote. The quote view page shown to a qualified user lists the items that the buyer seeks to purchase. Terms required by the buyer may be posted. In the case of a market price type of event, the market price is given. Shipping locations may also appear if the buyer desires quotes to be delivered pricing.

The internal administrator, mentioned above, is permitted access to all pages and all events. On the other hand, a power buyer may change any detail of the particular event for which he or she is responsible. By comparison, buyers for whom a reverse auction event is administered by an administrator are permitted only to see events for which they are registered. Like power buyers, these buyers have the ability to determine which participants will be allowed to make offers. They can bring up a list of sellers who have RSVP'd and signal their acceptance of particular sellers.

A quote view page is regularly updated as new quotes are made, the lowest quote in each category may be highlighted. With each quote, authentication again occurs. It is determined whether the participant is qualified or has been disabled. It is further determined whether the event is still open. A check is made to see if the item has associated with it a reserve price, which is to say, a minimum quote that will he accepted in the case of an auction and a maximum quote in the case of a reverse auction. The system also determines whether the event has been established as a regular or a reverse auction. It is further determined whether the particular item being quote upon has a quote increment, an amount by which a quote must vary from a previous low or high quote depending on the type of auction. In the case where there is a quote increment, it is determined whether the quote is an even multiple of that increment. If so, in the case of a market priced item, conversion is made to indicate the market price plus the quote (the total price).

Other features of the system include determination of the extended price at a particular quote, quantity or "unit of measure" conversions as previously mentioned, an indication of the time remaining to the close of an event, five different levels of transparency and many other features described below. By "levels of transparency" is meant the set up of a page to show more or less information such as "full view" of quotes and quoters, low quote without color ranking, low quote only, "blind" (without competitive information), etc. When the system and method is used for traditional auctions, rather than reverse auctions, a seller is the event originator and administrator. A participant can be a seller in one instance and a buyer in another. This is useful when a participant who is ordinarily a purchaser has overstocked an item.

The system and method is conducive to the establishment of such business rules as are already in place in a particular trade, or that may desirably be implemented for better proceedings. For example, a quote within a predetermined "threshold" time before the time set for the close of quoting may result in an extension to give active participants placing quotes a chance to respond. In this situation, further rules can be implemented that participants placing quotes who have not placed a quote or have not placed n quote within a specified tolerance for an item a prior to a configurable time period are disabled from further participation in the event.

Upon the closing of an event a host buyer or administrator can choose which sellers will be chosen to provide the specified item from the event from the view award page. Subsequent to the awarding business the host buyer or administrator can adjust item volumes or pricing and add in additional purchase information (i.e. PO number, comments, etc. . . . ). Once the award information is completed the host buyer or administrator has the ability to send system generated notification to the sellers that were awarded business from the event. The notification can be sent via email or fax. If it is sent via email the seller can then click on a link in the email which will allow the seller to logon and go to the participant award page. On the participant award page the seller can view the buyer awarded information, enter their invoice number, sales order number, update volumes and accept the award online. The system will then send a message to the host buyer and administrator notifying them of the completion of the award process.

Negotiated Events

In a negotiated event the user places a contract out for responsive quotes by setting out proposed terms or "parameters." Items to be bought or sold are identified and invitations are sent to desired participants.

An invited participant gains admittance to the process by accepting, first, the event details and then accepting the initiating user's terms and conditions. Using the website page provided, an invited participant then submits his or her proposed terms, pricing, and contributed funds such as advertising contribution or volume discounts.

The initiating user then is provided an analysis web page at which the various proposals he or she has received can be viewed side-by-side for comparison. Proposed contributed funds can be categorized and compared by category. Various contingencies ("what if scenarios") may be run. Negotiation with a responding user is enabled. If desired that user can be shown the proposals of others or just the contributed funds of others. The initiating user allows the responding user to open its proposal for changes, and a contract may then be awarded.

Competitive Branded Products Events

In one preferred embodiment, the system and method of the invention facilitates a buyer's choice between competitive branded products. This is done by affording a basis for comparing supplier's proposals. An objective comparison is afforded even though such terms as price, quantity, and additional funds may differ among the proposals. The system compares the gross margin that would result from a seller's proposal with the gross margin that would be achieved under the buyer's proposed terms. Dollar and percentage differences are shown. A comparison between sellers proposals is made based on how each proposal differs from each of the buyer's proposals.

The systems and methods provided in each of the above-described events benefit the buyer by:

a. Enhancing buyer-supplier communication;

b. Providing a more time-efficient negotiation process;

c. Assisting in making quicker, better-informed decisions; and d. Showing real-time market information.

The same systems and methods benefit the supplier by:

a. Providing low cost, high volume sales opportunities;

b. Providing an opportunity for a broader customer sales base;

c. Through transparency, exposing partial or full visibility of competitors' responses, providing important market information; and d. Shortening negotiation processes and quicker purchasing decisions.

The above and further objects and advantages of the invention will be better understood from the following detailed description of a preferred embodiment taken in consideration with the accompanying drawings.

DESCRIPTION OF DRAWINGS

FIG. 6D is an illustration of a further participating seller's subsequent quote view page for the same event as FIGS. 6A-6C after the event has begun with a low quote only view;

FIG. 8A is an illustration of a further, administrator, buyer or power buyer's quote view page for the same event as FIGS. 6A-7, during an extension;

FIG. 9B is an illustration of a further responding seller's quote view page for the same event as FIGS. 6A-9A, during the review period;

FIG. 10C is an illustration the seller award page for the event of FIGS. 6-10B;

FIG. 16 is an illustration of an administrator, buyer or power buyer's quote view page for a market price event similar to the event of FIGS. 6A-10B;

FIG. 18 is a guide to the relationship of FIGS. 18A-F;

FIG. 21 is an illustration of the quote view page for a branded product event;

FIG. 21A is an illustration of a administrator, buyer or power buyer's quote view page for a competitive brand event;

FIG. 21B is an illustration of a seller's quote view page for a competitive brand event;

FIGS. 24A-M are more listings of contents of data blocks in the data model of FIGS. 18A-F as identified in FIGS. 18A-F.

DETAILED DESCRIPTION OF PREFERRED EMBODIMENT

Initially, one desiring to participate in an event according to the present invention is asked to complete a registration page available from the systems website. Typical information requested may include a login id (this may be assigned), a desired password, name, title, organization, address (actual and email), time zone, billing address, phone number(s), fax number(s), and categories. A listing of categories may characteristically be made available for the user's assistance. Default settings are made, unless overridden Following registration, and after a participant has been given a login id and password, the user is shown to a simple login page (not shown) and proceeds as indicated at 101 in FIG. 1. Once the user's id and password have been entered at the login page, the validity of these is checked at 103 and at 104 (FIG. 1), the determination is made whether the user's account has been disabled. If either the id or password is invalid, or if in fact, the account has been disabled, then an error is displayed to the user as indicated at 105.

On the other hand, if the id and password have been determined to be valid and the account is not disabled, then the server with which the user is in communication generates a cookie which is placed on the user's machine. This constitutes a global unique identifier (GUID), a 128-bit number unique to this particular user, and which identifies the user as well as the user's time zone offset and time zone abbreviation. The time zone offset and time zone abbreviation are used subsequently, so that in all further communications the user's time zone time is that which appears on all subsequent pages. At this time a file is established in the user's machine. Here the user's classification as administrator, buyer, seller or power buyer is recorded along with other authorizations of the user as may pertain. Cookie placement and file establishment of this kind are well understood procedures.

Figure 3:
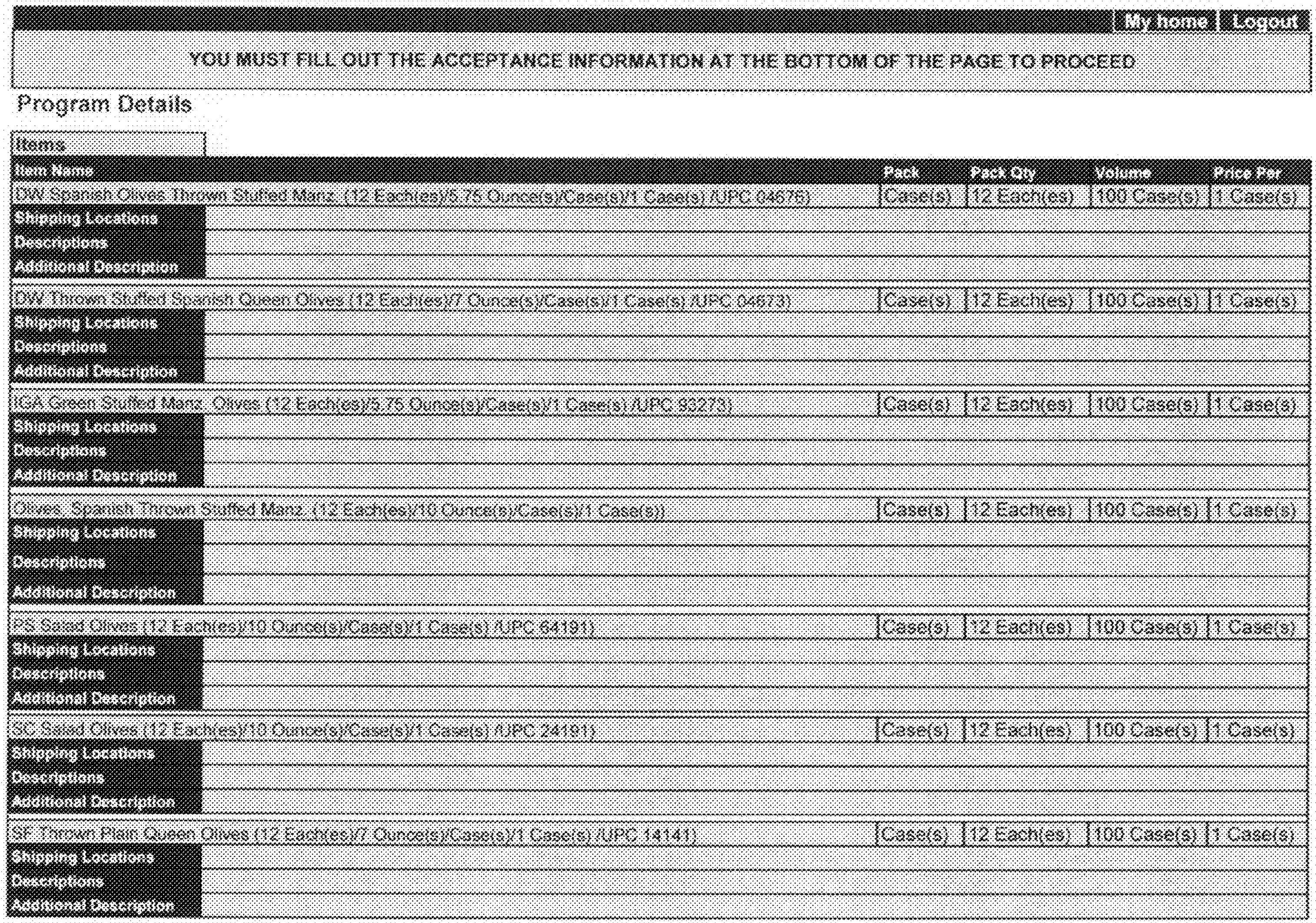
FIG. 3 is an illustration of a program details page for a participating seller.

The user then proceeds to their home page 108. This page, as illustrated in FIG. 3, lists at 109 all of the upcoming events for which this user is qualified. (In the exemplary FIG. 3, only one event, a training event, appears.) The beginning and ending dates and times for each event are shown and an event status column is entitled "Status" in FIG. 3. Only upcoming events and events that have an end date within the past 14 days are displayed on the buyer/seller home page 108 of FIG. 3. Internal administrators can view all events on their home pages as shown in FIG. 3A at 108'. Event power buyers see on their home pages events they are hosting or events for their company as illustrated at 108" of FIG. 3B. If the event is not a regularly occurring replenishment event, prior to an event starting, the event organizer, whether a power buyer or an administrator, can invite sellers to participate in an event. Event participants, i.e., responding buyers or sellers, will receive a notification to respond to the invite by reviewing the program details of the event shown in FIG. 3D. They are not allowed into the actual event until they have responded to the invite and accepted it on the program details page, FIG. 3D.

If the event is a replenishment event that is repeated at regularly scheduled times, then the responding sellers will be pre selected and will be able to participate ill each replenishment event as it arises.

Figure 22:
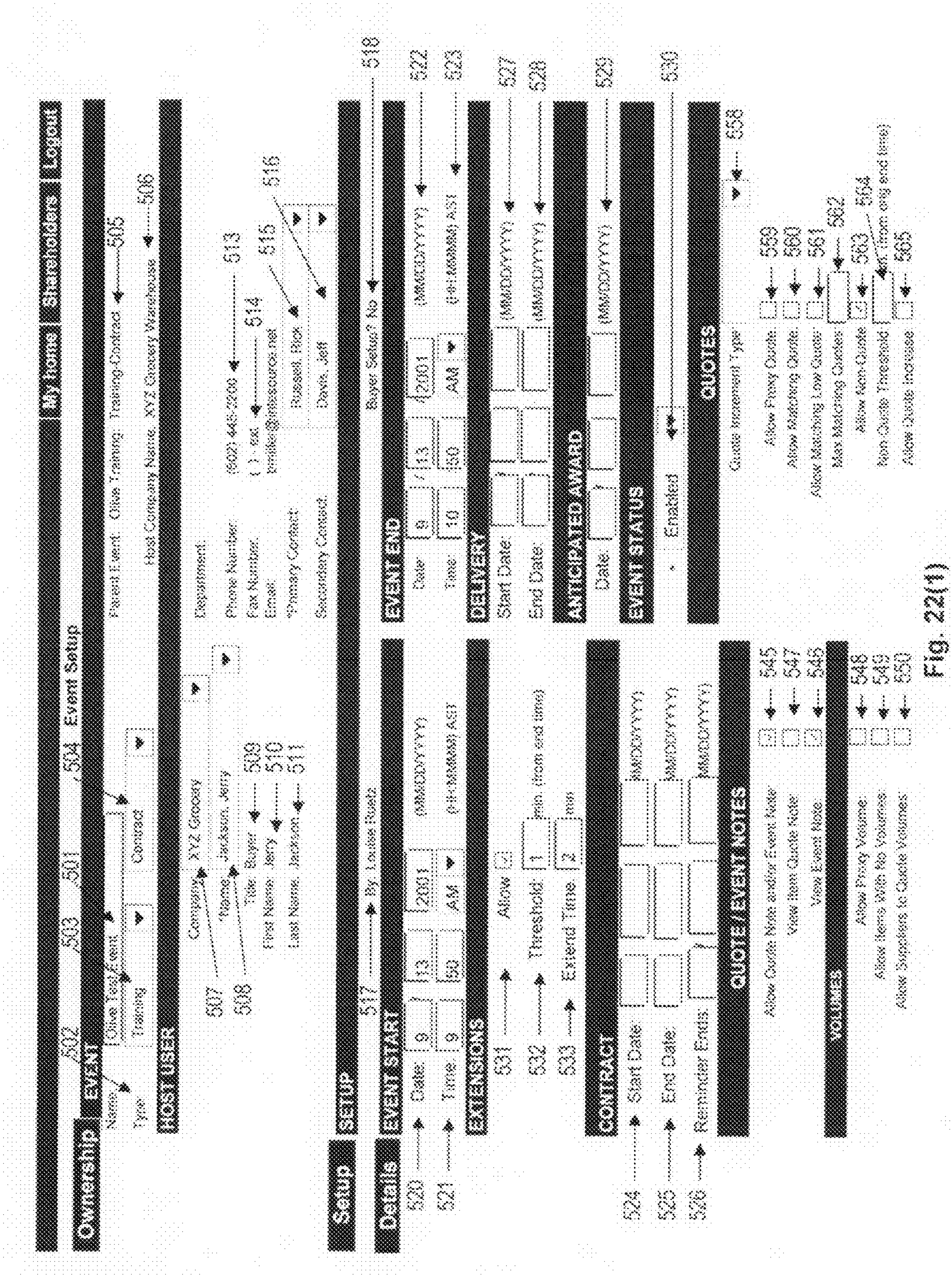
FIG. 22 is an illustration of the event setup page.
Figure 22:
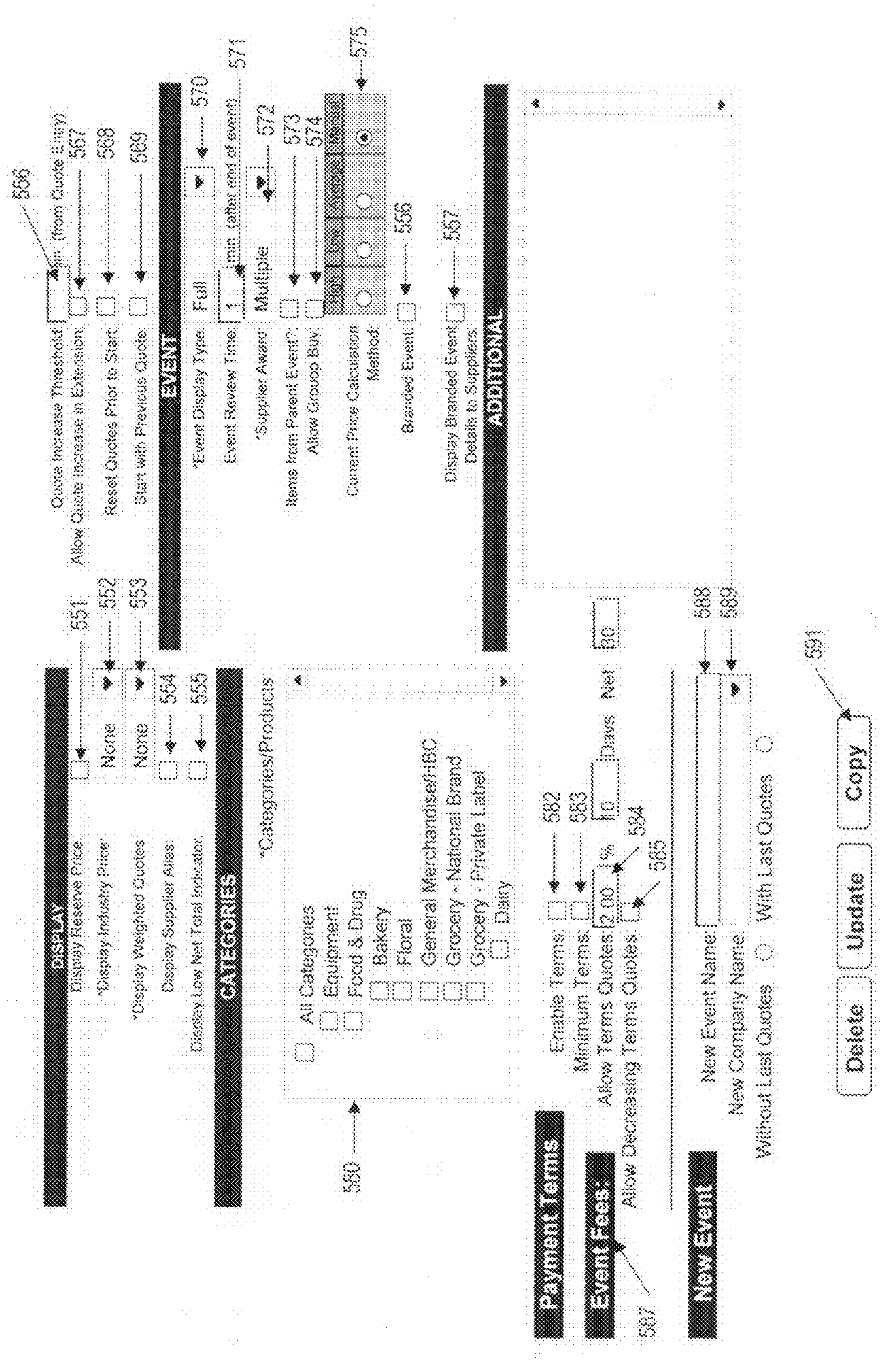
Figure 23:
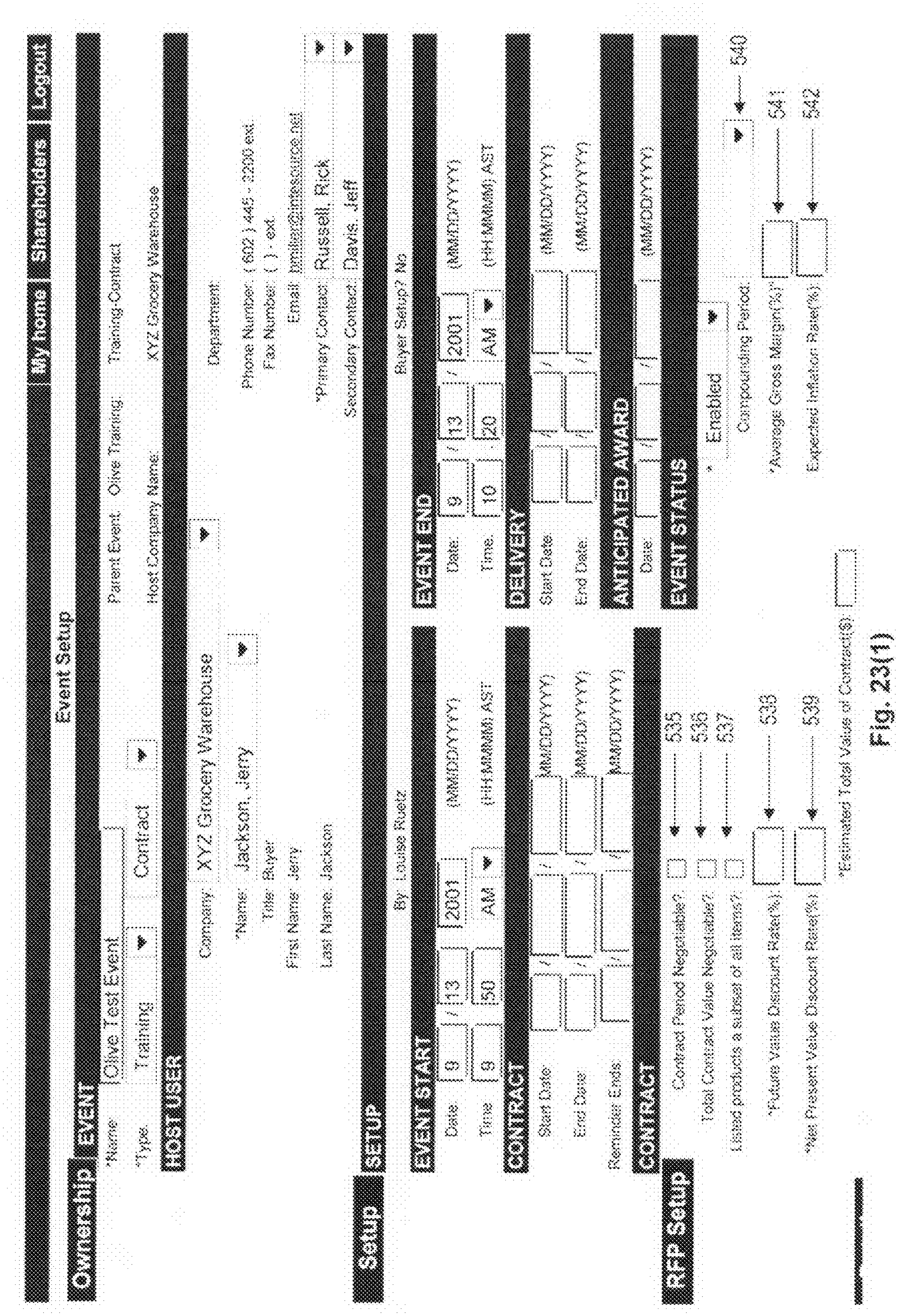
FIG. 23 is an illustration of the event setup page with negotiated event options.
Figure 23:
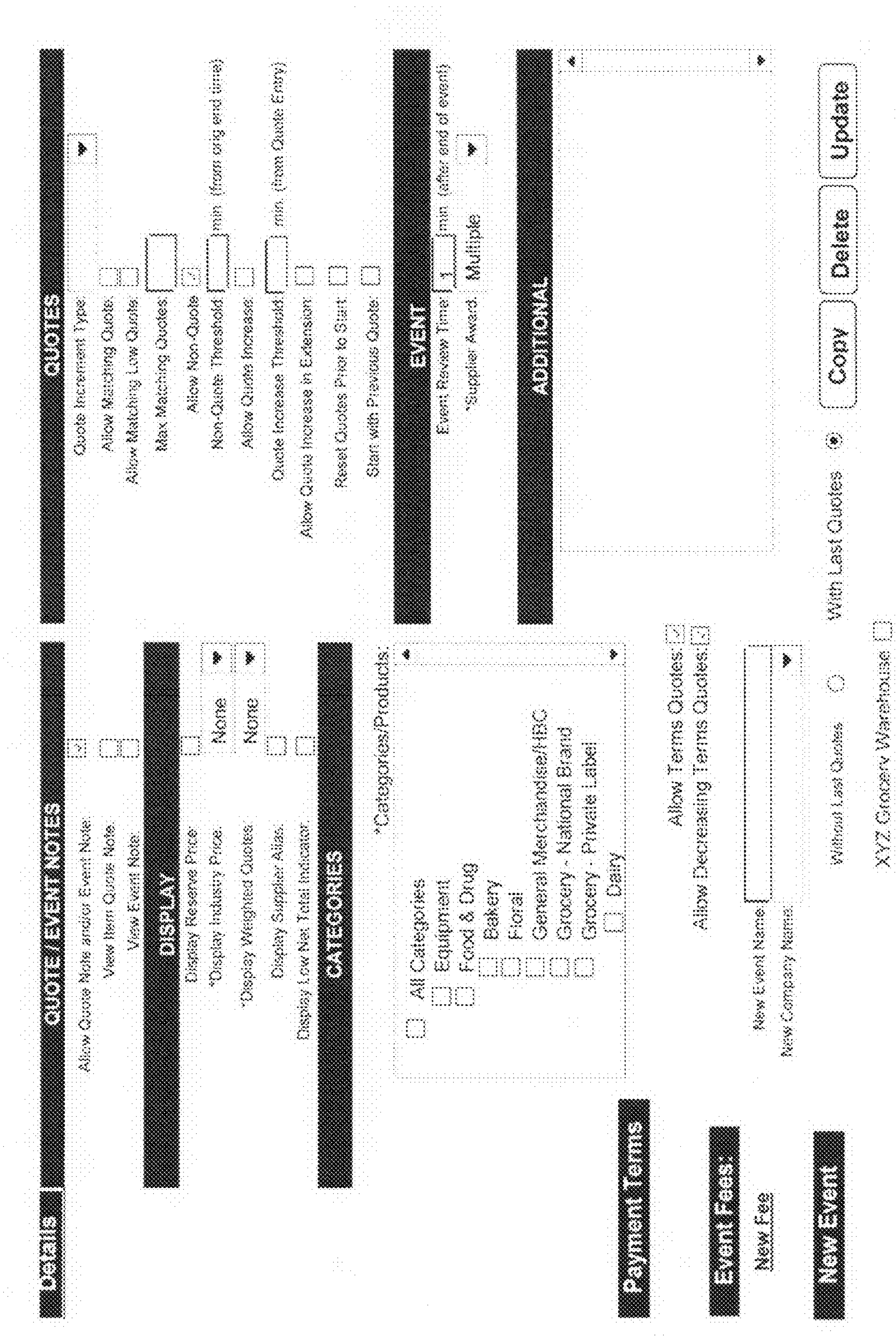

As seen in FIG. 3D, the exemplary event here is an olive-purchasing event. The program details of the page shown in FIG. 3D include descriptions and packaging sizes of the items sought, event start and stop times, and a listing of event details set by a power buyer or by an administrator for a buyer as described more fully below in connection with FIGS. 22 and 23.

Figure 1:
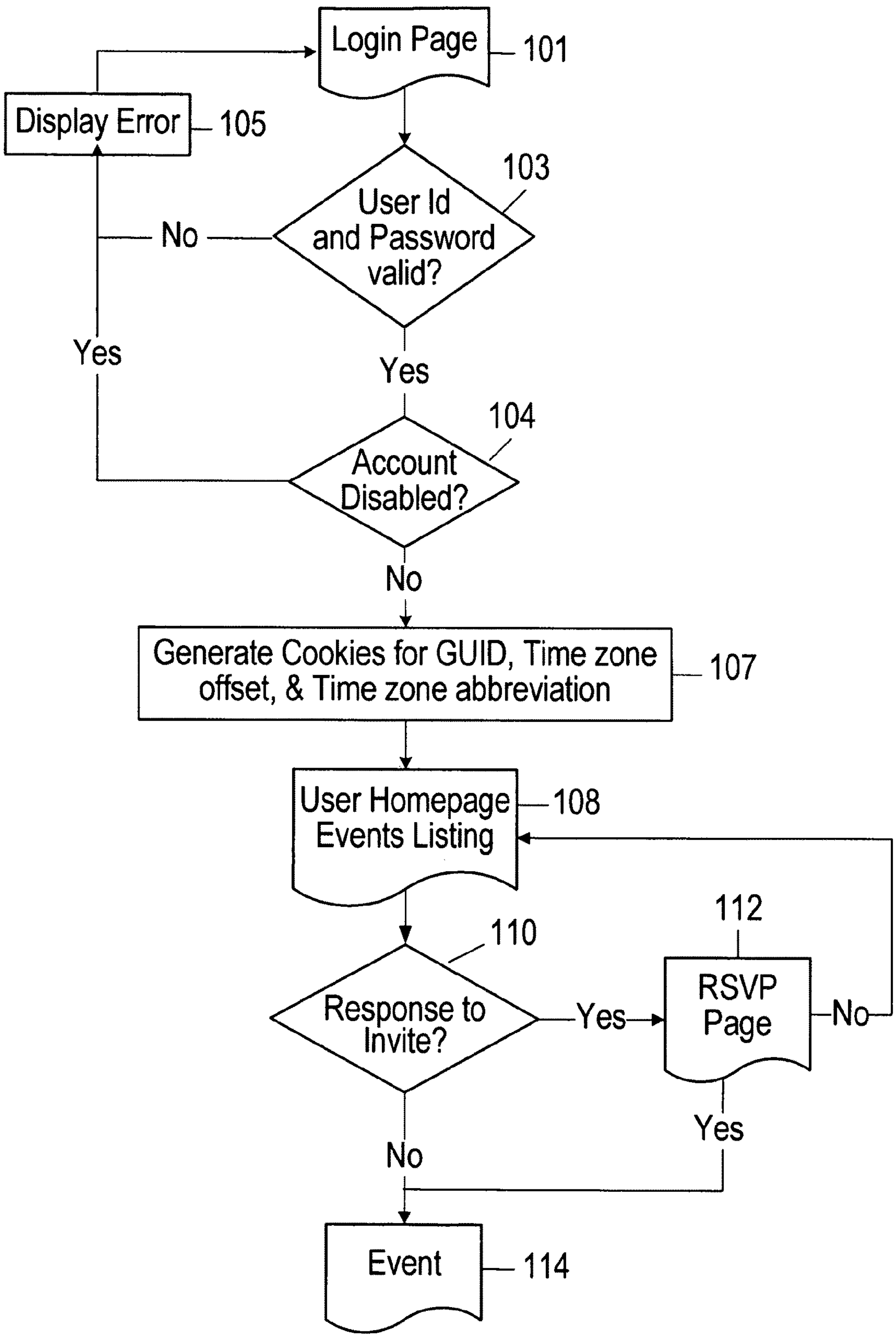
FIG. 1 is a flowchart representing a login validation routine.
Figure 2A:
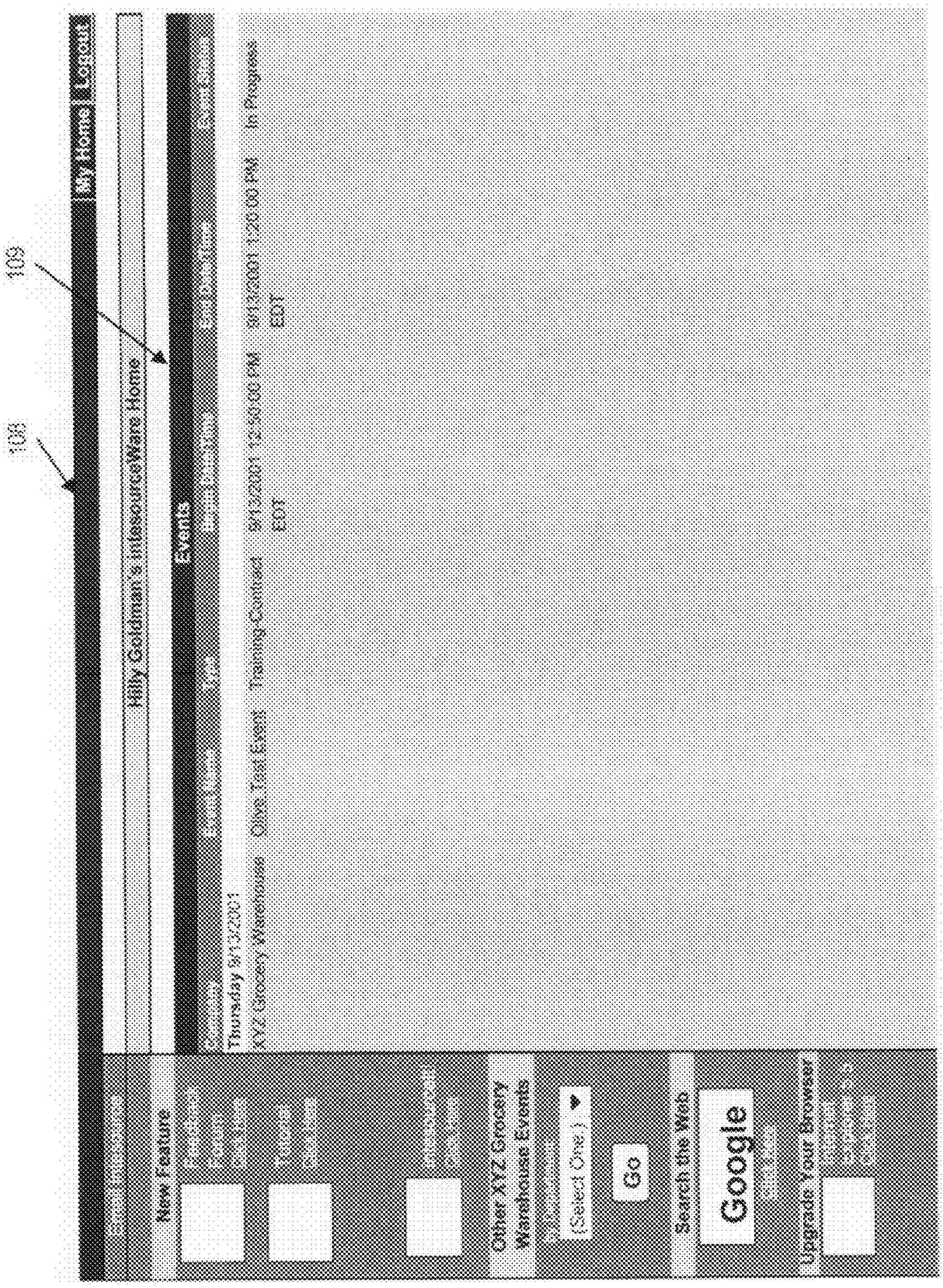
FIG. 2A is an illustration of an event listings page for a participating seller.
Figure 2B:
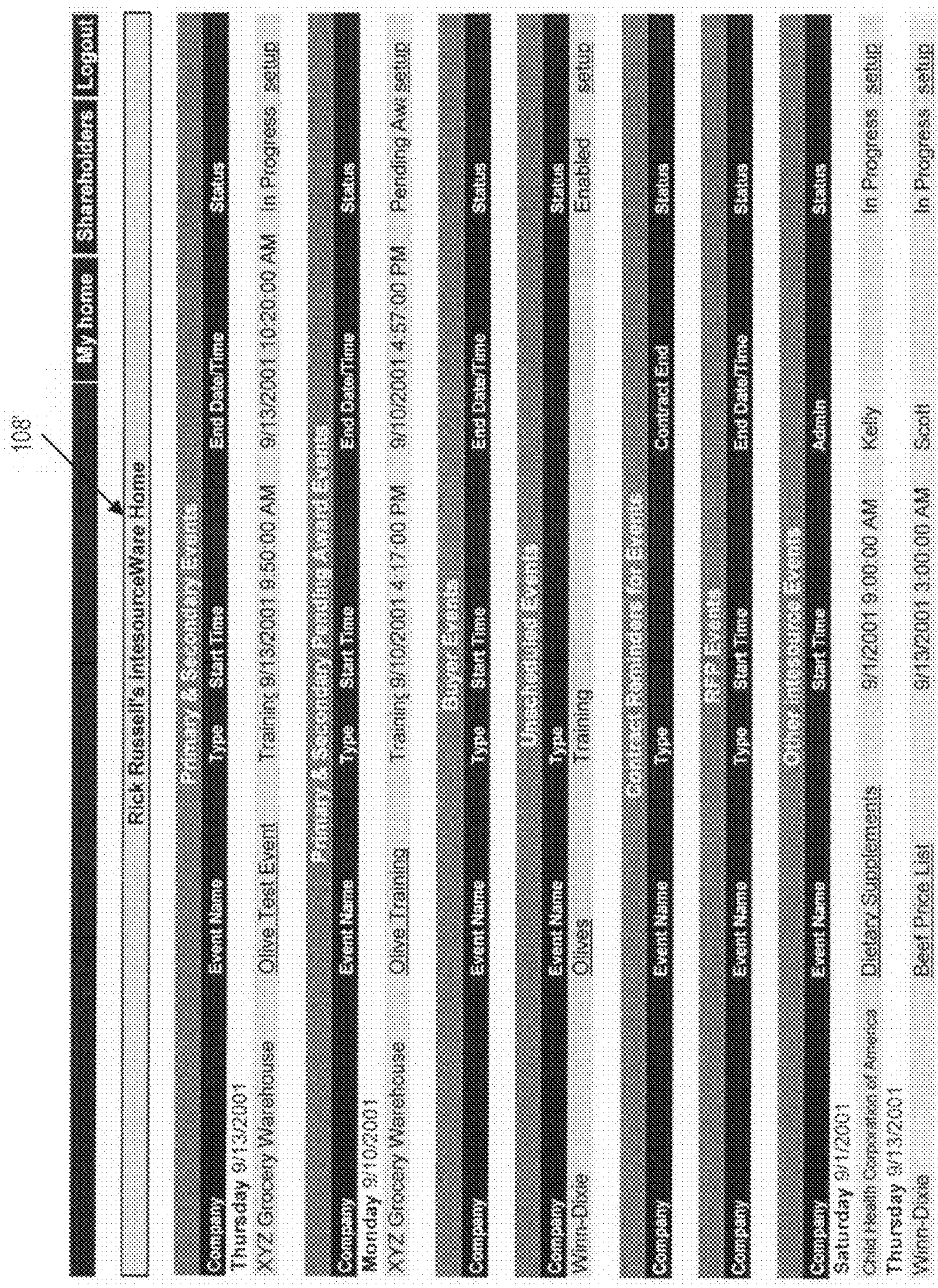
FIG. 2B is an illustration of an event listings page for an administrator.
Figure 2C:
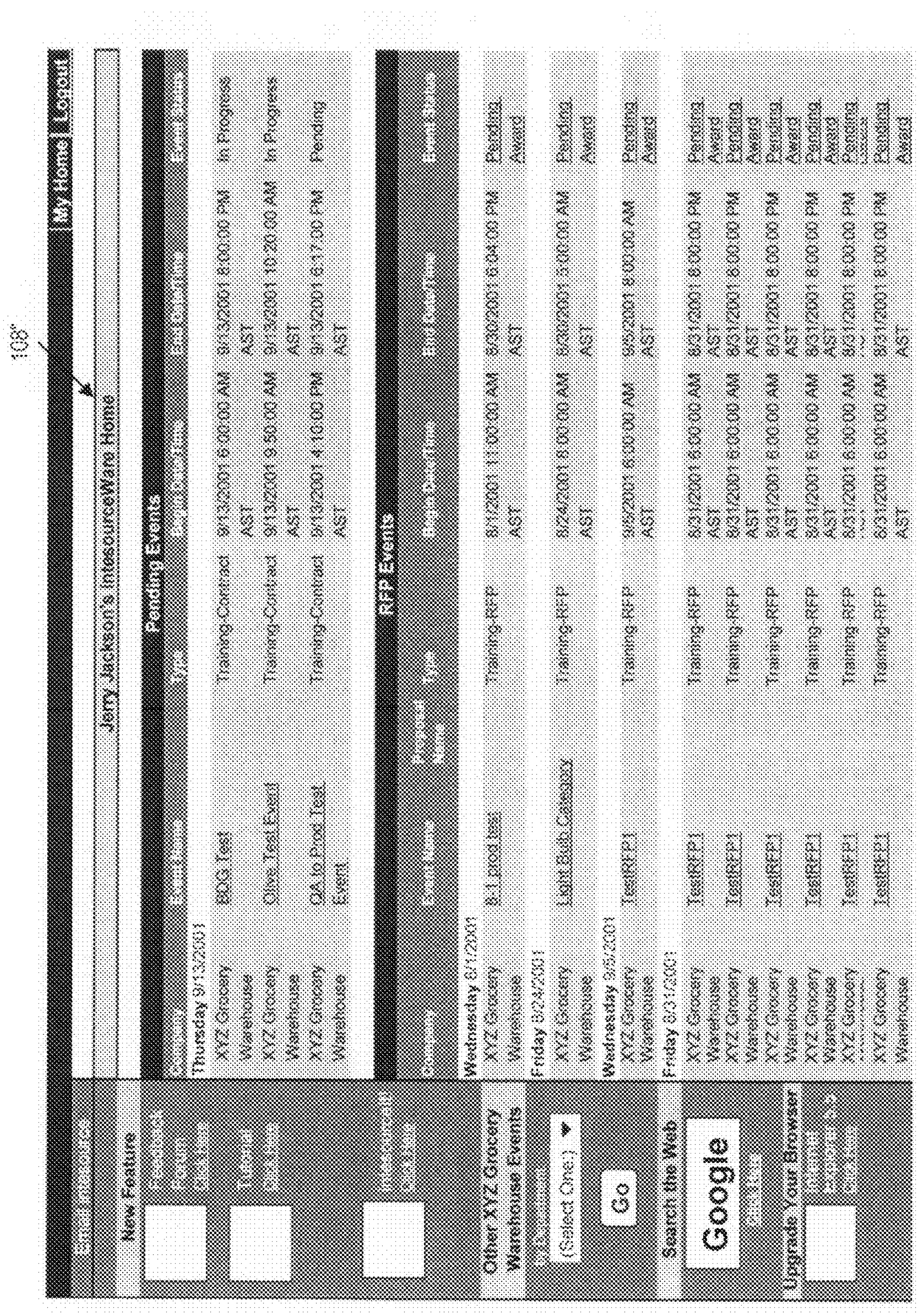
FIG. 2C is an illustration of an event listings page for a power buyer.

Returning to the flowchart of FIG. 1, when a supplier chooses an event from the events listing page at 108 the determination is made at 110 whether they have accepted the invitation to participate. If the answer is yes, the user is permitted access to the event at 114. Likewise, if at 110, it is determined that the user does not need to accept the invitation, for example because such a response has already been made in the case of replenishments event types, then the user is moved at 114 to the event.

At every new page, authentication takes place. Additionally, event level authentication takes place for pages that display event information. User authentication is a general authentication, whereby the user is recognized as a qualified user of the website. Event participation is more specific and determines that the user is qualified to participate in the particular event.

Figure 4:
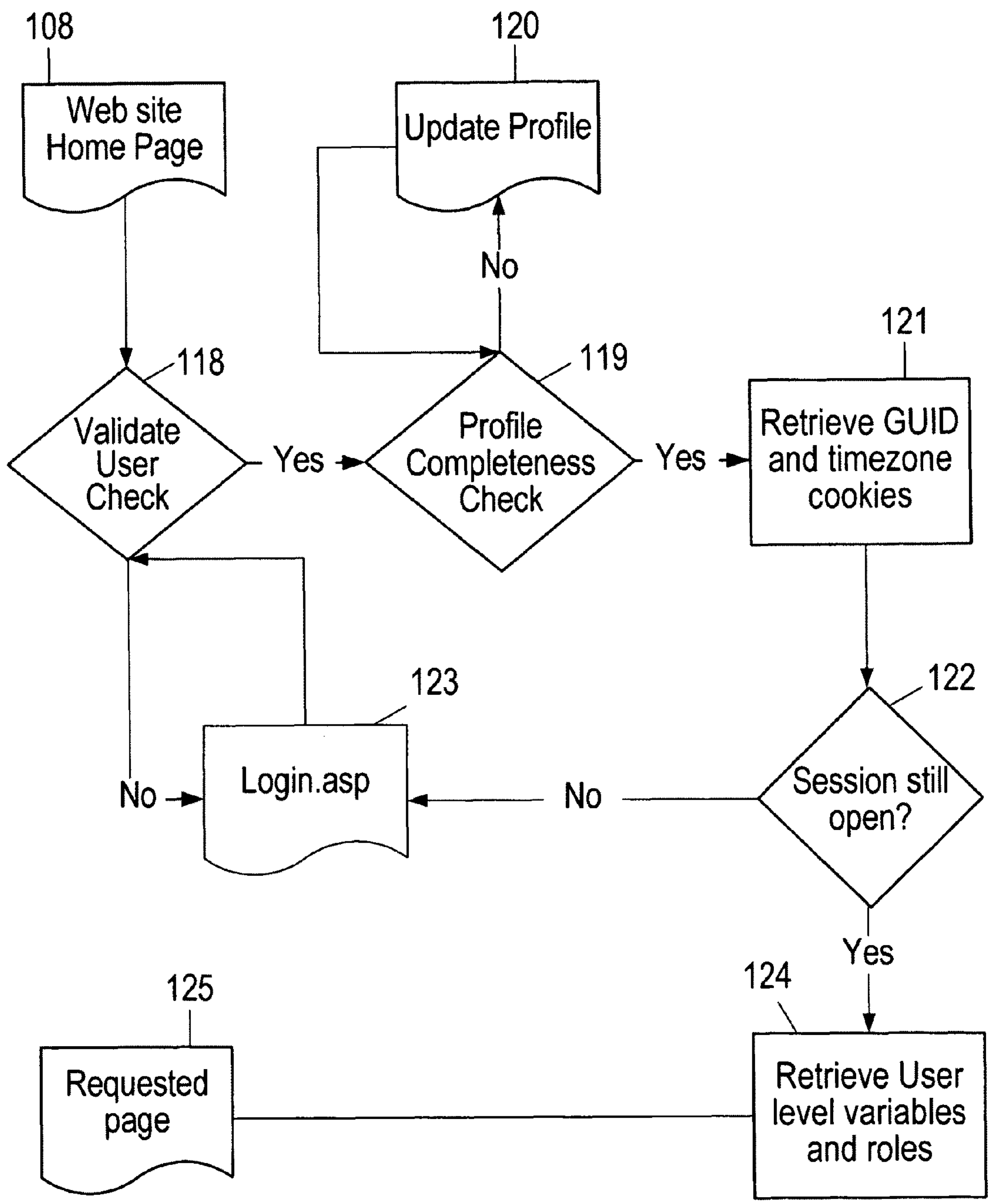
FIG. 4 is a flowchart representing a user authentication routine.

As flowcharted at FIG. 4, user authentication proceeds as follows. From the user's homepage 108, the user requests access to an event. At 118 it is determined that this is a valid user. At 119 the user's profile is checked for completeness. If not complete, the user is directed to a page 120 where the profile can be completed. At 121 the cookie on the user's computer is checked, the GUID is retrieved, as are timezone details. A determination is made at 122 whether the requested event is still open, and if not, the user is returned to the login page at 123. If the event is open, the user's classification is determined using the GUID at 124. The role of the user is determined, and if appropriate, the user is afforded access to the event by providing the user with the appropriate page at 125.

If initially, the user is not valid at 118, then it is determined whether the user is seeking access to the server homepage or the registration or login pages, each readily available to the public. If that is the case, then the user is passed to that page that the user has requested. However, if the user is seeking another page, then the user is returned to the login page as indicated at 123.

Figure 5:
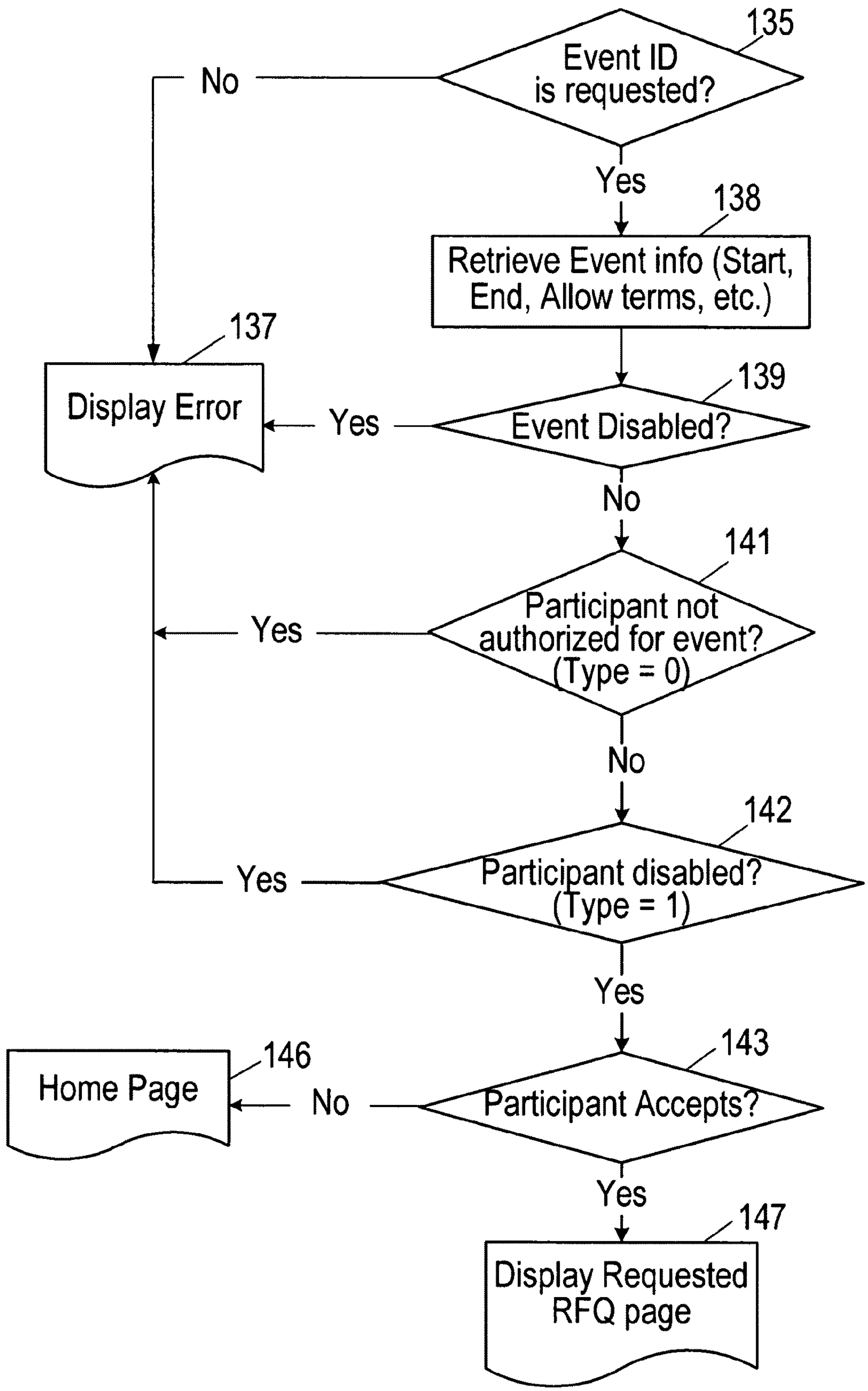
FIG. 5 is a flowchart representing an event authentication routine.

Event participant authentication verifies that the current user is a valid event participant, and that the user has the necessary permissions to read various event pages. This authentication proceeds as indicated in FIG. 5. Where an event page request by the user is detected at 135, but there is no event id or an erroneous id is the request detected at 135, an error display is made at 137. These can typically include the starting time, the ending time, the allowable terms, etc. If at 135, a valid event id is detected, at 138 event information is retrieved. Next, a determination is made at 139 whether the event has been disabled. If it has been, again, an error is displayed to the user as indicated at 137. If the event has not been disabled, a determination is made at 141 whether the user is authorized for this event. If the user is not authorized, an error is displayed at 137, but if the user is authorized, then at 142 the determination is made whether the user has been disabled. Again, if this is the case, an error is displayed at 137, but if the user has not been disabled, a further determination is made at 143 whether the user has responded to an invitation to participate. If the user has not so responded the user is denied access and may be returned to his or her homepage. If at 143, it is determined that the user has accepted the invitation, then the event page being requested is provided to the user as indicated at 147.

Figure 6A:
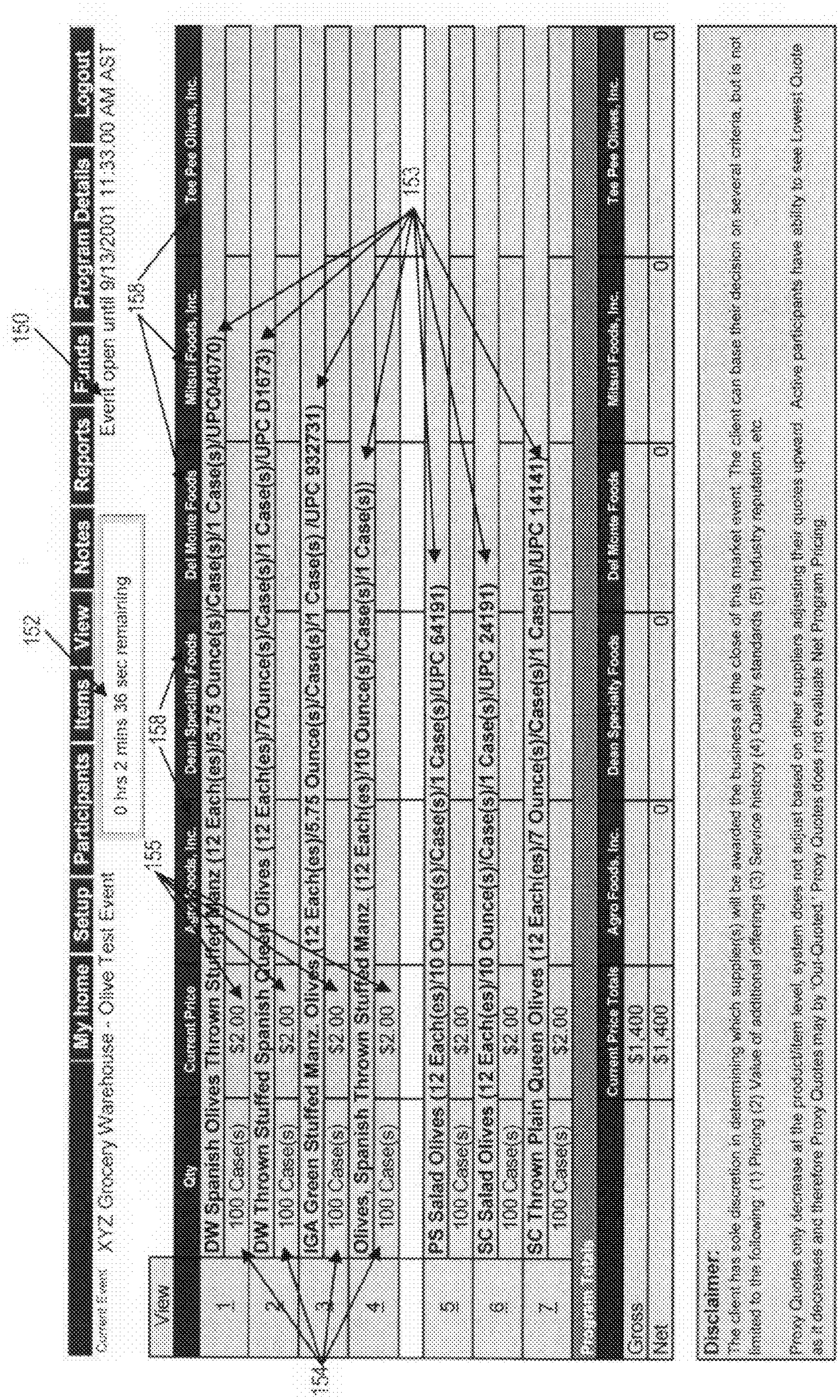
FIG. 6A is an illustration of an administrator, buyer or power buyer's quote view page before an event begins.

FIG. 6A is a typical participating sellers quote view page. This example is an olive event such as might be established by a retail grocer. This event is not yet open. The header frame for the quote view page provides navigation and general event information like the time remaining in the event. The header automatically refreshes every ten seconds. Each time it refreshes, it checks to see if the quote view page has been refreshed since the last quote was submitted. If it has not, then the page is automatically refreshed when the header is done loading. This way the user will only, at worst, be given data that is ten seconds old. At 150 is seen the date and time of opening of the event, shown in the user's local time. At 152, the time remaining until opening of the event is seen. At 153 are the items that the grocer (buyer) wants to purchase. Each description line 153 includes a description of the product and a description of the number and size of containers per case, e.g., "DW Spanish Olives Thrown Stuffed Manz," packed 12 jars of 5.75 ounces each per case. At 154 appears the number of cases sought. Because this is not a market price event, no market prices appear. However, at 155 "Current Price" appears. This is the price at which the item s are available on the market at the time for the purchaser's comparison with the quoted prices during the event. Five sellers, identified by name, are participating as seen by the columns 158 headed with those designations.

Figure 6B:
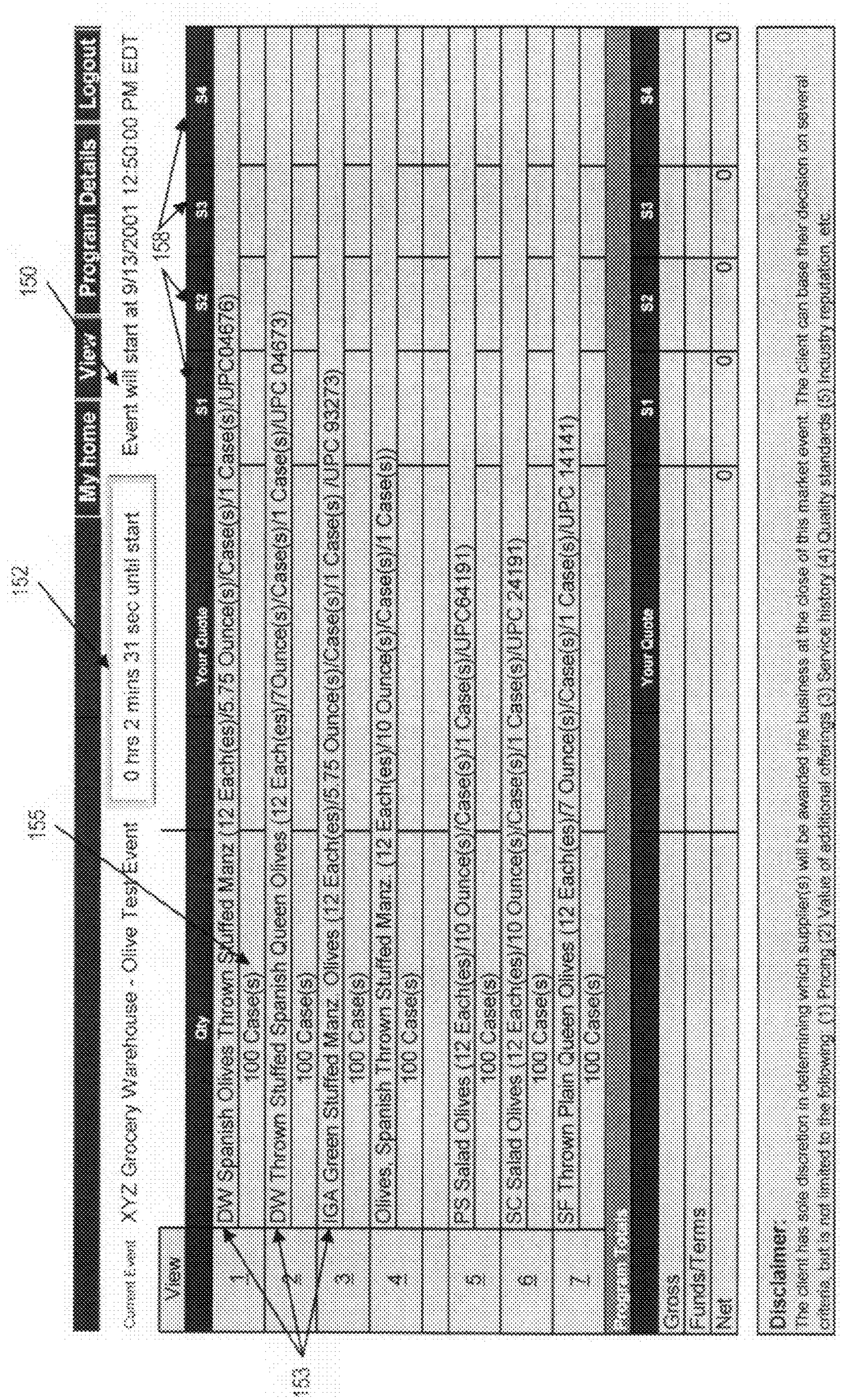
FIG. 6B is an illustration of a participating seller's quote view page, before an event begins.

Turning to FIG. 6B, the participating seller's quote view page of a not yet open event is shown. Again at 150, date and time of event opening is shown. Competing sellers are identified only as S1, S2, S3 and S4. Shown in the columns having the headings S1, S2, S3 and S4 will appear the quotes submitted by those four sellers.

Figure 6C:
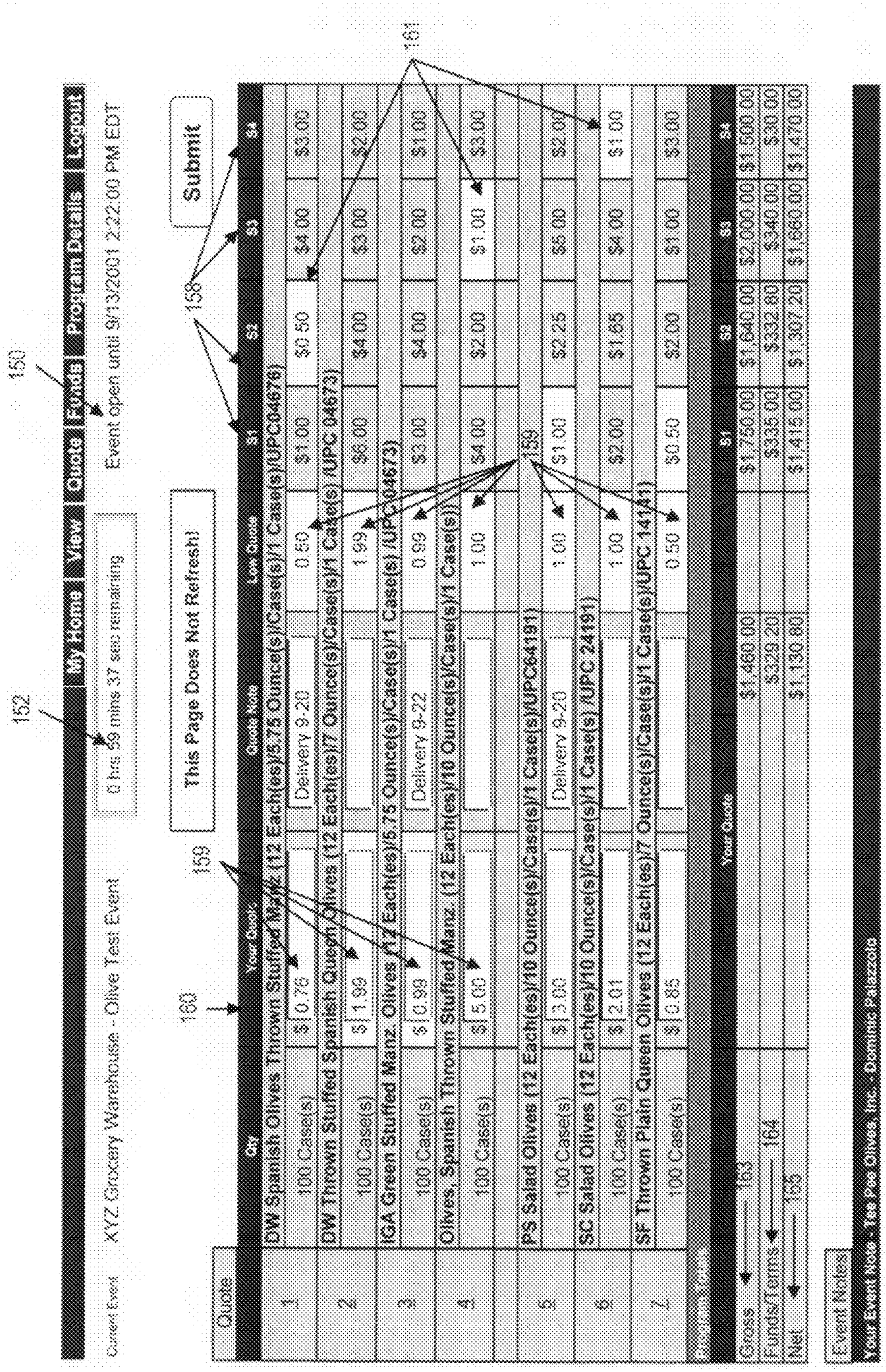
FIG. 6C is an illustration of a quote/note page in full view.

FIG. 6C is a seller's quote view page for an open event. The lowest quote for each item is listed and clearly highlighted (in yellow, for example) at 159 and in the fields of the columns 158. Two quotes by the present user are lowest in this example. The sellers S2, S3 and S4 each have one low quote indicated at 161. The total of all quotes appears at the line entitled "Gross" at 163. The additional funds/terms appear at the line 164 entitled "Additional Funds/Terms". The overall total, taking into account both the total quotes and any additional funds/terms, appears in the line 165 entitled "Net Total." Additional funds/terms may be give-backs of the nature previously discussed, such as freight, free advertising, quantity discount, etc.

FIG. 6D is a further quote view page. This page has a different level of transparency from FIG. 6C. Here only the user's quotes, at 160 and the low quotes at 159 are shown to the user.

Figure 6E:
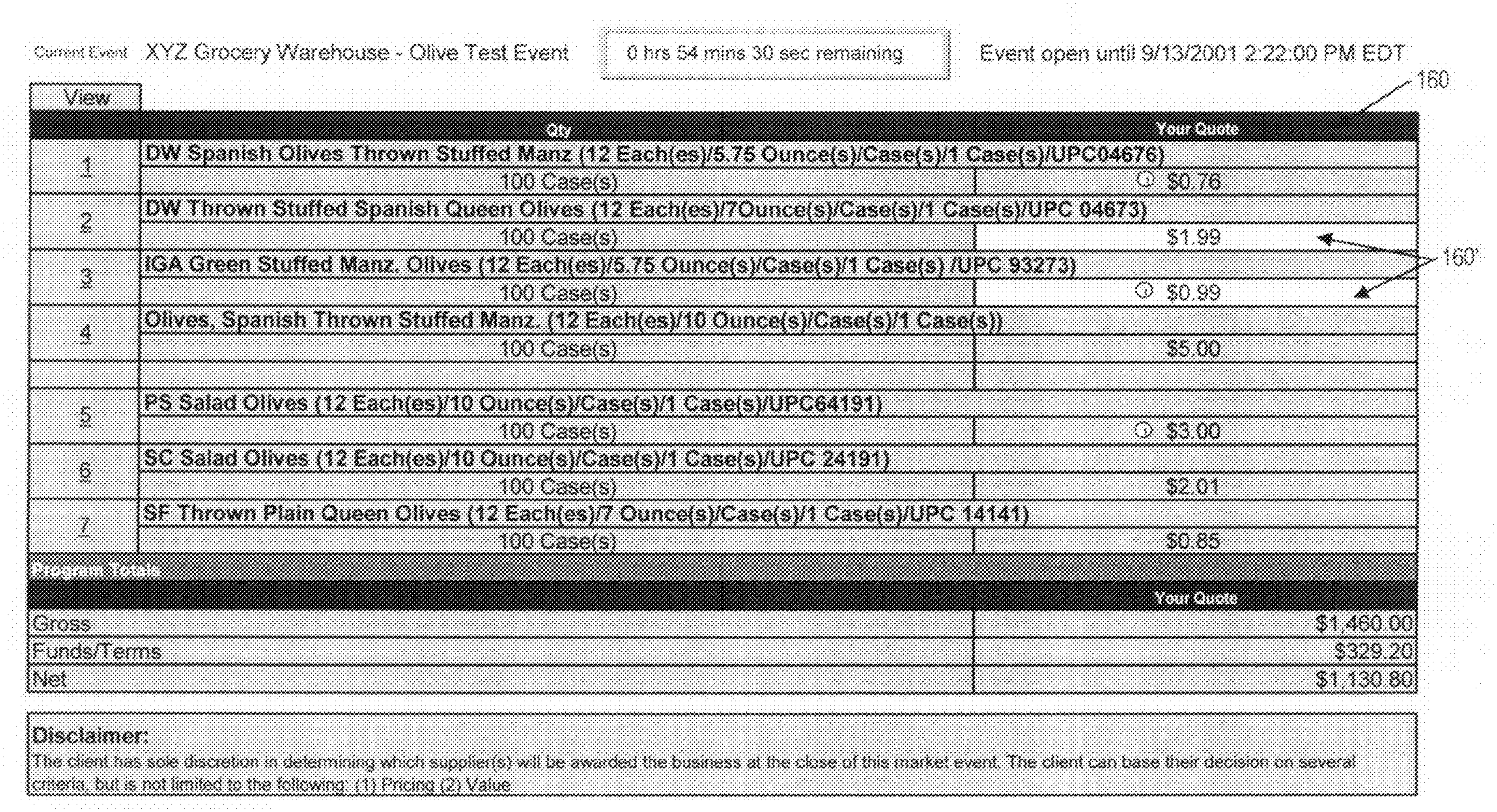
FIG. 6E is an illustration of a further participating seller's quote view page for the same event as FIGS. 6A-6D after the event has begun, and with a blind with low quote identifier view.

FIG. 6E has yet another level of transparency available according to this preferred embodiment. Here the page is "blind," providing the user only the user's own quote at 160 and an indication when the user's quotes are the low quotes by the highlighting in color at 160'.

Figure 6F:
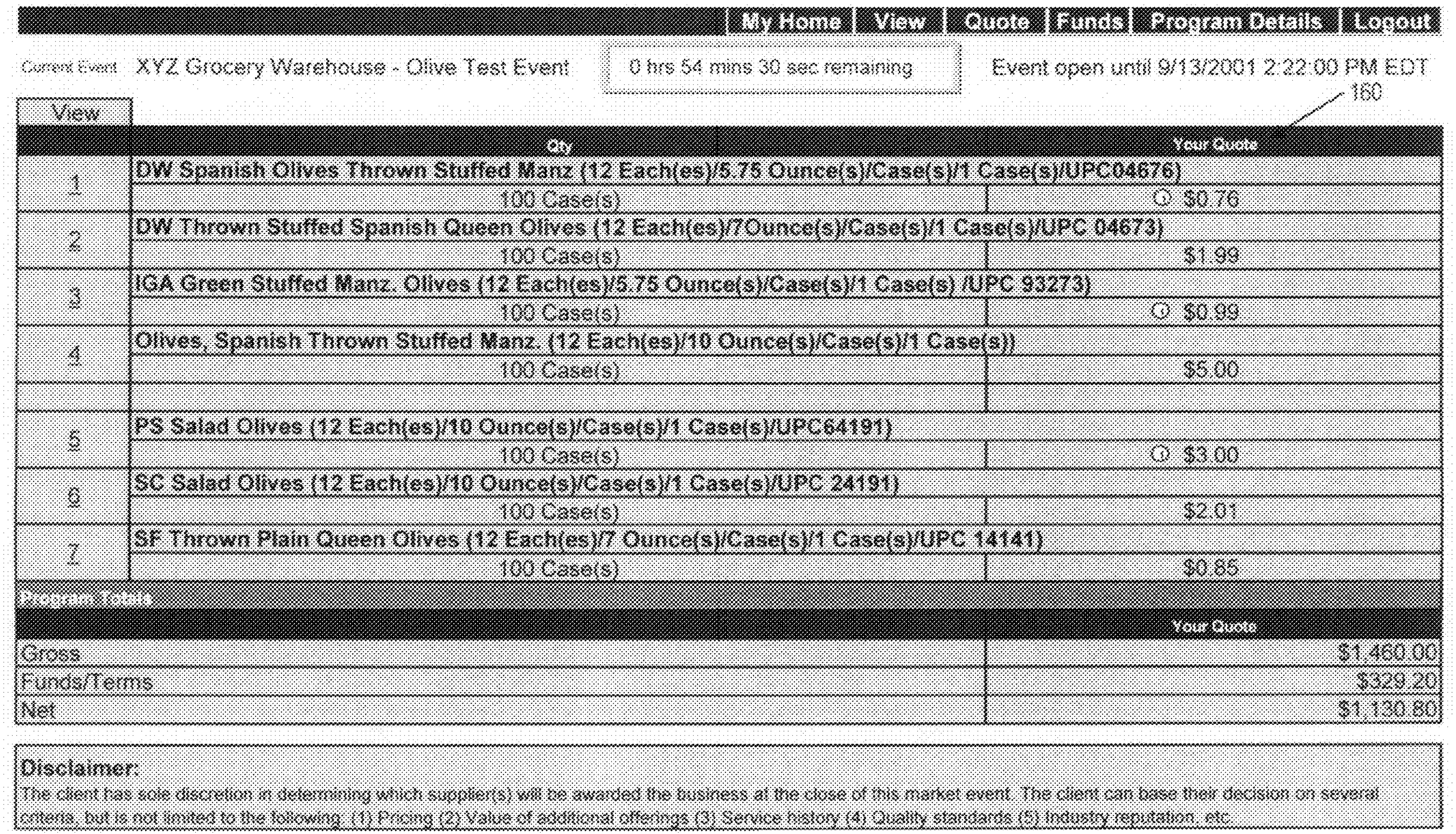
FIG. 6F is an illustration of a participating seller's quote view page for the same event as FIG. 6A-6E after the event has begun, and with a blind w/out low quote identifier view.

FIG. 6F illustrates an alternative page. Again the view is blind and here only the user's quotes appear at 160. No low quotes are indicated.

Figure 6G:
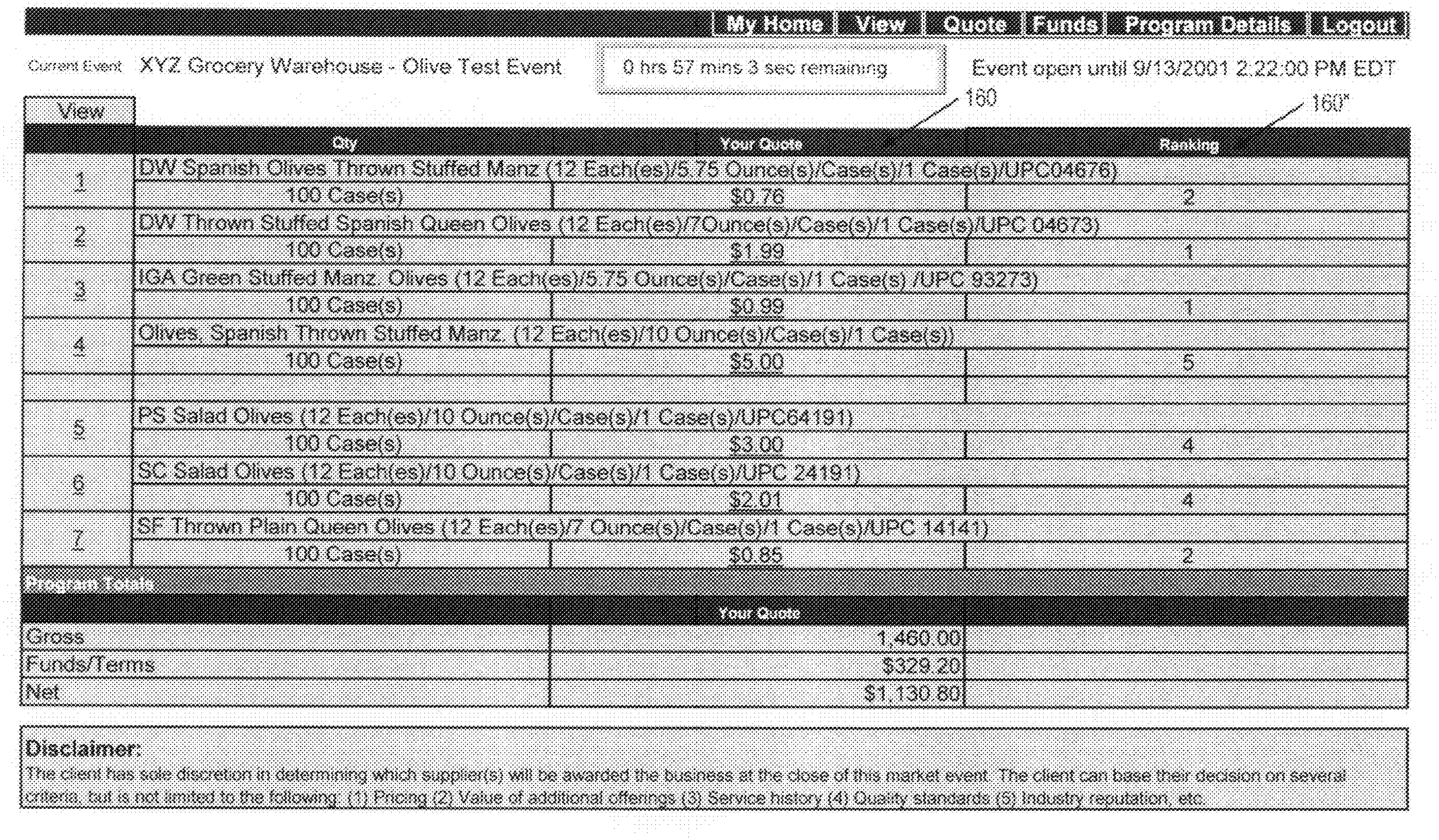
FIG. 6G is an illustration of a participating seller's quote view page for the same event as FIG. 6A-6F after the event has begun, and with a ranking view.

FIG. 6G illustrates still another alternative page. Again the view is blind, but here user's quotes are shown at 160, with their ranking among competitive sellers at 160".

Figure 6H:
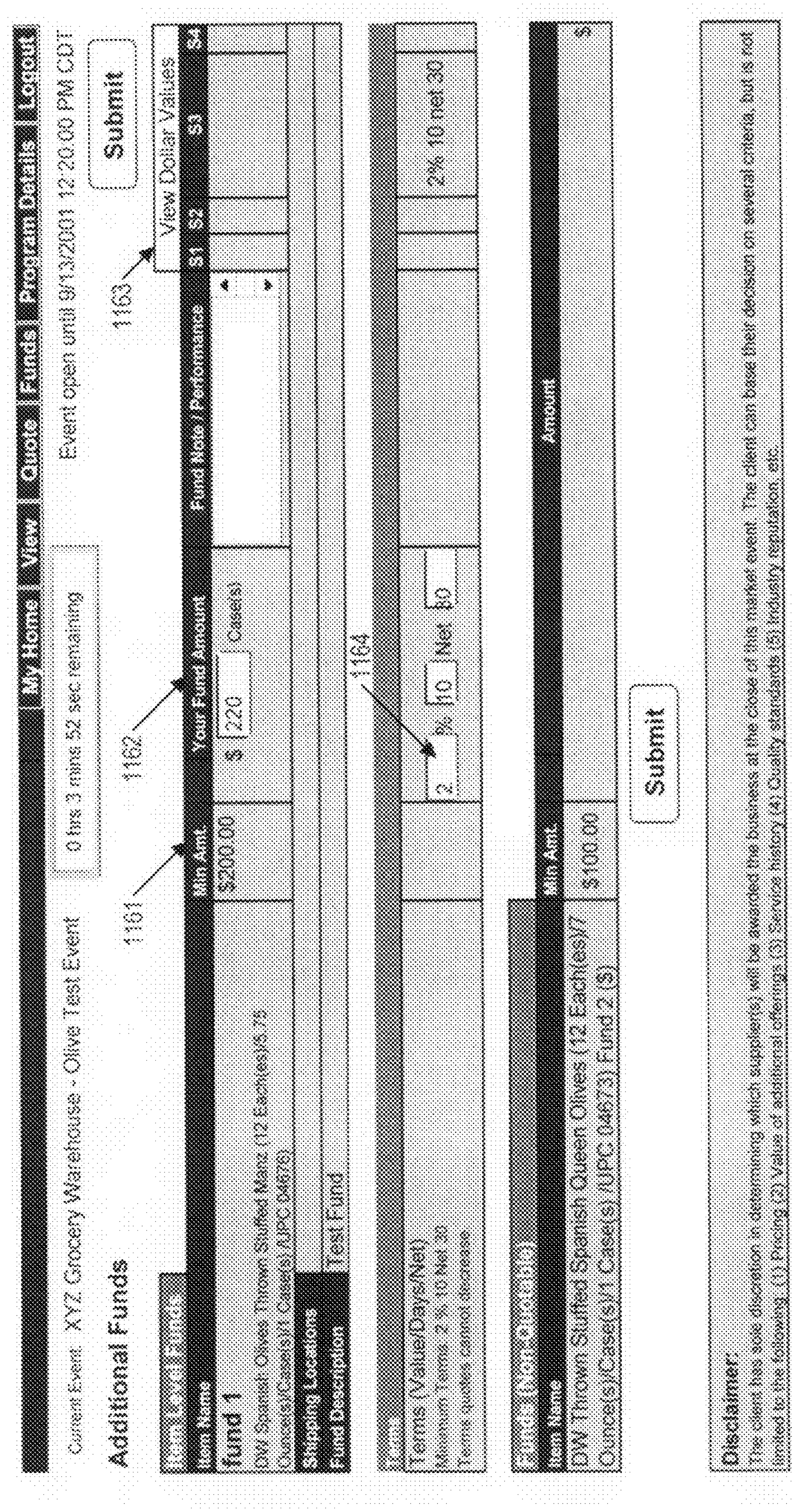
FIG. 6H is an illustration of a quote funds/terms page for the event of FIGS. 6A-6G.

An additional funds/terms page of a seller is shown in FIG. 6H. Minimum funds to be contributed by the seller as set by the purchaser are shown at 1161. The user's quoted fund contribution of $220 is shown at 1162 for the upper item. The user has not quoted a fund for the lower item or the funded quoted was below the minimum and is not shown. Competitive seller's fund contributions may be shown at column 1163. Quoted terms appear at 1164 for the upper item.

Figure 7:
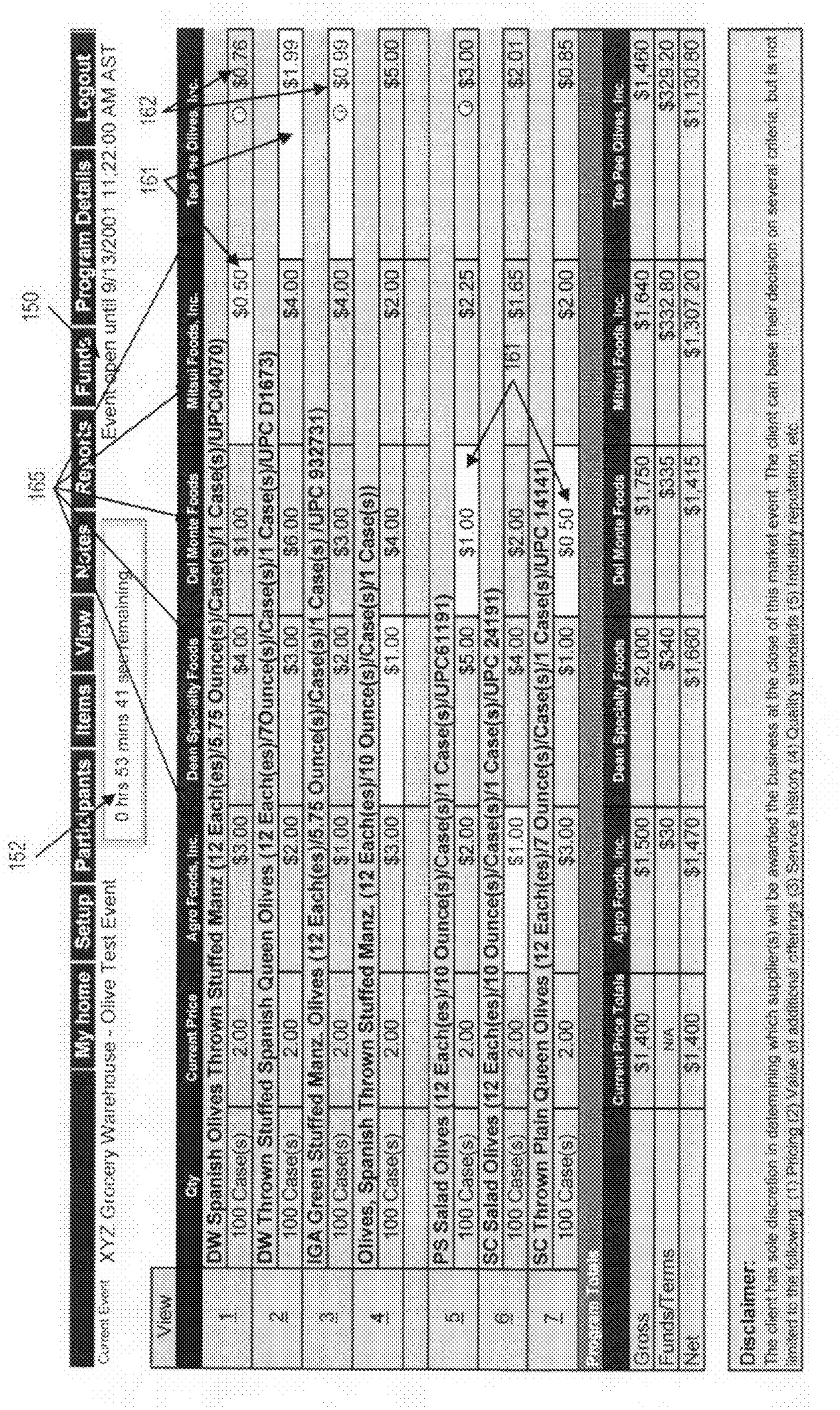
FIG. 7 is an illustration of an administrator, buyer or power buyer's quote view page for the same event as FIGS. 6A-6H after the event has begun.

In FIG. 7, a refreshed administrator, buyer or power buyer's quote view page for the same olive purchase event as is the subject of the page shown in FIGS. 6A-6H. It reflects, at 150, that the event is open and running and at 152 time remaining in the event. Here the identity of the sellers is visible at column 165, so this page is typical of that accessible to an administrator, a buyer or a power buyer. Low bids are highlighted in color at 161. Indicia 162 in the Tee Pee Olives, Inc. column show that the quoting seller has attached a note.

In FIG. 8A an administrator, buyer, power buyer quote view page is shown during an extension of the same olive purchase event as FIGS. 6A-7. That the event has been extended is indicated at 150. The time remaining in the extension is shown at 152.

Figure 8B:
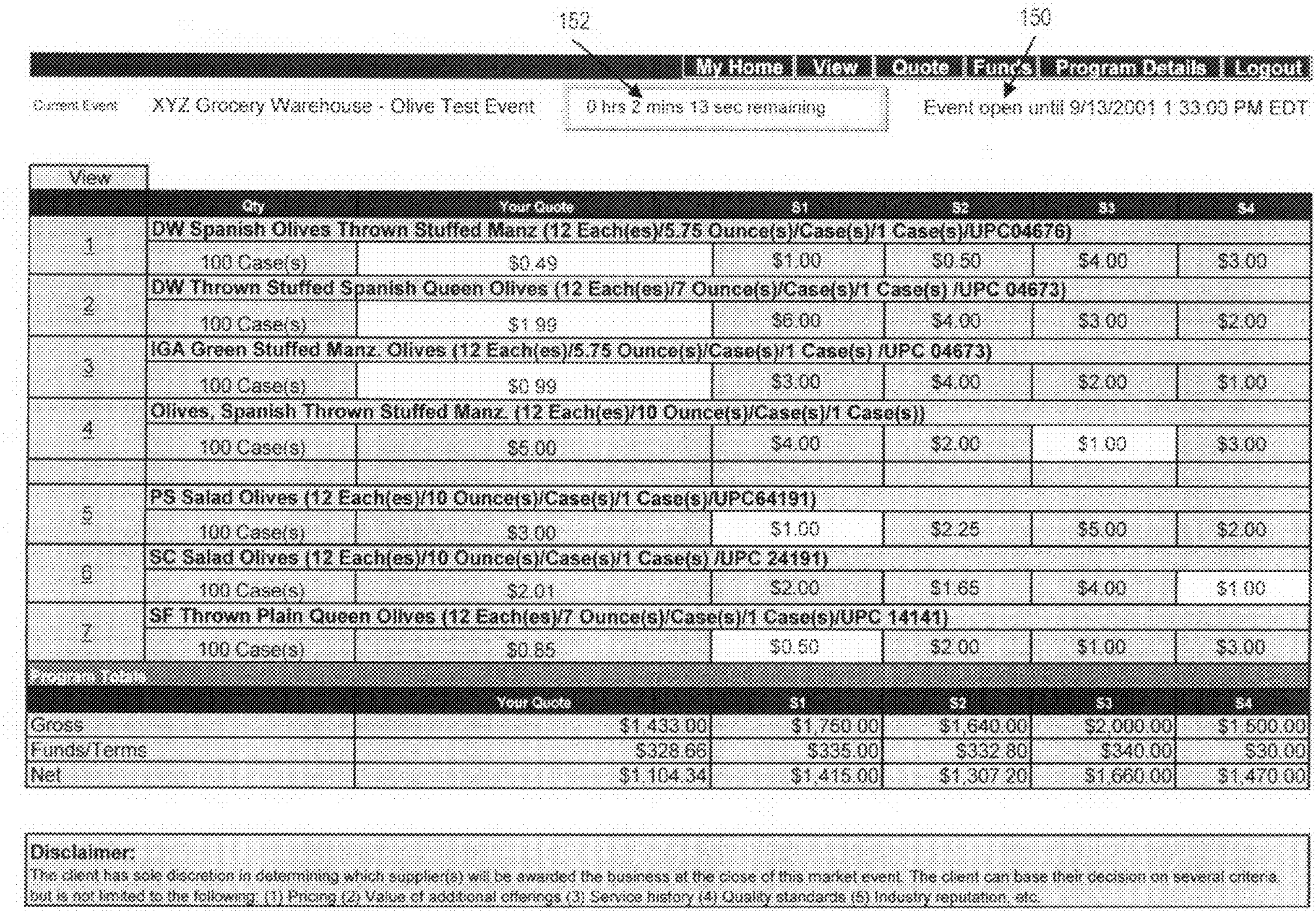
FIG. 8B is an illustration of a further participating seller's quote view page for the same event as FIGS. 6A-8A, during an extension.

In FIG. 8B shows a seller quote page during an extension as indicated at 150. At 152 the time remaining in the extension is shown. Low quotes are highlighted in color.

Figure 9A:
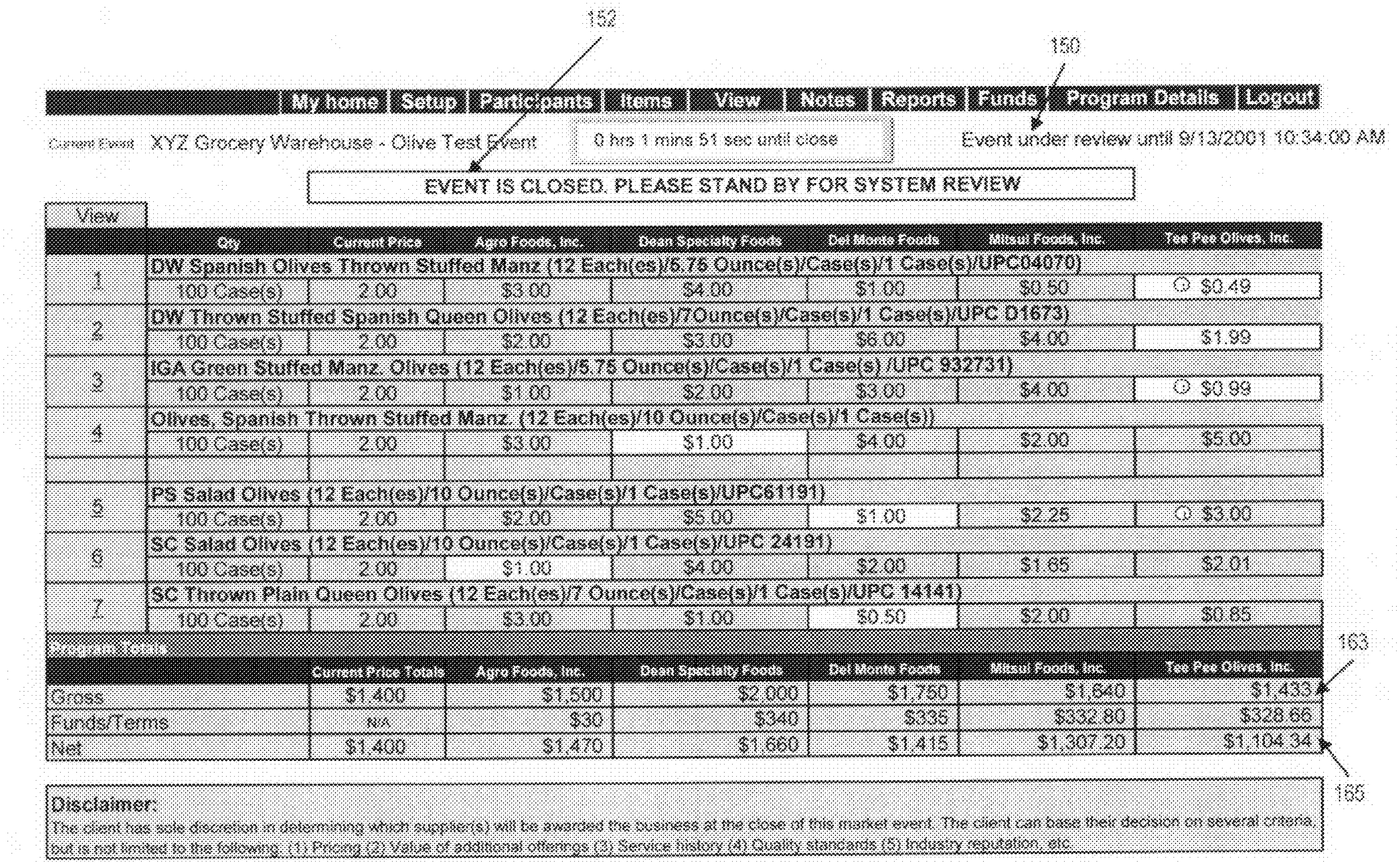
FIG. 9A is an illustration of an administrator, buyer or power buyer's quote view page for the same event as FIGS. 6A-8 during the review period.

In FIG. 9A, the final administrator, buyer, power buyer quote view page for the olive purchase event appears. Again, unlike the pages available to the seller, the actual bidder's names are available. At 152, it can be seen that the event is closed and time remains in the review period, and to the right of that in the header frame, the fact that the event has ended and that the event is under review now appears at 150. The seller Tee Pee Olives has the lowest gross line item total and net total at lines 163 and 165. The business rules prove that the buyer has until a certain time as shown at 150 to choose among the quotes.

FIG. 9B is the final seller quote view page, similar to the page at FIG. 9A.

Figure 10:
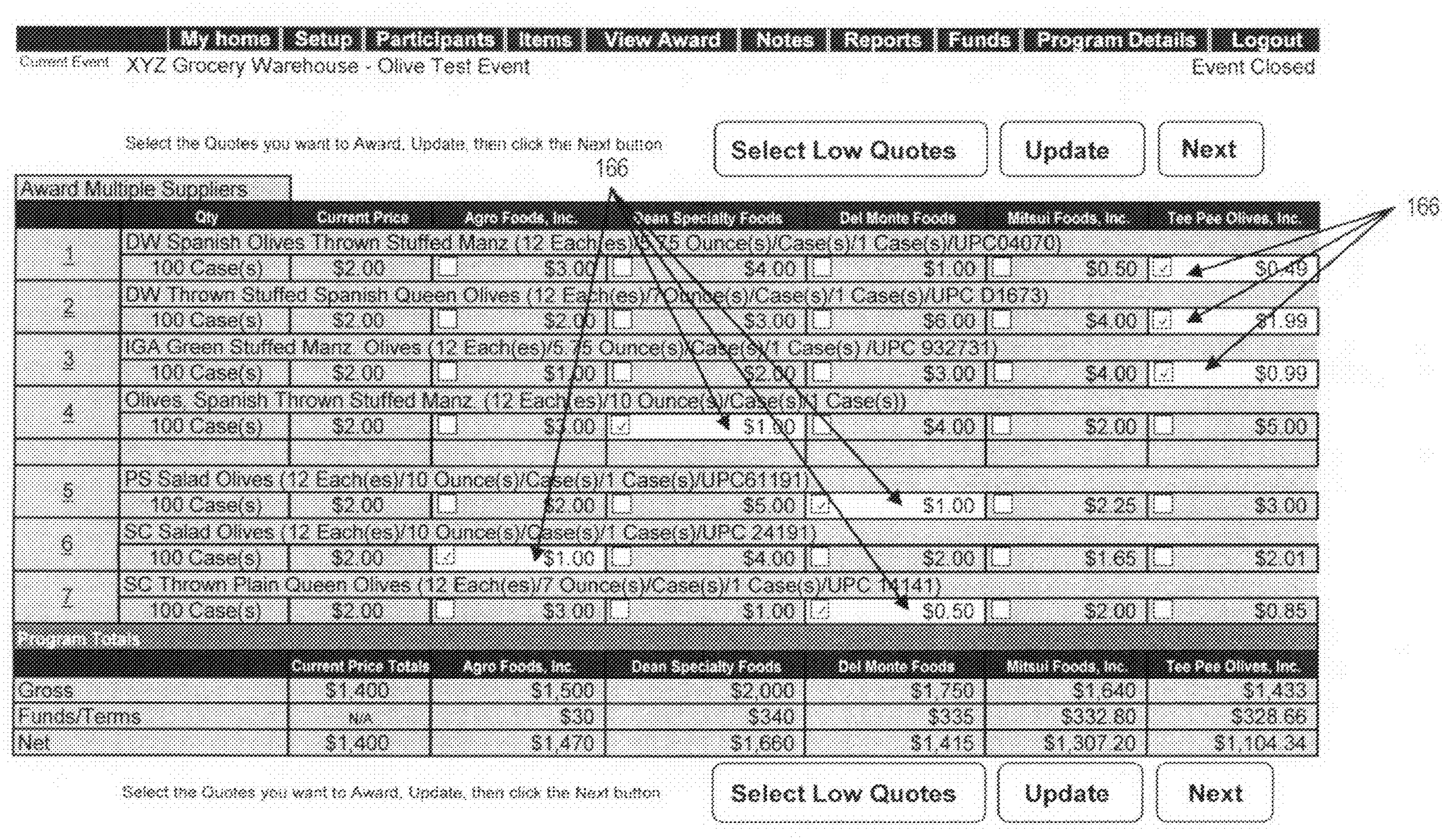
FIG. 10 is an illustration of a buyer's final quote view page for the same event of FIGS. 6-9 after the close of the event.

FIG. 10 is the buyer's quote view web page with award indicating boxes 166 for the buyer to "click" on. The buyer may choose to award the sellers based on individual low quotes for individual items as indicated by the check marks made at 166. Alternatively, the buyer may award the quoting participant having the lowest net total, or may make a selection based on other factors such as reputation, past experience, etc.

Figure 10A:
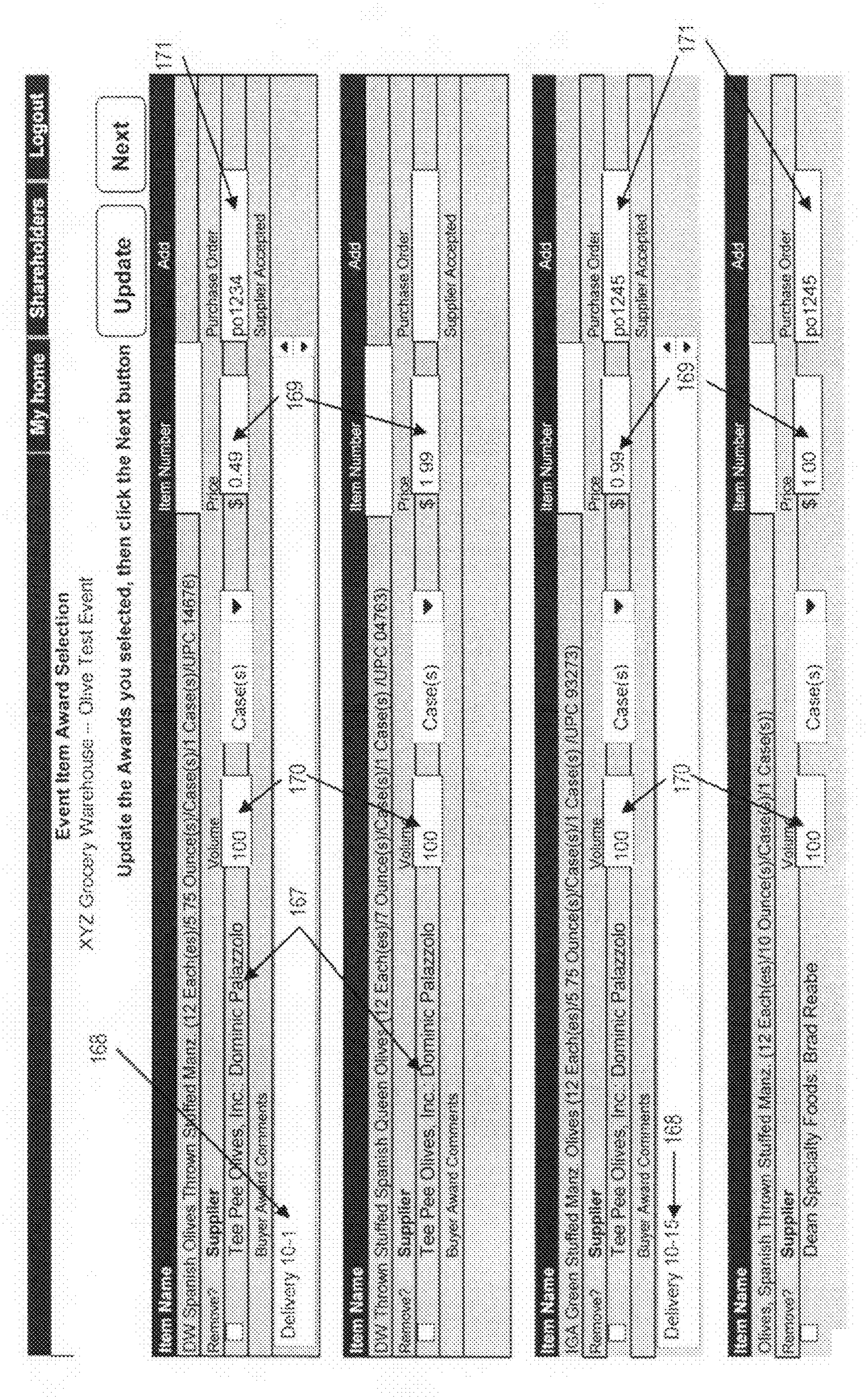
FIG. 10A is an illustration the view award page for the event of FIGS. 6-10.
Figure 10B:
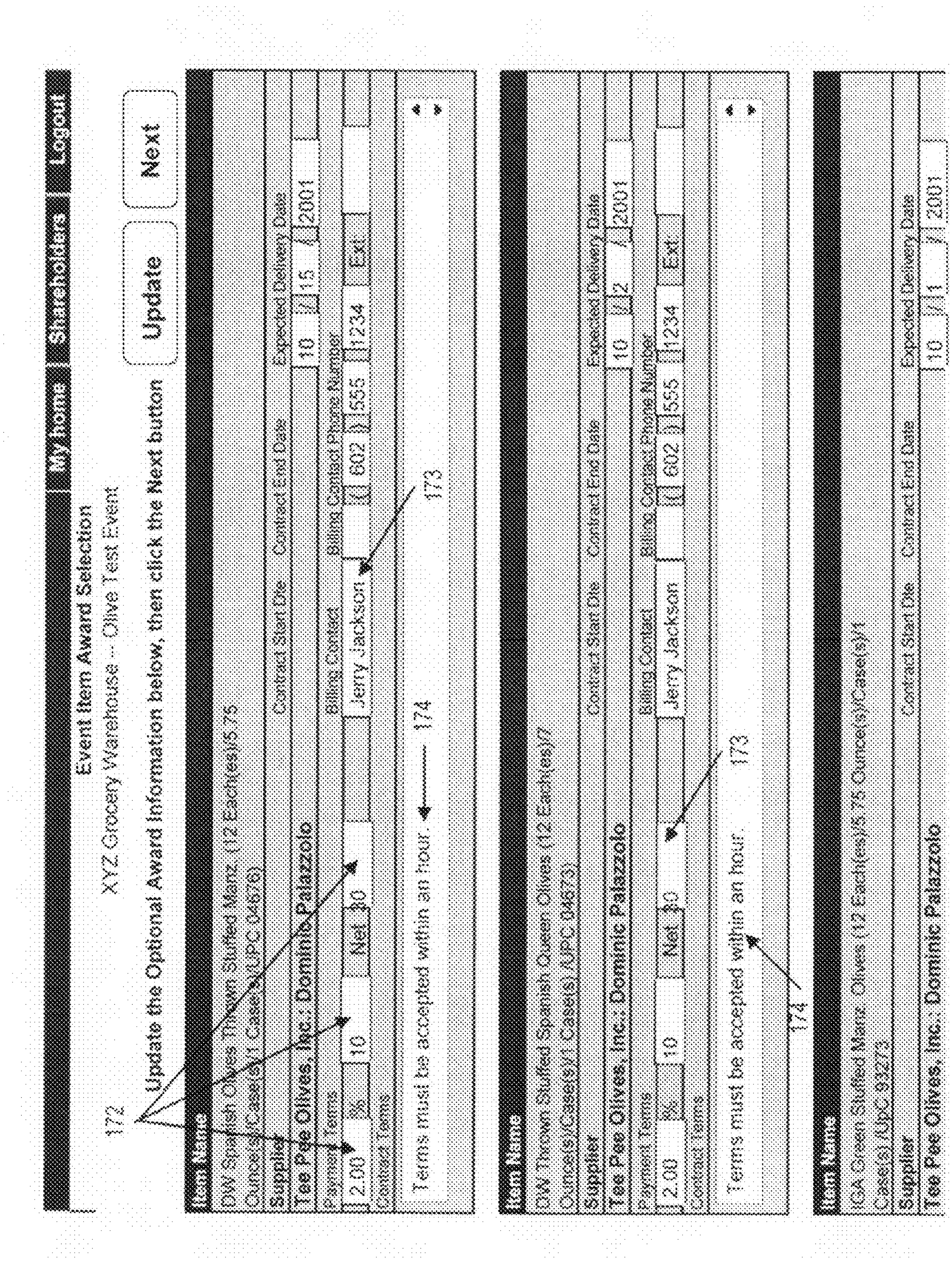
FIG. 10B is an illustration the award default page for the event of FIGS. 6-10A.

FIG. 10A is a view award page. It shows the awards from the olive buying event to which FIGS. 6-9 relate. The awarded sellers are shown at 167, delivery date at 168, price at 169 and volume at 170. Purchase Order numbers appear at 171.

In the award default page of FIG. 1B, the term of the olive sale contract that must be accepted by the seller are shown at 172, along with the purchaser's contract at 173. The time period for acceptance is set at 174.

FIG. 10C illustrates a seller award page. It lists the terms, delivery date, price, etc. as established during the event and by the purchaser's award. At the buttons 174 and 175, the seller may decline or accept.

Figure 11A:
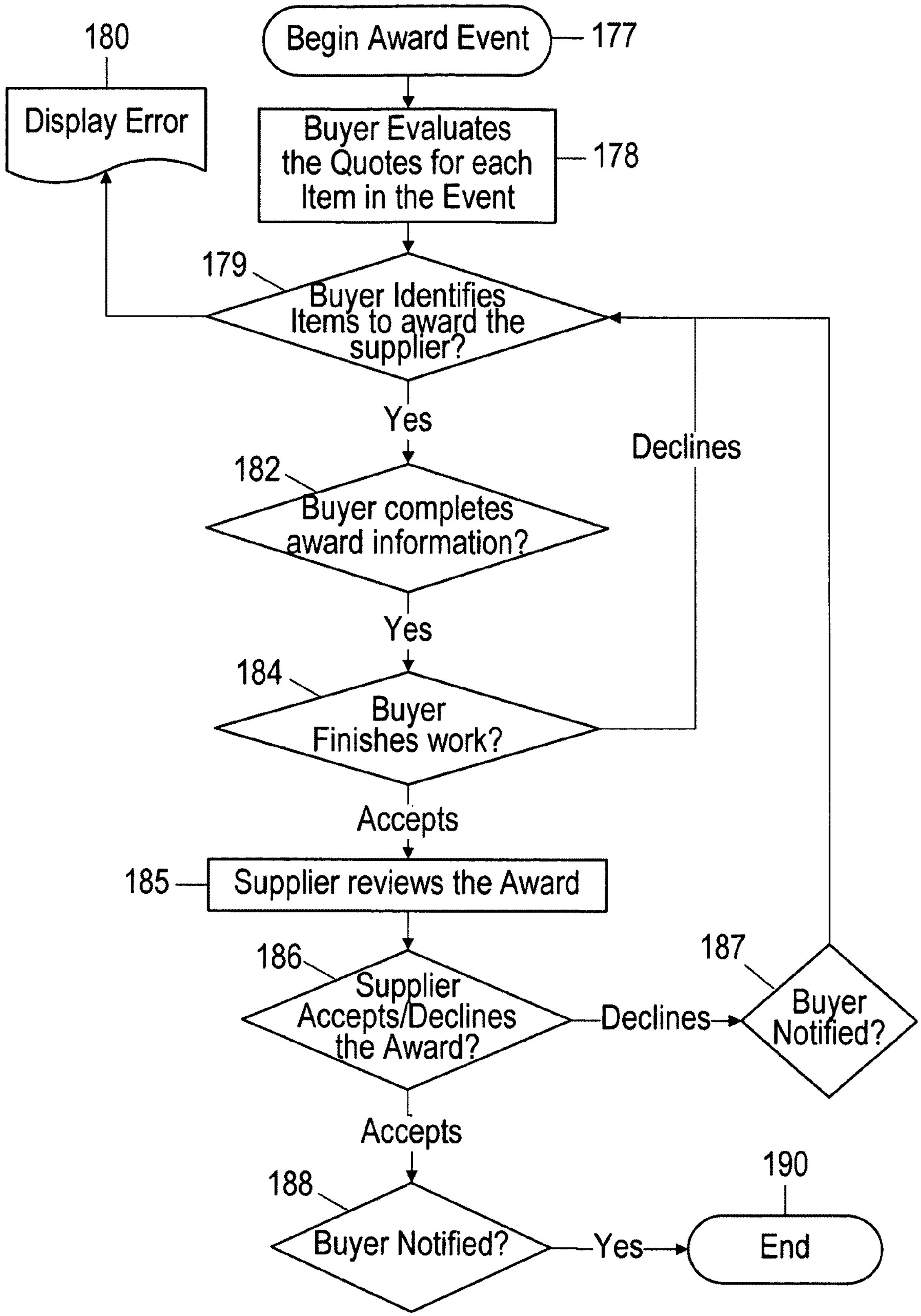
FIG. 11A is a flowchart of the award of business process.

FIG. 11A flowcharts the award process. The purchaser begins the award process 177 at the close of an event. The purchaser evaluates the quotes at 178. The purchaser must identify the awarded seller at 179, or an error is displayed at 180. At 182, the purchaser completes the award information. At 184, the purchaser indicates that the awards are complete; otherwise, the purchaser returns to 179 to complete the awards. At 185, the seller reviews the award or awards to him or her. Acceptance or decline is made at 186. The purchaser is notified at 187 if the award is declined, at which time purchaser again identifies an award to another seller. At 188, the seller also notifies the purchaser if the award is accepted, and this completes this award process at 190.

Figure 11B:
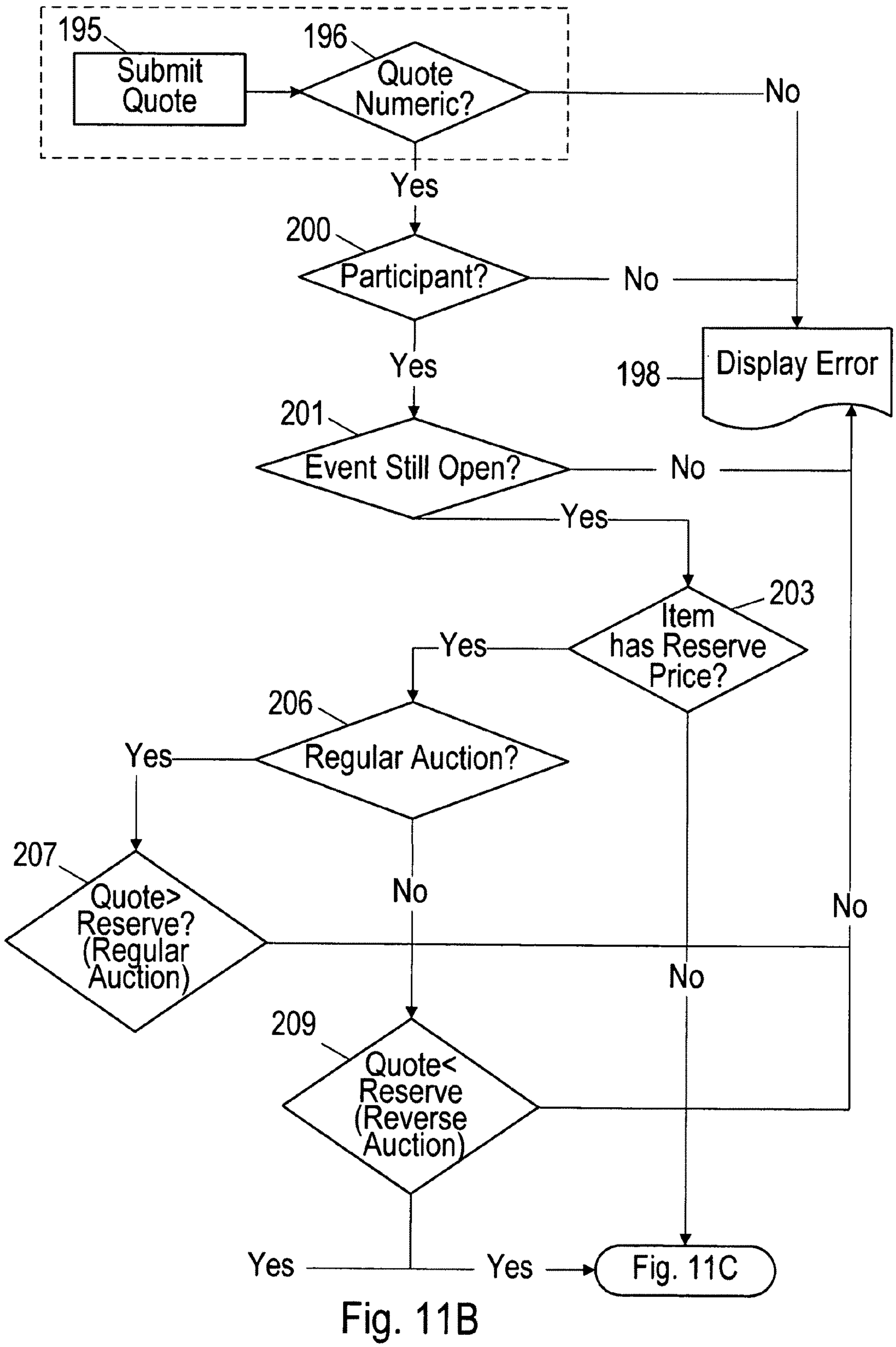
FIGS. 11B & 11C are flowcharts representing an item quoting routine.
Figure 11C:
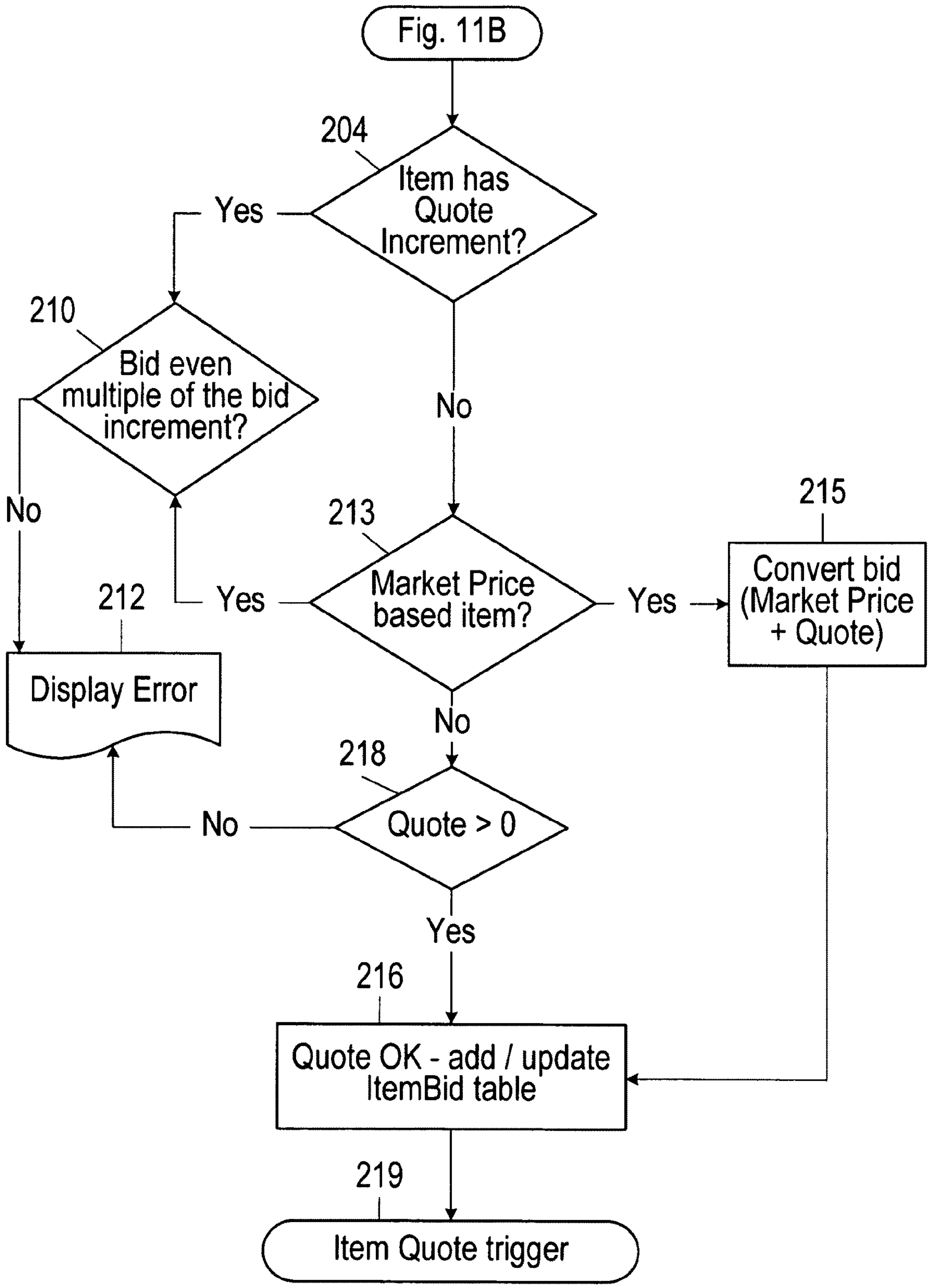

The flowchart of FIGS. 11B and 11C illustrates how the system deals with a quote. When a quote is submitted via the quote/note page, at 195, it is checked at 196 to determine if it is in the correct form, i.e. numeric. If it is not, an error is displayed as indicated at 198, but if it is, the quoting party at 200 is checked to see if that he or she is a participant. If the quoting party is not a participant, again an error is displayed as indicated. If the quoting party is a participant, the next determination that is made at 201 is whether the event remains open. If not, again an error is displayed. If the event is open, information concerning the event is checked at 203 to see if there is a reserve price in place. If there is not, the routine proceeds to FIG. 11B, where at 204 it is determined whether there is a quote increment in place. However, if at 203 (FIG. 11B), it is determined that there is a reserve price, then a determination is made at 206 whether this is a regular or reverse auction. If it is a regular auction, the quote is compared to the reserve price at 207, and if it does not exceed the reserve price, an error is shown again as indicated at 198. However, if the quote does exceed the reserve price, then the routine moves to the quote increment determination 204 of FIG. 11C. Similarly, if at 203 it is determined that there is a reserve price and at 206 that this is a reverse auction, then at 209, the determination is made whether the quote is more than the reserve price, in which case, an error is displayed at 198. If the quote is less than the reserve price, the routine progresses to the quote increment determination at 204 in FIG. 11C.

If a quote increment is in place, as determined at 204, then the routine determines at 210 whether the quote is an event multiple of the quote increment. If not, an error is displayed as indicated at 212. If the quote is a multiple of the quote increment as required, then a determination is made whether the particular item is market price based at 213. Also, at 204, if it is determined that there is no quote increment, the program steps directly to the determination of whether the item is market price based.

If this is a market price based item, then the quote will have been made relative to the market price. In other words, a quote of plus five cents would mean a quote five cents above the market price. When it is determined that the item is market price based at 213, then the quote is converted to actual price, by addition of the quote to the market price at 215. At this point, the quote table is updated at 216 and the buyer's quote view page illustrates the full price as calculated at 215. If the event is determined not to be market price based at 213, then a determination is made whether the quote is greater than zero at 218. In other words, a quote less than zero is appropriate in a market price based event because that quote less than zero can be subtracted from the market price to arrive at a positive number, but in other auctions, a quote less than zero is nonsensical, and again, the error is displayed at 212.

Having determined that the quote is appropriate at 216, and that update of the item quote table, i.e. the quote view page, is appropriate, the routine then proceeds to the sub-routine identified as item quotes trigger 219. This sub-routine is shown in the flow chart of FIG. 12.

Figure 12:
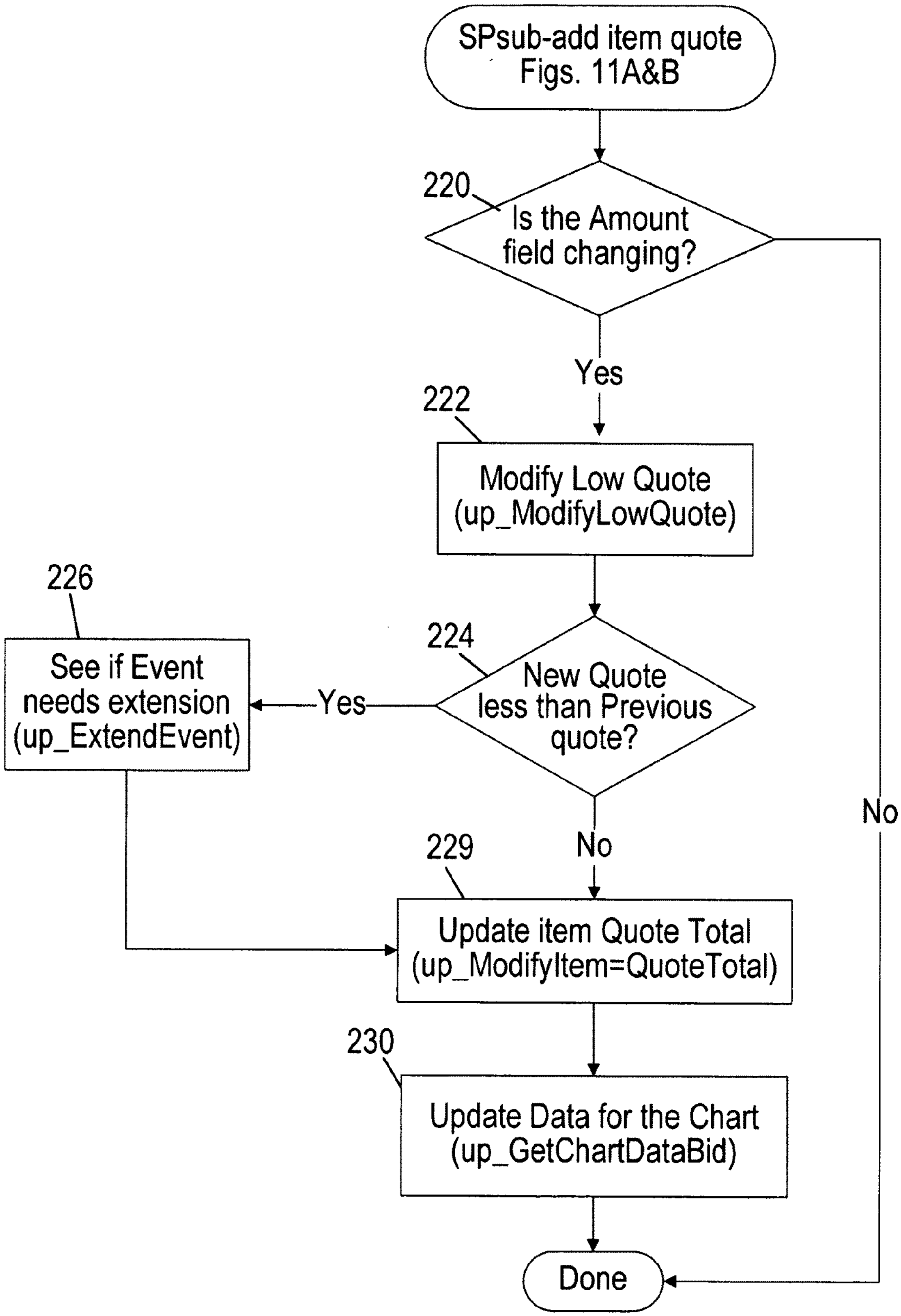
FIG. 12 is a flowchart representing an item quotes trigger routine.
Figure 17:
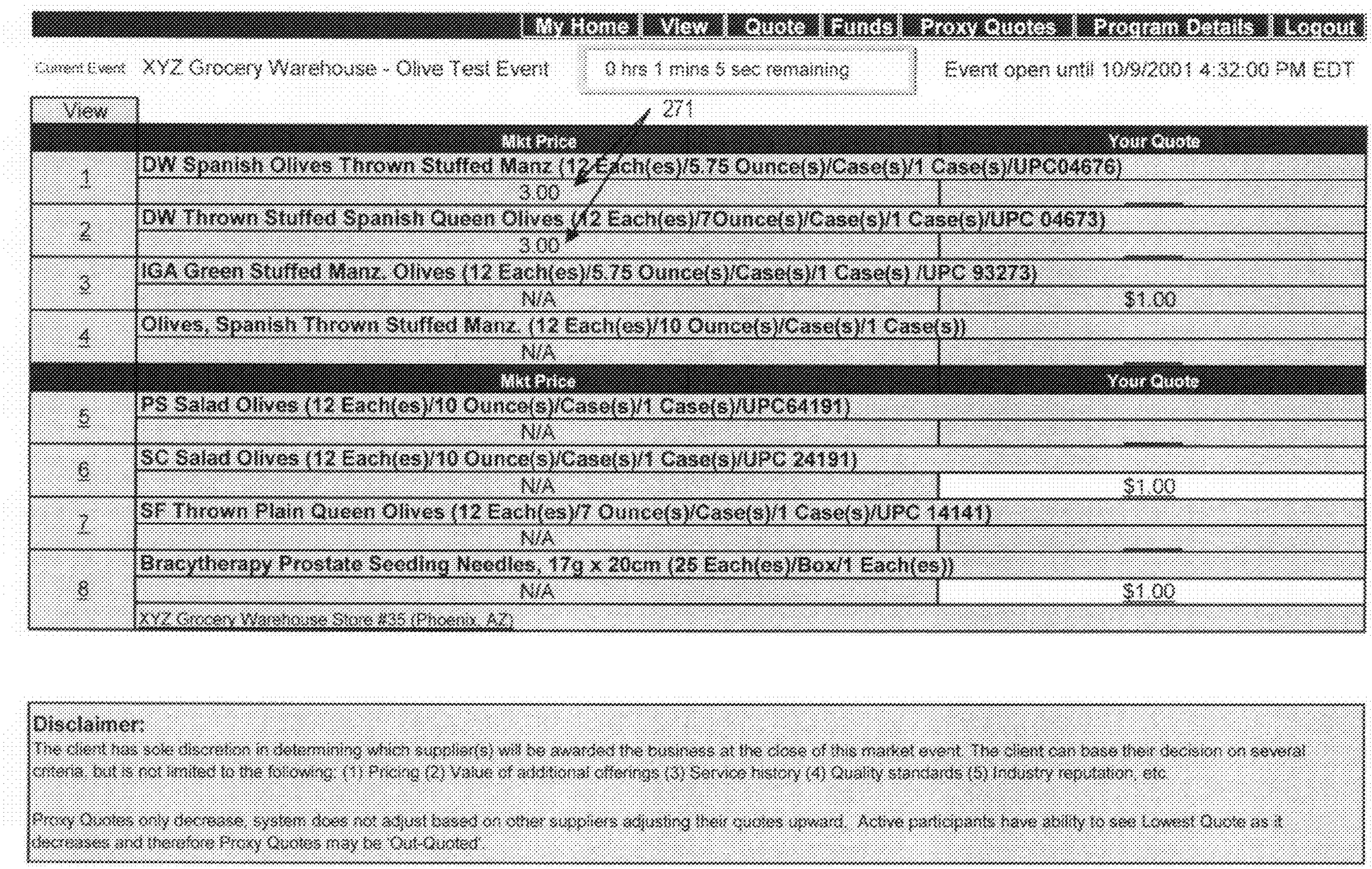
FIG. 17 is an illustration of a participating seller's quote view page for the market price event of FIG. 16.

In FIG. 12, the routine SP sub-add item quote is the routine described just above with respect of FIGS. 11A and 11B. The item quotes trigger routine of FIG. 12 determines at 220 whether the amount field is changing. If not, the routine of FIG. 12 is done. If at 220 it is determined that the amount field is being changed, then the particular seller's item low quote is modified at 222. At 224, it is determined whether the new quote is less than the previous quote. If it is, then a determination is made at 226 whether an extension of the event is to be made, because, for example, the new low quote is being made at a time close to the close of the event. Whether the new quote is higher or lower, the quote total is updated at 229. Next, data for the chart of FIG. 17 is updated at 230 and the routine is complete.

Figure 13:
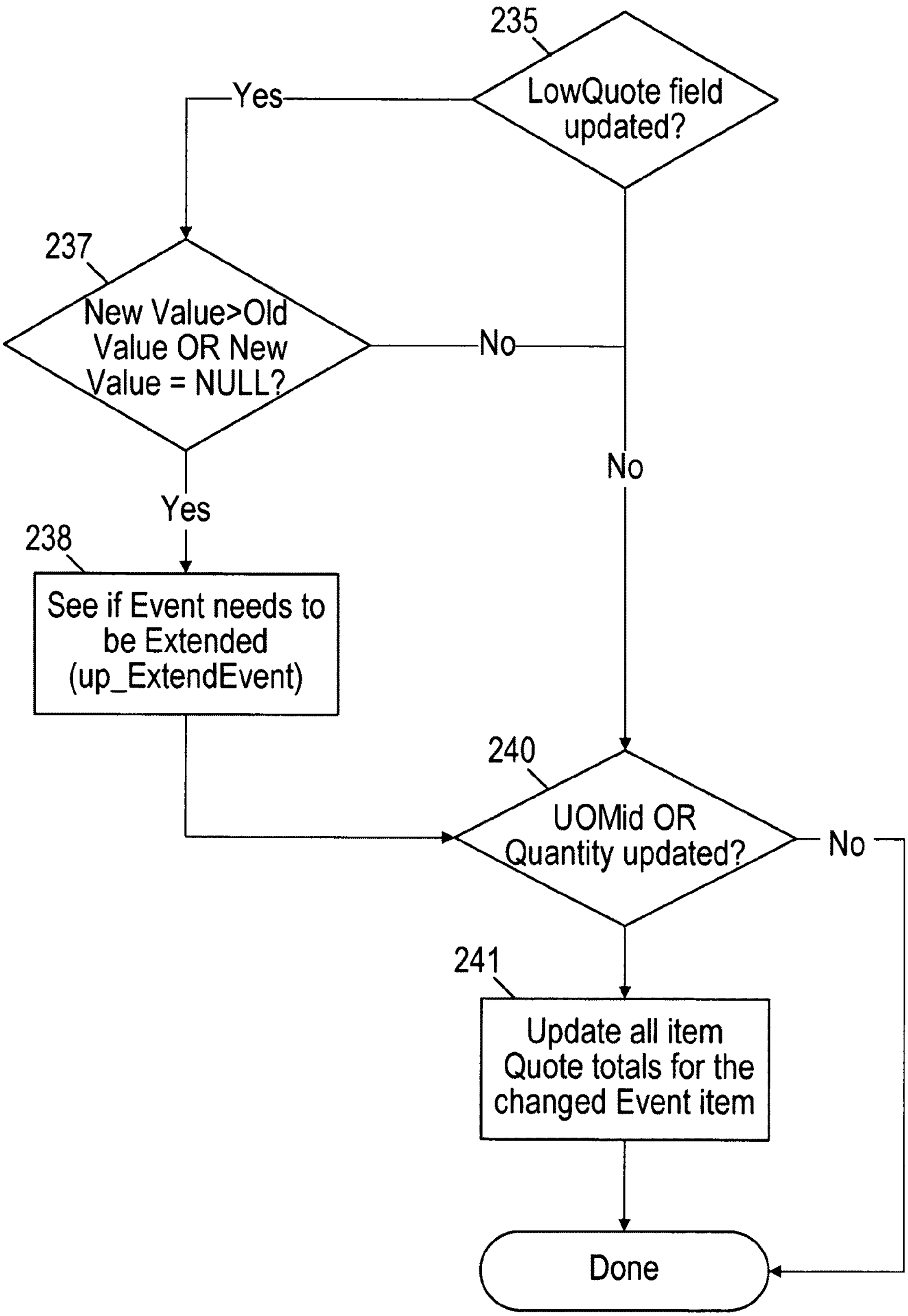
FIG. 13 is a flowchart representing an event items trigger routine.

In FIG. 13, a further routine is shown triggered by an update or the low quote field at 235. At the decision block 237, a determination is made whether the new low quote value exceeds the old low quote value or if the new low quote value equals zero ("NULL"). One of these two cases could occur where the previous low quote contributor has been disabled. If either of these is the case, then it is determined, based un the time of occurrence, whether the event needs to be extended to give participants an opportunity to respond as indicated at 238. In any event, at 240 a determination is made if the unit of measure (ounces, pounds, cases, quarts, etc.) quantity or if the quantities has been updated, both occurrences that require new totals to be calculated. If not, the routine is done, but if so, on the basis of previous quotes, the item quote totals for the changed event item is recalculated at 241.

Figure 14:
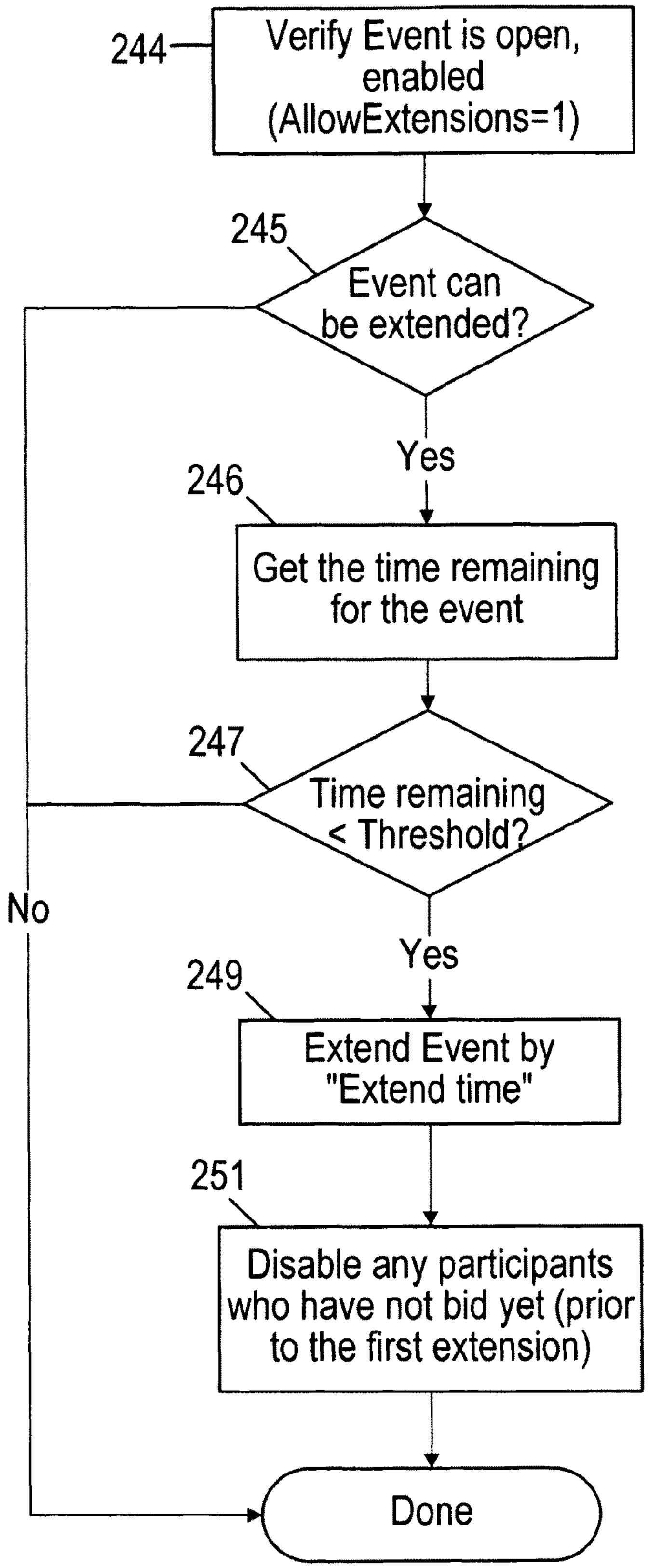
FIG. 14 is a flowchart representing an event extension routine.

In FIG. 14, an event extension routine is flowcharted. Before an event is extended for any of the reasons mentioned above or other reason, it is verified at 244 that the event is open, and enabled. It is determined at 245 whether the event can be extended, which is to say that the allowable extensions have not been used up. If it cannot be extended, the event is done. If the event can be extended, the time remaining is determined at 246, and if this is determined, at 247 to be within the time-to-closing threshold for extension, then the event is extended by the extend time at 249, and any participants who have not quoted yet, i.e. prior to the first extension, are disabled at 251. If however, the time remaining is not yet within the extension threshold determined at 247 then the routine is done.

Figure 15:
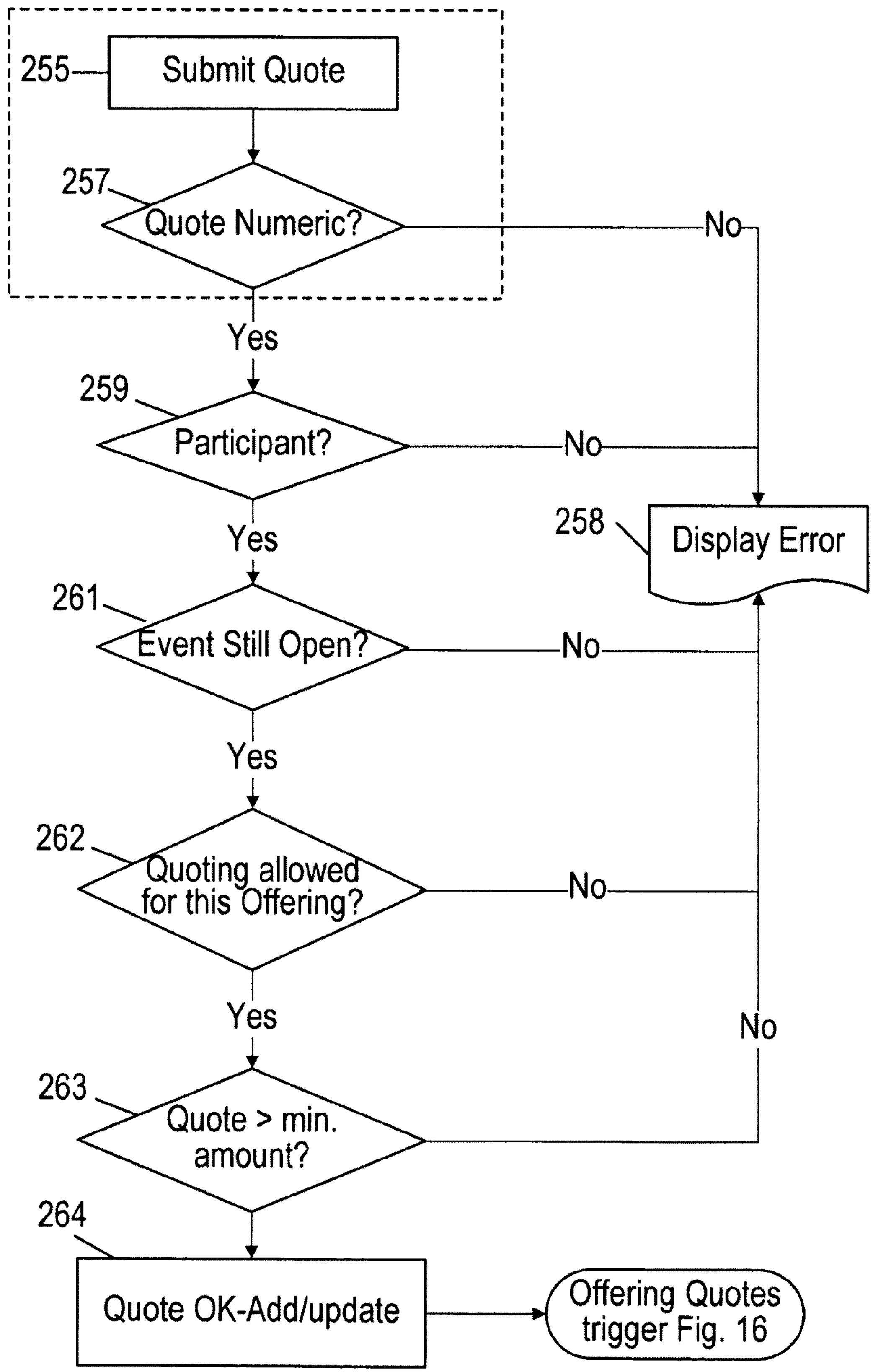
FIG. 15 is a flowchart representing a funds/terms quoting routine.

FIG. 15 illustrates a routine that may be called upon by a buyer by which a quote of additional funds or terms is submitted via the webpage at 255. These may be of the nature previously discussed, i.e. quantity discount or for advertising. The quote is determined to be numeric at 257 or otherwise the error is displayed at 258. At 259, it is determined whether the quoter is a participant, otherwise again an error is displayed as indicated at 258. If the quoter is a participant, then at 261, it is determined whether the event is still opened. If it is not, error is displayed. If it is open, it is determined whether quoting is allowed for this funds/terms at 262. If the answer is no, then the error is displayed, but if the answer is yes, then it is determined whether the quote is above a minimum amount at 263. Though a minimum may be set as indicated at 263, still quoting may be allowed on this particular funds/terms, which is why the decision block 262 is provided. If the quote is above the minimum amount as determined at 263, then it is accepted, and the funds/terms quote table is updated at 264.

FIGS. 16 & 17 are quote view pages of a market price event. The market price is displayed with respect to the first two items at 270 in FIG. 16 and at 271 in FIG. 17. The participating sellers are clearly visible to the buyer in FIG. 16, but not to the seller in FIG. 17.

TABLE A

| Business rules for calculating the total quote for an event item: |
|---|
| 1. If the "Quote Unit of Measure" equals the "Event Item Unit of Measure"<br>"Item Total" = "Event Item Quantity"/"Quote Quantity" * "Item Quote Amount" |
| 2. If the "Quote Unit of Measure" does not equal the "Event Item Unit of Measure"<br>a. If a ""Event Item Unit of Measure to Quote Unit of Measure Cross Reference" exists<br>"Item Total" = (("Event Item Quantity" * "Event Item Unit of Measure to Quote Unit of Measure Cross Reference Ratio")/"Quote Quantity") * "Item Quote Amount" |

TABLE A-continued b. If a "Unit of Measure Cross Reference" exists from "Event Item Unit of Measure" to "Pack Unit of Measure" and a "Unit of Measure Cross Reference" exists from "Pack Unit of Measure" to "Quote Unit of Measure"
Item Total (("Event Item Quantity" * "Event Item Unit of Measure to Pack Unit of Measure Cross Reference Ratio" * "Pack Unit of Measure to Quote Unit of Measure Cross Reference, Ratio")/"Quote Quantity") * "Item Quote Amount"
c. If the "Event Item Unit of Measure" equals the "Package" and the "Quote Unit of Measure" equals the "Tack Unit of Measure"
"Item Total" = (("Event Item Quantity" * "Pack Quantity")/"Quote Quantity") * "Item Quote Amount"
d. If the "Event Item Unit of Measure" equals the "Package" and "Pack Unit of Measure to Quote Unit of Measure Cross Reference" Exists
"Item Total" = ((("Event Item Quantity" * "Pack Quantity) * "Event Item Unit of Measure to Pack Unit of Measure Cross Reference Ratio") "Quote Quantity") * "Item Quote Amount"
"Gross Event Value" = Sum of the "Item Totals" for an event.

Business rules for calculating the event funds/terms item totals:

1. If the "Event Offering Type" is "Dollar" represented by the integer value "0" in the table.
a. If the "Event Offering Quote Amount" is Null and the "Event Offering Minimum Amount" is not null "Offering Item Total"= "Event Offering Minimum Amount"
b. If the "Event Offering Quote Amount" is greater that the "Event Offering Minimum Amount"
"Offering Item Total" = "Event Offering Quote Amount"
2. If the "Event Offering Type" is "Percent" represented by the integer value "1" in the table
a. If the "Event Offering Quote Amount" is Null and the "Event Offering Minimum Amount" is not null
"Offering Item Total" = "Gross Event Value"/"Event Offering Amount"
b. If the "Event Offering Quote Amount" is greater that the "Event Offering Minimum Amount"
"Offering Item Total" = "Gross Event Value"/"Event Offering Quote Amount
"Total Funds/Term" = "Sum of the "Offering Item Totals" for an event
"Net Event value" = "Gross Event Value" = "Total Offering In Table A, there are listed in pseudo code business rules for an event for arriving at "net event value" such as appears at line 165 (there called "net total") of FIG. 6. First the items totals as appear at the lines 154 of FIG. 6 are calculated using the rule 1 or 2 a, b, c or d under "Business rules for calculating the total quote for an event item." Under rule 1 if the quote is made in the same units of measure as the event item is listed, the calculation is straightforward. The first line 154 in FIG. 6 illustrates this. The event item unit of measure there is the case. A quantity of 1,050 cases of jars of a given size of particular olives is listed. The quote, by the seller S1 for example, is $7.92 per case. In this case, the item total is 1,050 cases/1 case multiplied by $7.92 to equal $3,316, which is the "Item Total."

Where the quote is made in a unit of measure ("quote Unit of Measure") other than the unit of measure listed in the event ("Event Item Unit of Measure"), if a cross reference or conversion figure exists between the two units of measure, then that is used in rule 2a to arrive at the item total. An example would be where the quote is in dollars per ounce and the event quantity is listed in pounds the "Event Item Unit of Measure to Quote Unit of Measure Cross Reference Ratio" would be 16. Similarly, rule 2b applies where the quote is made in a unit of measure other than the event unit of measure and, instead of a direct conversion or cross reference as in rule 2a, there exists a conversion figure from event item unit of measure to a pack unit of measure and another conversion figure for the pack unit of measure to the quote unit of measure. For example, if the event quantity were listed in pounds, but the quote was in ounces, and pounds per pack as well as ounces per pack were known, then the total item quote could be calculated.

Rule 2c applies when the event lists the quantity of product by the package, but the quote unit of measure by which the seller quotes is the pack unit of measure or in other words, the units packaged together in a single package. For example, if the event item quantity is 100 cases and each case contains 12 cans, then the pack quantity is 12. The quote quantity, which is the quote unit of measure, is one can and the item quote amount is the amount quote per can so for 100 cases times 12 cans where the quote is $1.00 per can, the total quote for the item is $1,200.

Rule 2d, immediately following, takes into account a further removed quote unit of measure. If the event item quantity is 100 cases of beer and the pack quantity is 100 pounds per case, if the bidder were to quote in price per ounce, then an event item unit of measure to pack unit of measure cross reference ratio of 16 would be necessary to arrive at the item total. In this example, if the quote were of $1.00 per ounce, the total quote or item total would be $160,000 or 100 cases times 100 pounds per case times 16 ounces per pound times $1.00 per ounce.

Figure 18A:
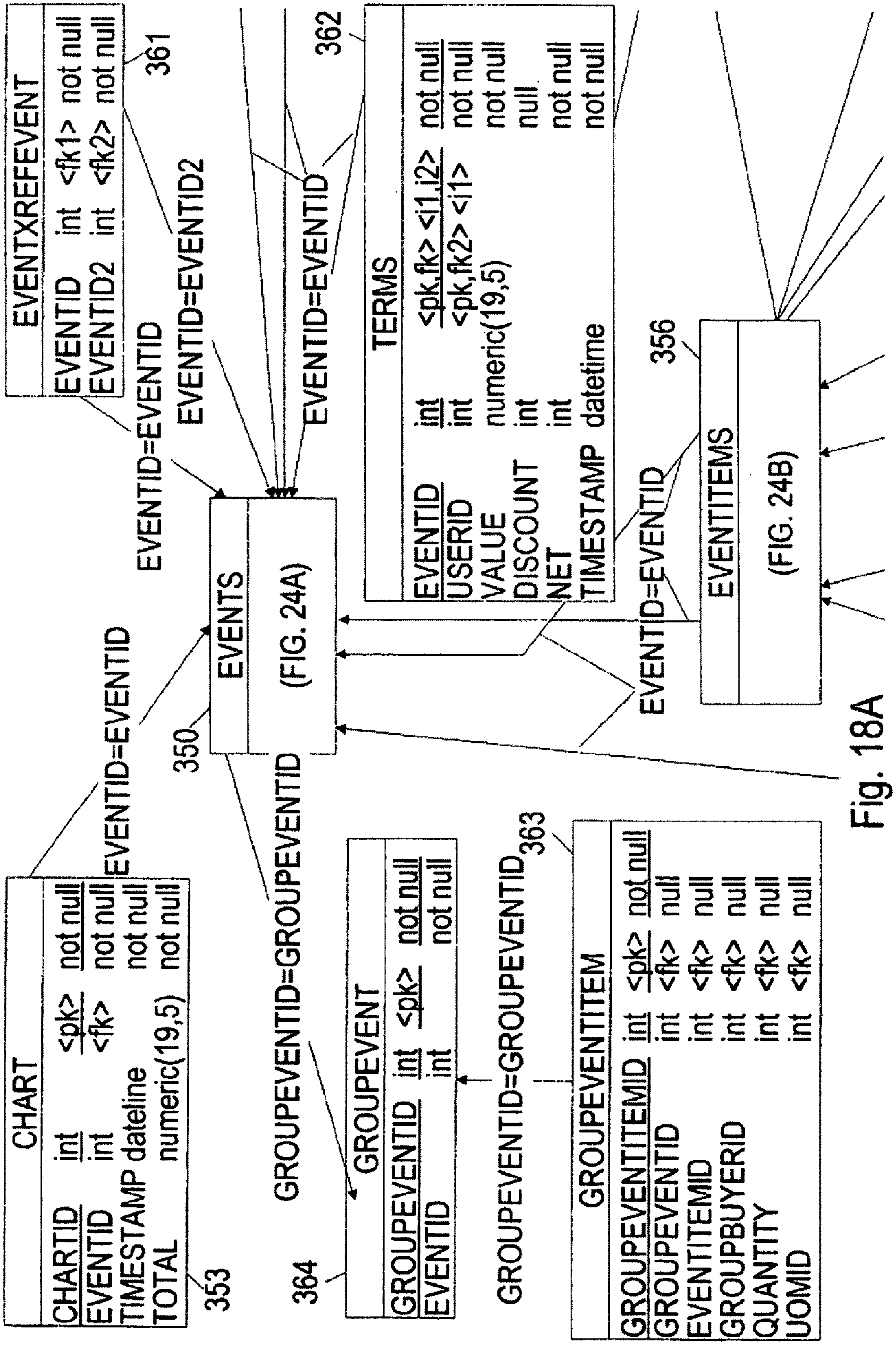
FIGS. 18A-F are a diagrammatic illustration of a data model of a system according to the invention.
Figure 18B:
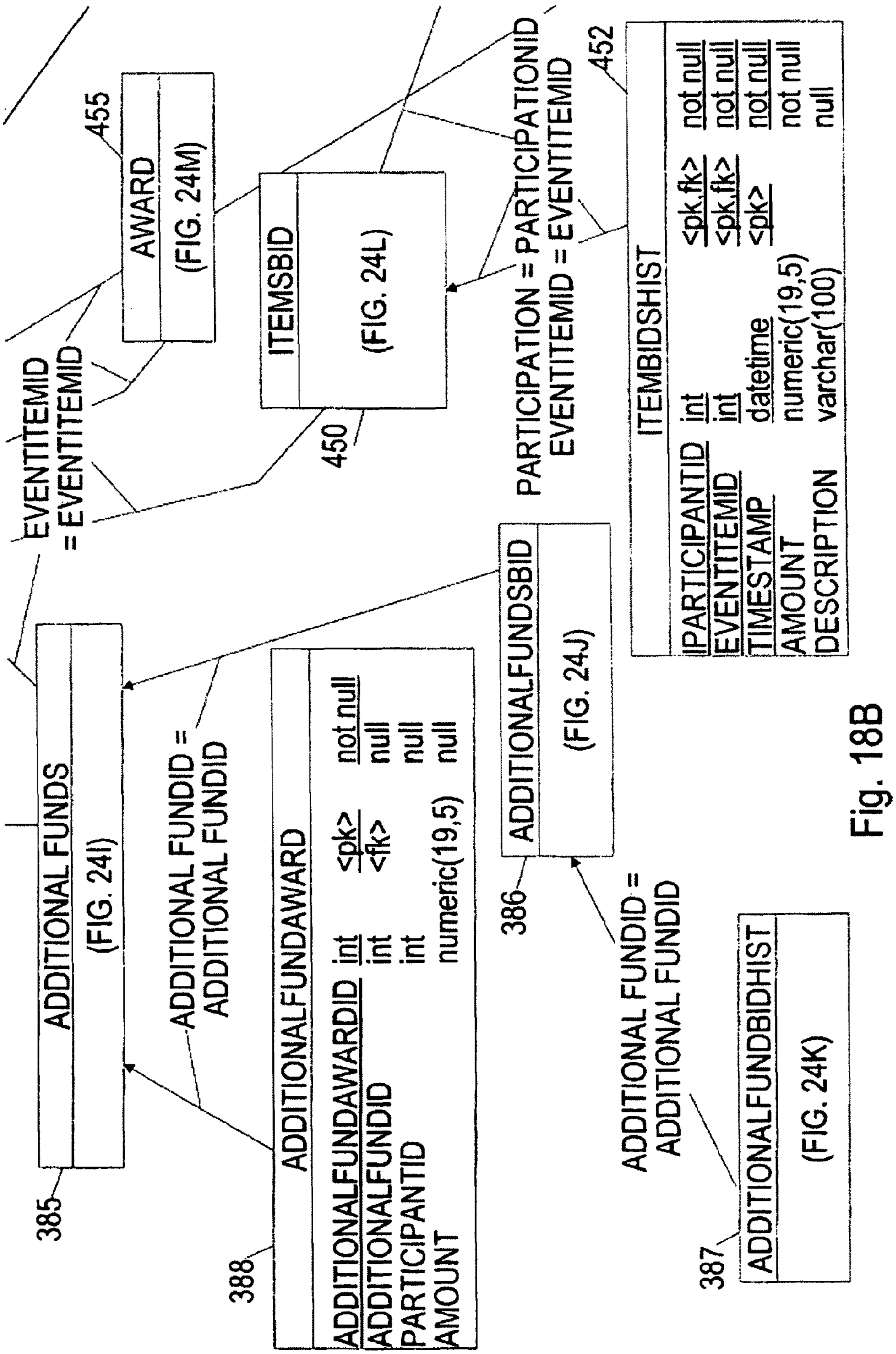
Figure 18C:
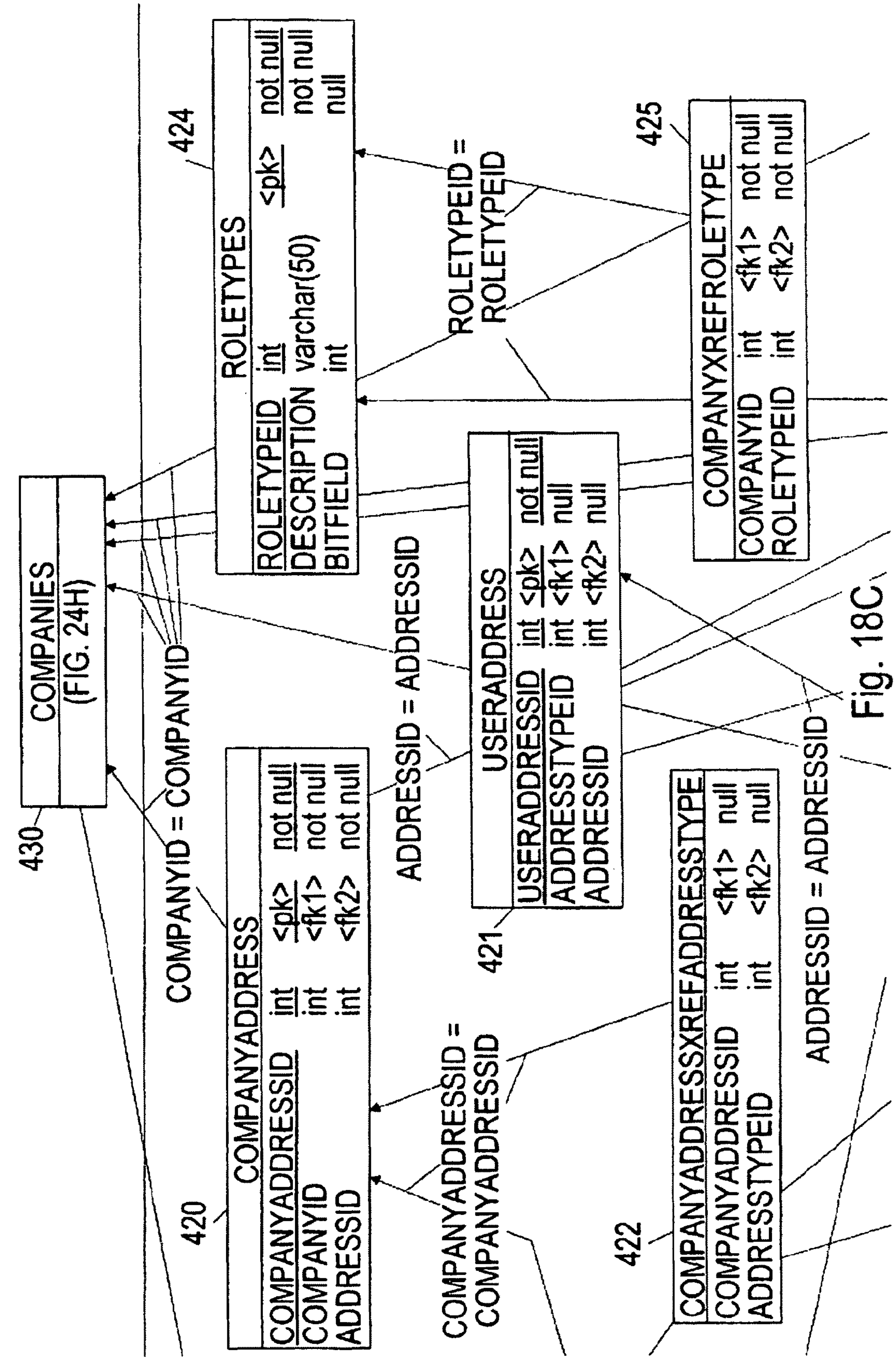

The "Business rules for calculating the event funds/terms item totals" relate to the non-price funds/terms listed at line 164 of FIG. 6 as previously discussed. The funds/terms may be in a dollar amount, such as dollars in freight allowance or advertising, or the funds/terms may be a percentage such as a percentage discount based on volume purchased. For a dollar funds/terms, an integer is set to zero in a field 387 in a table 385 in FIG. 18B of the data model of FIG. 18, discussed below. If the event funds/terms quote amount is null, which is to say no quoting of additional funds has been made, and if there is an event funds/terms minimum amount, then the funds/terms item total is the event funds/terms minimum amount. What this means is that if there is an event funds/terms minimum amount that has been set by the purchaser as a requirement, the participating seller has accepted this at the outset and consequently, this is a default value. If the event funds/terms quote amount is greater than the event funds/terms minimum amount, however, the event funds/terms quote amount is the funds/terms item total rather than the event funds/terms minimum amount.

If the event funds/terms type is of a percentage kind, then the field 387 in the table 385 has an integer set to 1. Again, as in rule 2a, if the event funds/terms quote amount is null and the event funds/terms minimum amount is not null, then the funds/terms item total is the gross event value divided by the event funds/terms minimum amount (a percentage). Similarly, if the event funds/terms quote amount is greater than the event funds/terms minimum amount, then the funds/terms item total is the gross event value divided by the percentage which is the event funds/terms quote amount. The "gross" is the sum of the "Item Totals" for the event, each as determined in the Business Rules for Calculating the Total quote for an Event Item described above. "Total Funds/Terms" is the sum of the "Offering Item Totals" for an event under Business Rules for Calculating the Event Funds/Terms Item Totals. Finally the Net Event Value is the Gross Event Value minus the Total Funds/Terms.

The data structure of the system is as schematically illustrated in the data model of FIGS. 18A-F. These figures join as indicated in FIG. 18. Table 350 defines the events. An integer 351 identifies an event. The event id serves as a primary key as indicated by the entry <pk>. By this key, the event may be called up and characteristics of the event set forth in the remainder of the fields 352 of the table 350 are retrieved. The entry "not null" indicates that the value in this field may not be blank, whereas the entry "null", where present, indicates that the entry may be blank.

Other tables in the data model take the event id from the table 350 as indicated by the unnumbered arrows labeled "event id=event id." Information for the chart of FIG. 17 is located in the table 353. The chart id is provided by an integer 354. The chart id is the primary key for this chart table 353. In the "event id" field, the entry <fk> indicates that the field "eventid" is a foreign key, i.e., the key to another table. In fact, it is the primary key of the table 350 as just discussed.

Event items, many of which have been discussed above, are set forth in the table 356. An event identifier in the form of an integer 358 is the primary key for this table. The entries <i1>, <i2> reference indices available as a quick way to find associated data. Other event related data and cross references are found in tables 361-364.

Figure 18D:
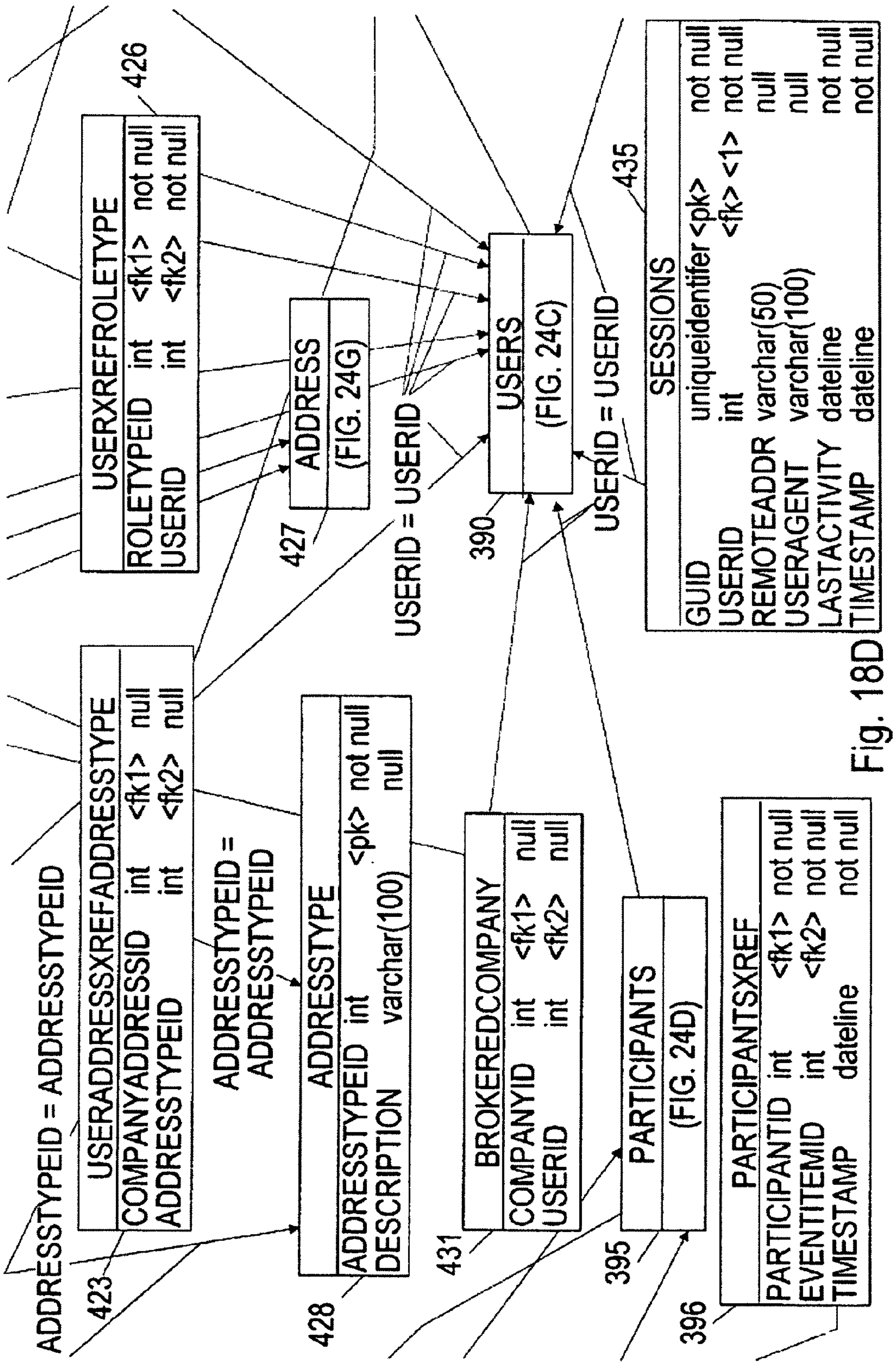

In table 390, FIG. 18D, user's identifications are located. "Varchar" refers to variable characters of 10 to 255 characters in length used to identify the user name, company, email address, etc. As described above, disablement, shown in field 392, is determined by the setting of a single bit.

Participants in an event are identified in the table 395 and cross referenced in table 396 of FIG. 18D. In table 400 in FIG. 18E, product identity is contained. In table 405, units of measure (UOM) are kept and UOM cross references are kept in table 401.

Figure 18E:
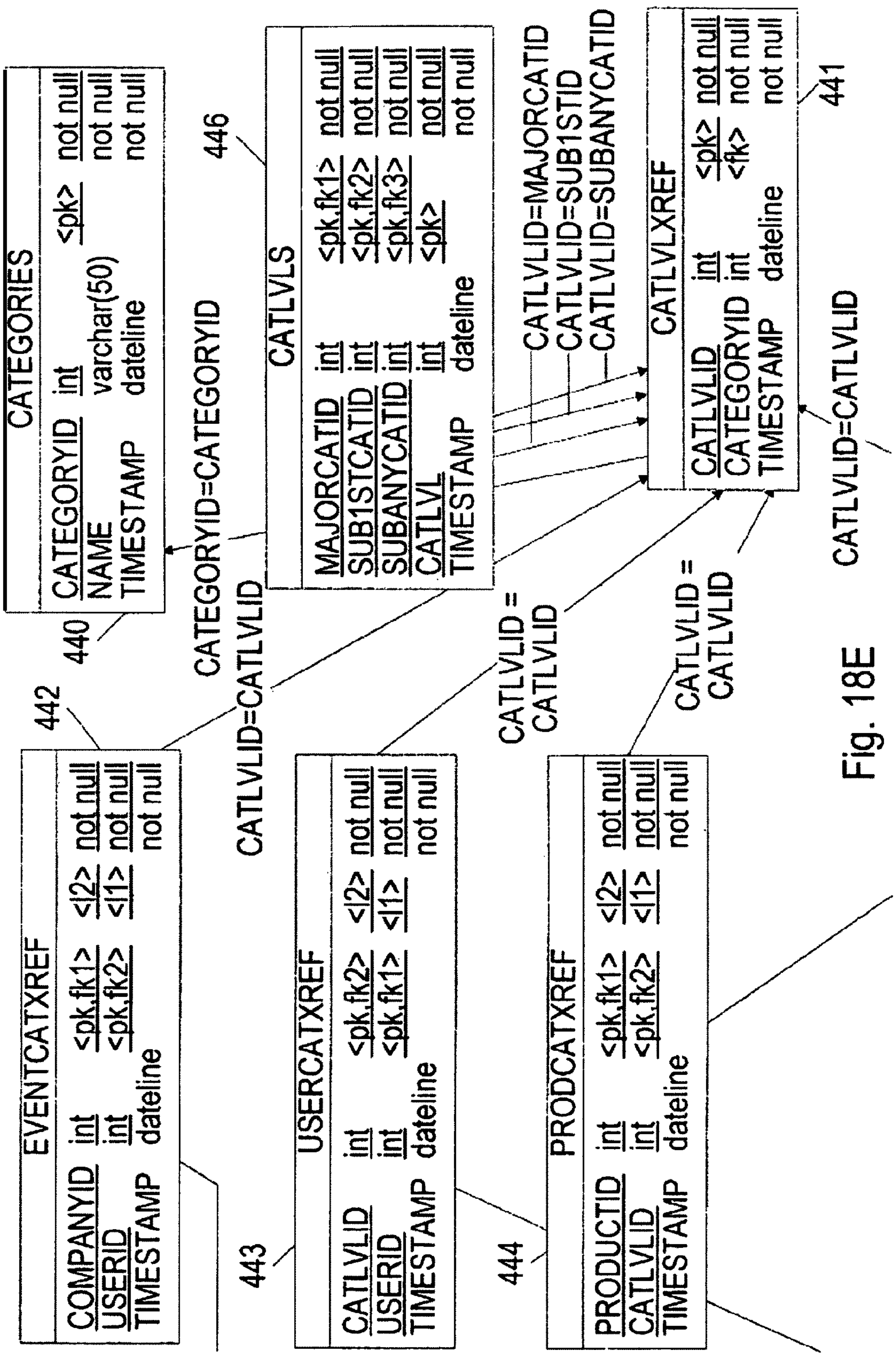

Various categories assigned to e.g. events, users and products are kept in table 440, FIG. 18E, and are retrieved using tables 441-446. Time zone information is in table 447.

Figure 18F:
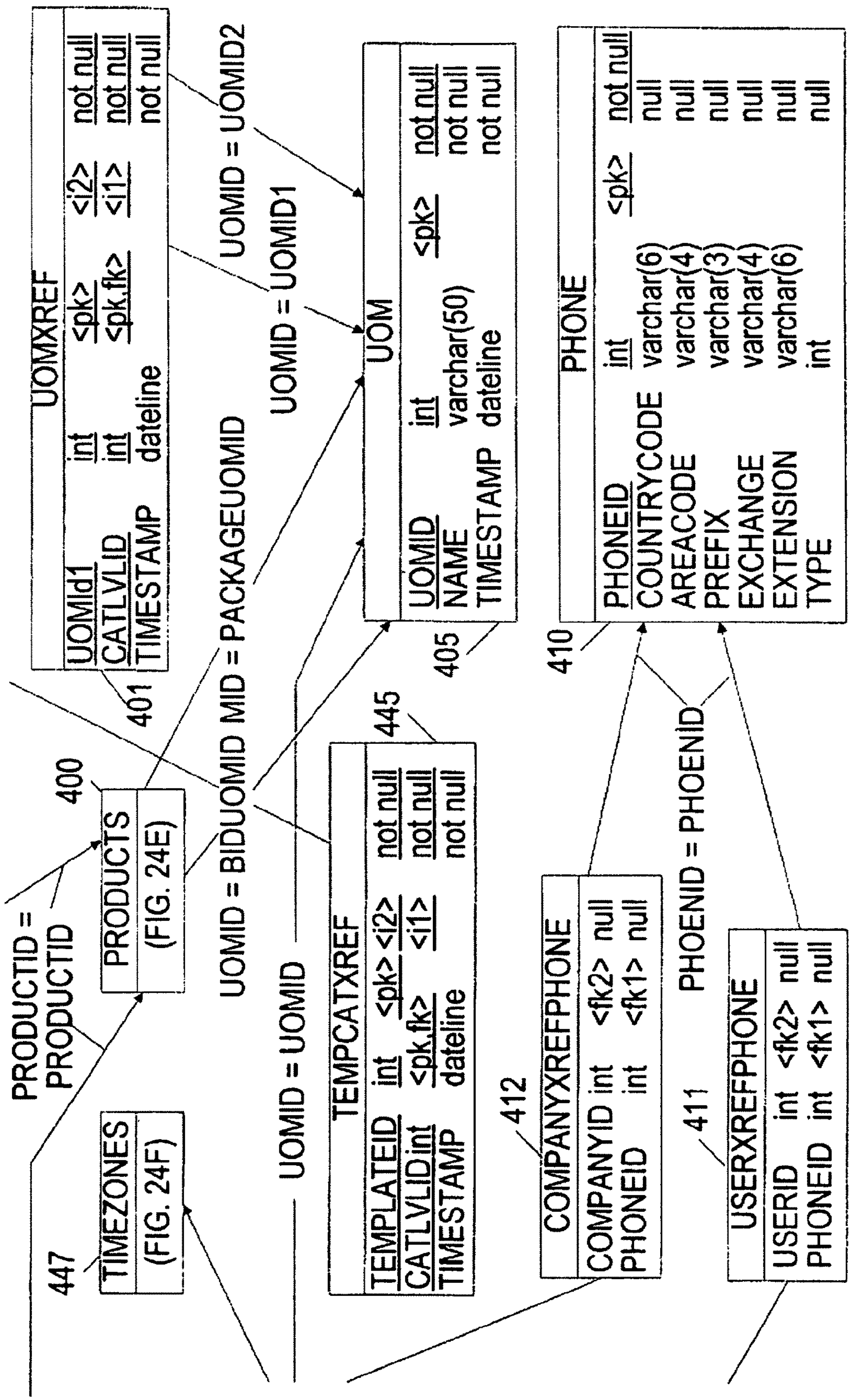

Phone information and cross references are in the tables 410, 411 and 412 of FIG. 18F. Addresses, address cross references and other address related information are contained in the tables 420-428 of FIG. 18C. Company identification is found in the table 430 of FIG. 118C. User id and company id are brought together in a table 431 of FIG. 18D.

The user id or GUID is in a sessions table 435 of FIG. 18D. The non-price items, called here "additional funds," are found in table 385 of FIG. 18B. The additional non-price funds that have been quote are in table 386, the history of additional fund quotes is found in the table 387, and an additional fund award table is table 388. Item quotes appear in table 450, the history of item quotes in table 452, and the winning quote award in table 455.

Negotiated Event

The Negotiated Event is an electronic process for gathering and analyzing proposals for a contract that has been sent out for bid. The process is broken down into three components: Initializing Event, Create Proposal, and Analyze/Negotiate Proposals.

Figure 19:
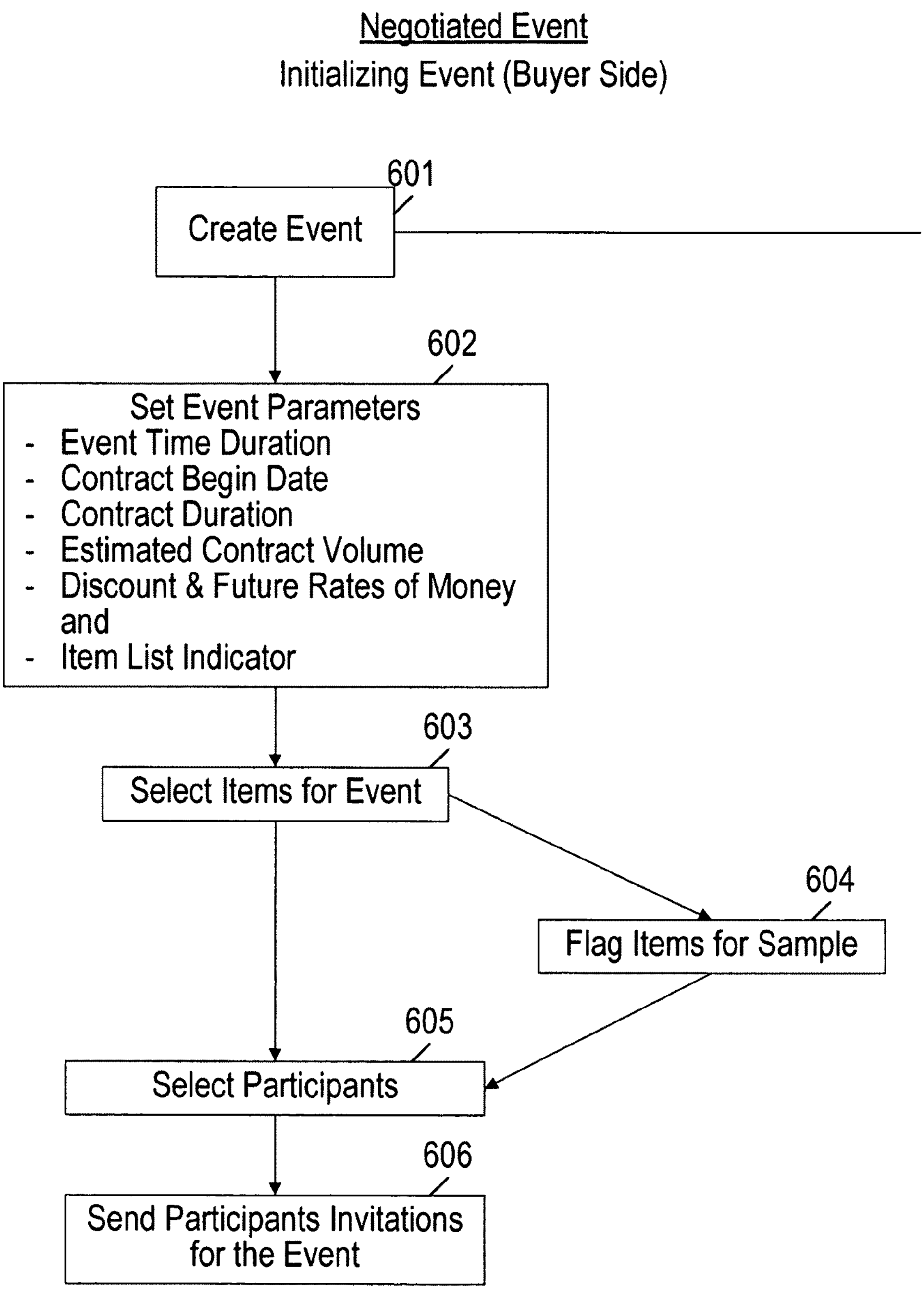
FIG. 19 is a flowchart of a first, Initializing Event, component of a negotiated event.

The first component, flowcharted at FIG. 19, is Initializing Event. It is the process that starts the whole event cycle. Once the buyer has decided to place a contract out for bid, he or she logs on to the website and creates an event as indicated at 601. In order to create this event a buyer must fill out and select information about the event. At 602 the buyer begins by answering some parameter questions on the set-up page. These include event time duration, contract begin date, contract duration, estimated contract volume, discount & future rates of money and item list indicator. The buyer proceeds by selecting items for the event at 603 and if desired requests a sample to be delivered for qualification at 604. The buyer continues by selecting participants who he or she would like to be involved in the proposal process at 605. Once selected the last step is to click on a button to send out e-mail invitations to the selected participants notifying them of this contract that is up for bid at 606.

Figure 19A:
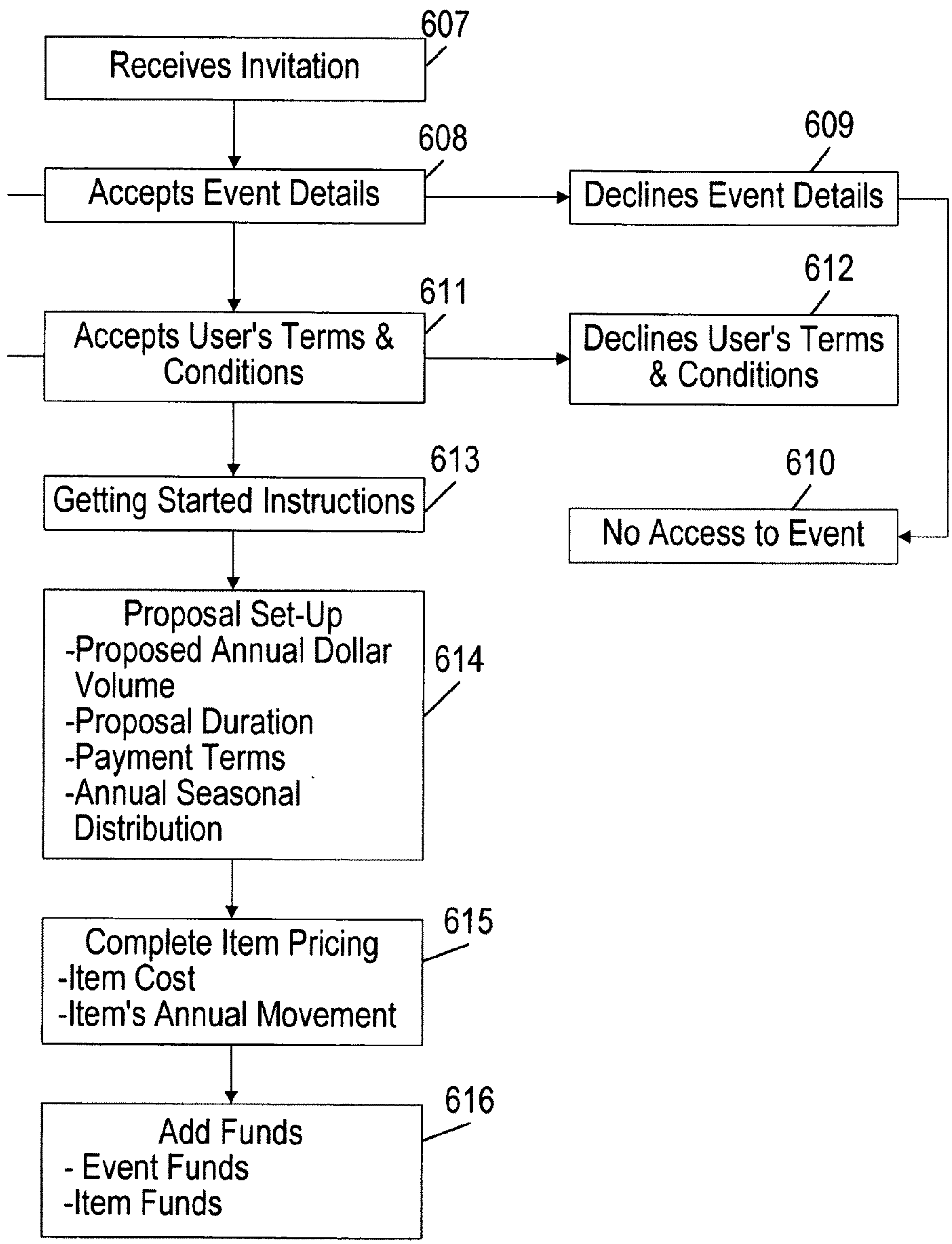
FIG. 19A is a flowchart of a second, Create Proposal, component of the negotiated event of FIG. 19.

As shown in the flowchart in FIG. 19A, the second component, Create Proposal, is the supplier's process for responding to the contract that is up for bid. If a supplier decides to participate that supplier clicks on a link established on the e-mail he or she receives from the buyer, at 607. This automatically takes the supplier to the website login screen. Once logged in, the supplier has the ability to review the details about the event for this contract at 608. Upon this review, the supplier must decide to accept or decline the event based on these details. If at 609 the supplier declines, the supplier is not allowed to continue on at 610, but if at 608 he or she accepts, he or she is then sent on to the user terms and condition-screen, at 611. The supplier again has the decision to accept 611 or decline 612 with the same results as the previous decision, but this time if the supplier accepts he or she is taken into the proposal process.

The proposal begins at 613 by outlining the instructions on how to proceed through this process. Once this has been reviewed, the supplier enters into the proposal set-up screen at 614. Here the foundation is built for the supplier's whole proposal. Required information about the foundation is entered and submitted. This may include Proposed Annual Dollar Volume, Proposal Duration, Payment Terms and Annual Seasonal Distribution. The supplier is then faced with entering in cost and movement for each individual item within the event at 615. ("Movement" is a term understood in the grocery industry to mean volume moved over time, e.g. case per week or trucks per month.) Once completed, the supplier has the option to add at 616 any additional funding (by event level or item level) to round out their offering. The supplier has the ability to change any aspect of this proposal until the deadline that the buyer has determined in the set up process, but once the deadline has passed changes only are allowed at the buyer's discretion.

Figure 19B:
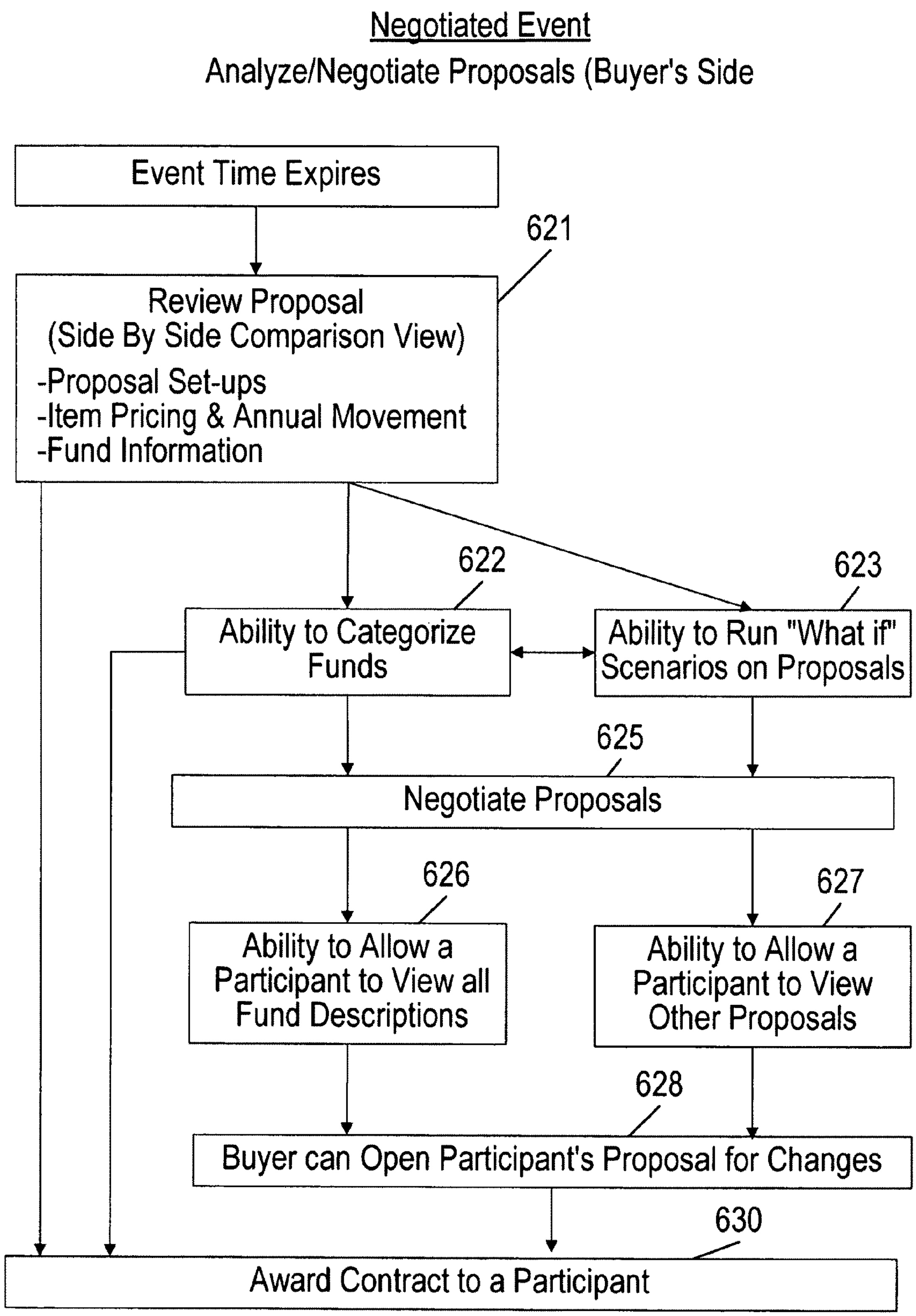
FIG. 19B is a flowchart of a third, Analyze/Negotiate Proposals, component of the negotiated event of FIGS. 19 and 19A.

As shown in the flowchart at FIG. 19B, the third component, Analyze/Negotiate Proposals, is an analytical review process for the buyer that takes into account the relationship between time and money. From the buyer's perspective the buyer is able to see each proposal in a side by side comparison at 621. He or she is able to categorize any additional funds from the proposals at 622. This permits the buyer to compare additional funds categories such as advertising contributions, volume discounts, etc. The buyer is able to run a "what if" scenario, or contingency, analysis on any selected proposal at 623. The "what if" scenario is run by permitting the buyer to change one or more terms of a quote and then based upon the same analytical review, observing how the buyer's results are effected. This flexibility for looking at the proposal along with the comparative analytics such as the calculation of the net present value, the item list cost differential, and additional profitability between the different proposals assists the buyer in his or her decision making process on which proposal is a better option for the buyer.

Net Present Value is determined using the formula:

$$PV=CF/((1+i)^1)$$

The net present value for a given cash flow is stated as the cash flow divided by 1+interest rate (i) taken to the power of the number of periods being calculated (t).

The inputs for these various elements in the application are as follows:

(a) Cash Flow (CF)—This amount derives from the quotes being entered and the shipment distribution filled out by the supplier.

(b) Interest Rate (i)—This is the "Net Present Value Discount Rate" entered into the Setup Page. Typically, this will be the return on investment or the interest rate on cash investments for the client.

(c) Number of Periods (t)—This is the number of periods for which the payment will be made. In the present case, compounding occurs on a monthly basis, so this is the number of months the payment will be made from the beginning of the contract.

Item List Cost Differential is a means of weighting the extended amount to take into account the different volume of product the totals cannot be readily compared. This calculation is to alleviate that issue. The calculation is as follows:

$$(\text{Maximum Price}-\text{Supplier's Price}/\text{Maximum Price})\times\text{Supplier's Price}\times\text{Quantity}$$

Figure 20:
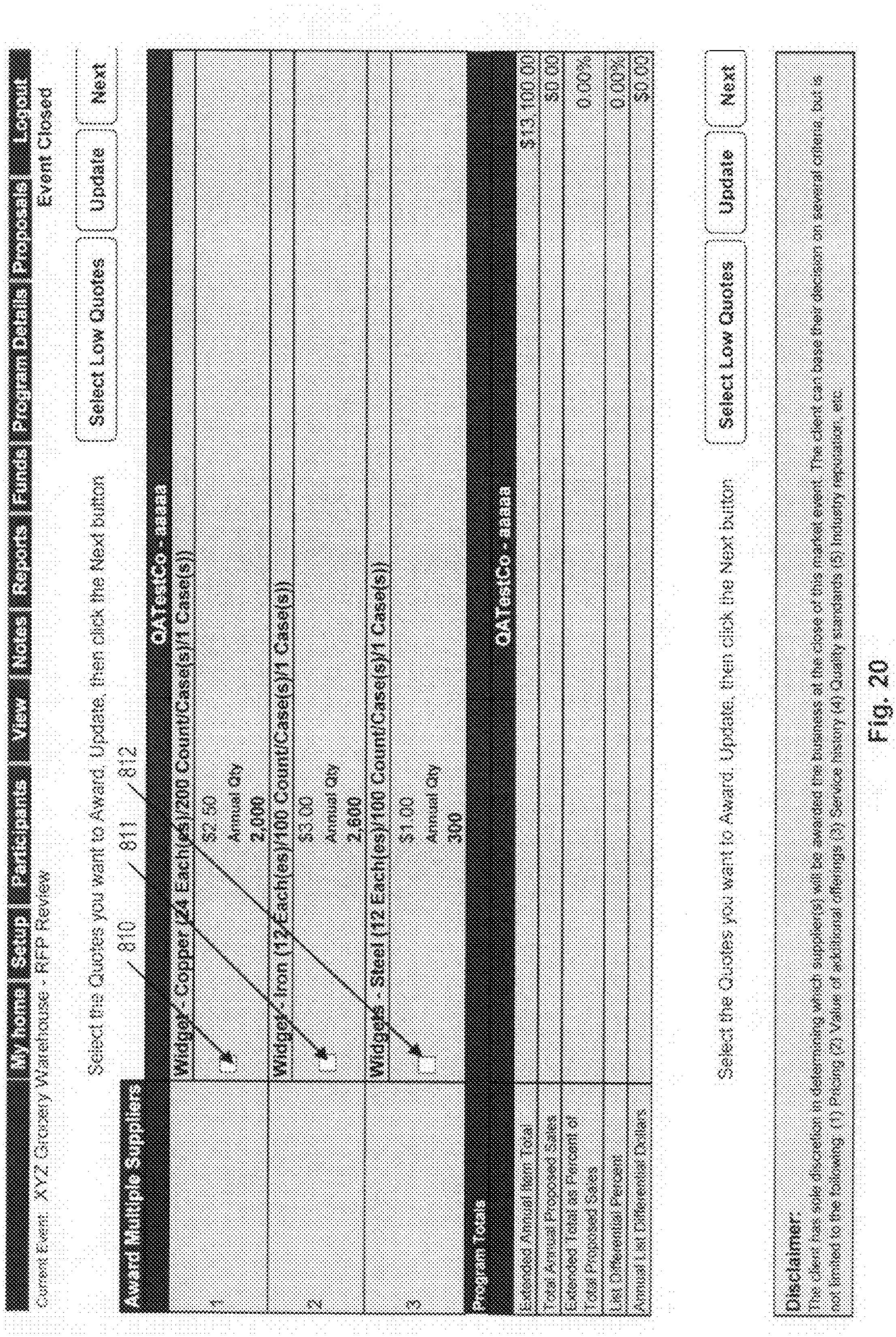
FIG. 20 is an illustration of the quote view page for a negotiated event.

The process could stop at the point of receiving the sellers quotes, but to add more flexibility to it the buyer is also empowered to negotiate with each proposal as indicated at 625. By negotiating the buyer may persuade a supplier to change certain aspects of the supplier's offering. If the supplier agrees to these changes the buyer has the ability to allow the supplier access to the supplier's proposal and once the change are made the buyer can close the access to the supplier. At this point the real time calculations are refreshed with the changes and the buyer will see at 628 the net effect on the changed proposal. If the buyer needs some leveraging to help in the negotiating process, the buyer can choose an option that allows the supplier to view certain aspects of any other proposals as indicated at 626 and 627. After the supplier reviews this information, then the buyer can again permit access for the supplier to modify his or her offering again. Once the proposals have been negotiated, the buyer can make a final review of the information. After this review the buyer has the ability to award the best offer electronically over the e-mail while also sending out to the other participants a thank you for their participation letter, all at 630. FIG. 20 is the administrator, buyer, power buyer's quote view page of a negotiated event affording the ability to award at 810, 811 and 812.

Competitive Branded Products Event

FIG. 21 is a quote view page for comparing quotes on different brands of a product that a buyer seeks to purchase. Shampoo is the product in the example. This page can be used, e.g., to compare promotional programs presented by two, three or more different manufacturers or distributors. The buyer's proposed program is first presented. Retail prices per unit are shown at fields 701. The buyer's gross margins are shown at 702. At 703 the quantity cases of six bottles each is shown for each brand. The proposed price (cost to buyer) that will produce the desired margin appears at 704.

Next the seller's or "supplier's" proposals or "quotes" are shown. These include price per case at 706, additional funds at 707, program price or cost to buyer at 708. The resultant gross margin is shown at 710.

The buyer's and seller's proposals are then compared. The difference in price appears at 712 and percent difference at 713. As can be seen the buyer's proposed price is less in each instance by the dollar amount shown in parentheses. The best supplier proposal from the buyer's point of view is Brand Z as indicated at 715.

At 717 the supplier proposals are compared, using the Brand Z proposal as the basis for a normalized comparison. The difference in percent difference between Brand X and Brand Z is shown at 718. The difference in percent difference between Brand Y and Brand Z is shown at 719. Corresponding dollar differences are at 720 and 721. FIGS. 21A and 22B show the quote view page for the competitive branded product event of FIG. 21. The administrator, buyer, power buyer's page, FIG. 21A, shows all quotes as well as the comparative figures. The seller's page shows just that seller's quotes plus the comparative figures.

This then has allowed a comparison between proposals for branded products differing in price, differing in additional funds being offered and in which the buyer has made his or her proposal in one set of units (retail price per unit) and the responding supplier participants have made their proposal in another set of units (price per case). Nevertheless, the differences between sought-after gross margin and gross margin resultant from the suppliers proposals are made apparent.

Event Setup Options/Features

The following outline sets forth the many various setup options and features that the power buyer or administrator can use in setting up an event. Again, the olive buying event of FIGS. 6-9 is the example. Reference is made in FIGS. 22 and 23.

1. Ownership:
 a. Event:
  i. Event Name: The name one allocated for the event on the initial create event page. This field, 501, is automatically populated from what is entered on the initial create event page. However, one may change the event name on the event setup page.
  ii. Event Type: Indicates, at 502, the type of event and type of purchasing that the host user desires. There are two classifications of events:
   1. System, at 503, which can be:
    a. Live—a binding event with some economic outcome,
    b. Training—a non binding event with no economic outcome,
    c. Template—an event that is not actually run but used as the template for setting up similar events.
   2. Classification, at 504, which can be:
    a. Contract,
    b. Replenishment,
    c. Spot (spot buy)
    d. Price List, or
    e. RFP (negotiated event).

iii. Parent Event: Identifies at 505, whether or not the event was a copy of another event. If it was a copy, it will list the event name that the current event was created from, i.e. the "parent event."

iv. Host Company Name: Refers, at 506, to the company that is hosting the event. Is automatically populated from what is entered on the create event page.

b. Host User:

i. Host User Company Name: This field will default to the event host's company name at 507, but can be changed to another company.

ii. Host User Name: Provides a drop down list at 508 to select who will be the host user or sponsor of the event.

iii. Title: Lists the job title of the host user at 509. Is automatically populated from the user's profile. If incorrect, the user must update their profile to correct it.

iv. First Name: Lists the host user's first name. Is automatically populated at 510 from the user's profile. If incorrect, the user must update their profile to correct it.

v. Last Name: Lists the host user's last name. Is automatically populated at 511 from the user's profile. If incorrect, the user must update their profile to correct it.

vi. Department: Lists the department that the host user works in. Is automatically populated at 512 from the user's profile. If incorrect, an administrator from the company that maintains the website and provides the system (the "Company") must update the profile to correct it.

vii. Phone Number: Lists the host user's phone number at 513. Is automatically populated from the user's profile. If incorrect, the user must update their profile to correct it.

viii. Fax Number: Lists the host user's fax number at 514. Is automatically populated from the user's profile. If incorrect, the user must update their profile to correct it.

ix. Email: Lists the host user's email address. Is automatically populated from the user's profile. If incorrect, the user must update their profile to correct it.

x. Primary Administrating Company: Lists at 515 the host user's primary administrating contact at the Company. Is automatically populated from the user's profile. If a primary Company contact docs not appear, one selects one's contact from the drop down list.

xi. Secondary Company Contact: Lists at 518 the host user's secondary Company contact. Is automatically populated from the user's profile. If a secondary Company contact does not appear, one may select one's contact from the drop down list.

c. Setup:

i. Event Setup By: Indicates the user's name that set up the event at 517. This field is automatically populated by the system.

ii. Buyer Setup Event: A Yes/No flag that indicates at 518 whether or not a user with the 'power buyer' role set up the event. This field is automatically populated by the system.

2. Setup:

a. Event Start:

i. Event Start Date: Indicates at 520 the date that the event will start. Requires entry of a four-digit year, i.e., 2001.

ii. Event Start Time: Indicates at 521 the time the event will start.

b. Event End:

i. Event End Date: Indicates at 522 the date the event will end. Requires entry of a four-digit year, i.e., 2001.

ii. Event End Time: indicates at 523 the time the event will end. This will reflect the actual end time of the event including extensions once the event has completed.

c. Contract:

i. Contract Start Date: Indicates the date that the contract will begin at 524. Only applies to user event type "Contract".

ii. Contract End Date: Indicates the date that the contract will end at 525. Only applies to user event type "Contract".

iii. Reminder Date: Allows a user to indicate a date at 526 that the system will remind the user who setup the event that the contract is ending and that the event will need to be run again.

d. Delivery:

i. Delivery Start Date: Indicates at 527 the date that deliveries will begin.

ii. Delivery End Date: Indicates at 528 the date that deliveries will end.

e. Anticipated Award i. Anticipated Award Date: Indicates at 529 the date that you host user expects to announce the decision on the award of business.

f. Event Status: Indicates the status of the event 530. Valid values are: Enabled, Cancelled, Postponed, Awarded, Not Awarded.

3. RFP Setup (Referring to FIG. 23):

a. Contract Period Negotiable: Indicates at 535 whether the buyer is willing to allow the suppliers the ability to input their own proposal period for the contract.

b. Total Contract Value Negotiable: Indicates at 536 whether the buyer is willing to allow the suppliers the ability to input their own proposal values for the contract.

c. Listed Products are a subset of all items: Indicates at 537 whether the item list for this event will be a subset of all items or a complete list.

d. Future Value Discount Rate (%): This figure, at 538, is the percentage rate at which one's company places value on the future rate of money.

e. Net Present Value Discount Rate (%): This figure, at 539, is the percentage rate at which one's company places value on the present value rate of money.

f. Compounding Period: Indicates, at 540, the compounding period for the discount rates.

g. Average Gross Margin (%): This figure, at 541, is the average gross margin percentage for the items or categories which the event is based on.

h. Expected Inflation Rate (%): This figure, at 542, represents the inflation rate that is expected to influence this list of items or the category for the event.

i. Estimated total Value of Contract ($): This figure, at 543, represents the estimated total of the contract value for the event. This number will give the suppliers an idea of the value for this contract.

4. Details:

a. Quote/Event Notes:

i. Allow Quote\Event Note: Indicates at 545 whether or not one is willing to allow a supplier to place a single event or item quote notation.

ii. View Event Note: Indicates at 546 whether or not one is willing to allow event notes placed by suppliers to be viewed by other suppliers (only applies in a full view event).

iii. View Quote Note: Indicates at 547 whether or not one is willing to allow notes placed by suppliers to be viewed by other suppliers (only applies in a full view event).

b. Volumes:

i. Allow Proxy Volume: Allows at 548 a buyer to increase volume based on targeted price points.

ii. Allow Items No Volumes: Allows at 549 a host user to indicate whether or not one will be defining volumes for items in the event.

iii. Allow Suppliers Quote Volumes: Allows at 550 a supplier to indicate the volume they have available at the quoted price point. This option cannot be used if the buyer is indicating desired volumes.

c. Display:

i. Display Reserve Price: Indicates at 551 whether or not a host user wants the reserve price to he displayed on the view page for the suppliers to see.

ii. Display Industry Price: Indicates at 552 whether or not the host user wants to display an industry price (such as current USDA or Georgia Dock pricing) to the supplier for an item(s).

iii. Display Weighted Quotes: Indicates at 553 who can view weighted supplier quotes. Valid options are Buyer, Supplier or Both. The buyer on the Participant Item page adjusts quotes on a scale from 1 to 100%.

iv. Display Supplier Alias: Indicates at 554 whether or not a host user wants to display a supplier alias on the view page. Reduces the amount of characters on the view page in the supplier column header and potentially allows for more supplier data to be viewed on a single page.

v. Display Low Net Indicator: Indicates at 555 whether or not a host user wants the lowest total net program value highlighted on the view page.

vi. Allow Branded Product Event: Allows at 556 the quote view page to display additional totals that enable a host buyer to make decisions on products that are similar, but different brands (i.e. shampoo)

vii. Display Branded Product Details to Suppliers: Displays at 557 to suppliers on the quote view page additional totals that enable a host buyer to make decisions on products that arc similar, but different brands (i.e. shampoo)

d. Quotes:

i. Quote Increment Type: Indicates at 558 what type of quote increment you want the suppliers to place their quotes with.

ii. Allow Proxy Quote: Allows at 559 a host user to indicate whether or not a supplier will allow the system place their quotes on their behalf.

iii. Allow Matching Quote: Indicates at 560 whether or not a host user will allow a supplier's quote to be matched by another participating supplier (this is for all quotes, not including the low quote).

iv. Allow Matching Low Quote: Indicates at 561 whether or not a buyer will allow the low quote for an item to be matched by another participating supplier.

v. Max Matching Quotes: Allows at 562 a host user to indicate the maximum number of matching quotes that you will allow (is used in along with the allow matching quote options above).

vi. Allow Non-Quote: Indicates at 563 whether or not a host user will allow a supplier to stay in the event without placing any quotes. Prevents a supplier from watching pricing and not participating.

vii. Non-Quote Threshold: At 564 works in along with the allow non-quote option and indicates the point in time remaining on the event clock that the system will disable a supplier if they have not placed a quote. For instance, if it is a 15-minute event, and you one has indicated 5 in this field, it means that with 5 minutes remaining on the clock the system will automatically disable any supplier who has not placed at least one quote. The supplier will not be able to access the event again if they are disabled.

viii. Allow Quote Increase: Indicates at 565 whether or not a buyer will allow suppliers to increase their current quoted price.

ix. Quote Increase Threshold: Indicates at 566 how much time after a supplier places quotes that the buyer will allow a supplier to increase their quoted price.

x. Allow Quote Increase Extension: Indicates at 567 whether or not a host user will allow a supplier to increase their pricing during event extensions. If checked, then the Quote Increase Threshold applies.

xi. Reset Quotes Prior Start: Allows at 568 the host user to have an event span multiple days and the system will automatically change the date to the following day at midnight each night. In addition, the view page will appear as if it is n new event.

xii. Start With Previous Quote: At 569 works in conjunction with "Reset Quotes Prior Start" and allows the suppliers' last quoted prices and notes to be retained on their quote page so that they do not have to re-enter the information the first time.

e. Event:

i. Event Display Type: Indicates at 570 the view in which the suppliers will be able to watch the event. Valid values are: Full, Low Quote Only, Ranking, Blind, Blind w/Color.

ii. Event Review Time: Indicates at 571 the amount of time at the close of the event that a host user will want the suppliers to stay available by phone, in the case of the event needs to be re-opened for some reason.

iii. Supplier Award: Indicates at 572 whether one will award the business to a single supplier or multiple suppliers.

iv. Items Parent Event: Indicates at 573 whether or not the item "Pick List" will have only those items associated to the parent event. This option does not apply if this event was not a copy of another event.

v. Allow Group Buy: Indicates at 574 that the hosting buyer wants to hold an event, which would allow multiple buying organizations to participate in the consolidation of volumes of the selected item(s) and indicate their own volume requirements.

vi. Current Price Calc Method: If group buy is checked, indicates at 575 how the current price field should be calculated for each item in the event. Valid values are: Lowest Current Price, Highest Current Price, or an Average of all current prices entered for an item.

vii. Allow Extensions: Indicates at 531 whether or not the event will extend if quotes are entered within the specified threshold.

viii. Extension Threshold: Indicates at 532 the threshold or at how much time remaining in the event that the event will extend if a significant event happens in the specified threshold. Significant events are: Low quote changes, Any quote going down, An initial quote by a supplier on an item, and any change to terms or funds. For example, if the low quote changes within the last 1-minute remaining on the clock, the event will extend.

ix. Extend Time: Indicates at 533 how long the event will extend if a significant event occurs within the specified threshold. This is a repetitive process and will continue until no significant event occurs within the specified threshold. For example, the event will extend 2 minutes if a significant event occurs within the specified threshold.

x. Departments In Event: At 579 users in the selected departments are invited to view this event. These departments are based on the departments of the Host Buyer.

5. Categories: Indicates at 580 which category to which the products and participants will be sourced from.

6. Additional Information: At 581 allows a host user to indicate any additional information that is needed for the supplier to most appropriately prepare for the event.

7. Payment Terms:

a. Allow Terms: Indicates at 582 whether or not a host user will allow a supplier to quote early payment discount terms (i.e. 2% 10, net 30).

b. Minimum Terms: Indicates at 583 that the host user is requiring minimum terms and what those required terms are. If this field is populated, the terms will automatically be calculated upon a supplier placing an initial quote.

c. Allow Terms Quote: At 584 allows suppliers to quote terms.

d. Allow Decrease Terms Quote: At 585 allows suppliers to decrease their term amount.

e. Allow Users Add Funds: If present allows a host user to indicate whether or not one is allowing a supplier to quote on funding that one did not specifically request as a part of the program.

8. Event Fees:

a. Fee Type: Indicates at 587 the type of fee that will be applied to the event. Intesource staff completes this section.

9. New Event:

a. New Event Name: At 588 allows one to indicate the name one wants the new event to be called when doing a copy.

b. New Company Name: At 589 allows a user to change the company name when copying an existing event.

c. With Last Quotes: At 590 allows a user to copy an event that has previously been quoted on and not copy the last quote per item to the new event.

d. Without Last Quotes: At 591 allows one to copy an event that has previously been quoted without retaining the last quotes per item.

From the above outline the breadth of choices given a buyer or power buyer is apparent.

Whereas a specific, exemplary embodiment of the invention has been described, it will be readily understood by one skilled in the art that changes may be made without departure from the spirit and scope of the invention as set forth in tile claims appended or to be appended hereto.

We claim:

1. A method of computer assisted procurement of products sought to be purchased by a purchaser comprising:

(a) providing an internet website, (b) establishing classifications of users entitling users to varying degrees of access to information and activities available through the website, (c) providing a publicly available registration page at the website, (d) issuing at least one of a login number, login word, and password at a user request on the registration page, (e) using the at least one number or word and password of a user at a login by the user to verify the user's identity and status, (f) upon successful verification of the user's identity and status, placing a cookie on the user's computer, the cookie comprising an identification of the user, and (g) thereafter based on the information in the user's cookie, (i) determining the user's classification, and (ii) affording the user access to information and activities on the website to a degree consistent with that user's classification.

2. The method of computer assisted procurement of products according to claim 1, wherein each cookie identifies the particular user's time zone, the method further comprising identifying timed events to a user in the user's local time by converting from the time of an event occurring outside the user's time zone.

3. The method of computer assisted procurement of products according to claim 1, further comprising, providing at the website a plurality of different home pages, each home page being associated with a particular user classification and each home page being accessible to a user having the associated classification.

4. The method of computer assisted procurement of products according to claim 3, wherein one of said classifications is administrator, and further comprising providing each user classified as administrator access to all of said home pages.

5. The method of computer assisted procurement of products according to claim 3, wherein one of said classifications is that of a responding buyer or seller entitled to quote at an event, the method further comprising restricting access of a user classified as a responding buyer or seller to event information, including providing a page on the website with competitive quote information without identification of competitive responding buyers or sellers making competitive quotes.

6. The method of computer assisted procurement of products according to claim 4, wherein another of said classifications is that of a responding buyer or seller entitled to quote at an event, the method further comprising:

(i) providing a homepage at the website for each user classified as a responding buyer or seller and limiting access to that homepage to that responding buyer or seller and to users classified as administrators, (i) providing a program details page at the website with competitive quote information from each user classified as a responding buyer or seller and without identification of the users classified as responding buyer or seller, and permitting access to the program details page by users classified as responding buyer or seller and users classified as administrator.

7. The method of computer assisted procurement of products according to claim 6, wherein the program details page provides for the entry of information about a scheduled event including:

identification of all items being offered for purchase, item quantity, item descriptions, item price quotes, and shipping information.

8. The method of computer assisted procurement of products according to claim 7, wherein the details page further provides for the entry of a market price.

9. The method of computer assisted procurement of products according to claim 8, wherein the details page further provides for a quote increment, said quote increment setting increments in price above or below the market price by which quotes must be made.

10. The method of computer assisted procurement of products according to claim 1, wherein providing an internet website comprises providing a plurality of pages at said website, and affording user access to information and activity on the website to a degree consistent with that user's classification comprises, as a user seeks to move from page to page among said pages, authenticating the user by determining whether the user is authorized to have access to each page sought by the user.

11. The method of computer assisted procurement of products according to claim 10, wherein authenticating includes determining whether the user is logged in and validated, and determining whether the user is authorized includes event participation authentication including determining whether the user is a valid event participant and that the user has permission to use event related pages.

12. The method of computer assisted procurement of products according to claim 11, wherein the step of authenticating includes inspecting the content of the cookie on the user's computer.

13. The method of computer assisted procurement of products according to claim 10, wherein affording the user access includes providing event authorization comprising:

retrieving information concerning an event and determining whether the event has been disabled, if the event has not been disabled, determining whether a user seeking access to the event has been disabled, and if the user has not been disabled, determining if the user has responded to an invitation to the event, and if the user has responded to an invitation to the event, affording the user access to a page at which the user can enter a quote.

14. The method of computer assisted procurement of products according to claim 1, wherein the step of affording a user access further comprises identifying a user as qualified to organize an event.

15. The method of computer assisted procurement of products according to claim 14, further comprising providing event organization web page for use by a user qualified to organize an event.

16. The method of computer assisted procurement of products according to claim 14, further comprising providing a user qualified to organize an event with the authority to select event respondents.

17. The method of computer assisted procurement of products according to claim 15, further comprising enabling a user qualified to organize an event access to quotes and quoter identities during the course of an event.

18. The method of computer assisted procurement of products according to claim 14, further comprising enabling a user qualified to organize an event to set an event market price with respect to which price quotations must be made by respondent.

19. The method of computer assisted procurement of products according to claim 14, further comprising enabling a user qualified to organize an event to set a price quote increment of which all price quotations must be a multiple.

20. The method of computer assisted procurement of products according to claim 14, further comprising enabling a user qualified to organize an event to determine that the event is either an auction or a reverse auction.

21. The method of computer assisted procurement of products according to claim 14, further comprising enabling a user qualified to organize an event to set a minimum or a maximum price quote.

22. The method of computer assisted procurement of products according to claim 14, further comprising enabling a user qualified to organize an event to establish the time and duration of an event.

23. The method of computer assisted procurement of products according to claim 14, further comprising enabling a user qualified to establish an event to identify quoters whose quotes have been accepted.

24. The method of computer assisted procurement of products according to claim 14, further comprising enabling a user qualified to establish an event to alter terms of an event during the course of an event.

25. The method of computer assisted procurement of products according to claim 14, wherein enabling a user qualified to establish an event to alter terms of an event during the course of an event includes enabling the selling of price points at which quantities of items sought to be purchased change automatically.

26. The method of computer assisted procurement of products according to claim 14, further comprising enabling a user qualified to establish an event to negotiate terms of a quote subsequent to the close of an event.

27. The method of computer assisted procurement of products according to claim 19, further comprising automatically converting an incremental bid to market price at a web page accessible to a user qualified to establish an event.

28. The method of computer assisted procurement of products according to claim 22, further comprising selling an extension of time of an event to occur upon receipt of a quote within a predetermined time of the scheduled close of an event.

29. The method of computer assisted procurement of products according to claim 22, further comprising disabling any quoter that has not submitted a quote during a predetermined time period in the course of the running of an event.

30. The method of computer assisted procurement of products according to claim 22, further providing a participant award website page to which a quoter whose quote has succeeded in the award of a sale is given access for completion of details of the award.

31. The method of computer assisted procurement of products according to claim 30, further comprising the step of communicating to a successful quoter a link to the participant award website page.

32. The method according to claim 1, further comprising affording a buyer a web page for the listing of a list of items regularly needing replenishment, affording participating sellers the ability to quote on items on the list at any time, affording the buyer the ability to award a purchase to a participating seller on the basis of a current quote.

33. The method according to claim 32 wherein affording participating sellers the ability to quote comprises, designating participating sellers and permitting designated participating sellers the ability to quote repeatedly without redefinition.

* * * * *